United States Patent
Karafin et al.

(10) Patent No.: US 11,280,940 B2
(45) Date of Patent: Mar. 22, 2022

(54) SYSTEMS AND METHODS FOR DIRECTING MULTIPLE 4D ENERGY FIELDS

(71) Applicant: LIGHT FIELD LAB, INC., San Jose, CA (US)

(72) Inventors: Jonathan Sean Karafin, San Jose, CA (US); Brendan Elwood Bevensee, San Jose, CA (US)

(73) Assignee: Light Field Lab, Inc., San Jose, CA (US)

(*) Notice: Subject to any disclaimer, the term of this patent is extended or adjusted under 35 U.S.C. 154(b) by 0 days.

(21) Appl. No.: 17/141,133

(22) Filed: Jan. 4, 2021

(65) Prior Publication Data

US 2021/0157155 A1 May 27, 2021

Related U.S. Application Data

(63) Continuation of application No. 16/634,121, filed as application No. PCT/US2019/013552 on Jan. 14, 2019, now Pat. No. 10,884,251.

(Continued)

(51) Int. Cl.
*G02B 30/56* (2020.01)
*G03H 1/00* (2006.01)
(Continued)

(52) U.S. Cl.
CPC .......... *G02B 5/0242* (2013.01); *F24V 30/00* (2018.05); *G02B 3/0037* (2013.01); *G02B 3/08* (2013.01); *G02B 5/0278* (2013.01); *G02B 6/04* (2013.01); *G02B 6/06* (2013.01); *G02B 6/10* (2013.01); *G02B 27/0103* (2013.01); *G02B 27/09* (2013.01); *G02B 27/0994* (2013.01); *G02B 30/00* (2020.01); *G02B 30/56* (2020.01); *G03H 1/02* (2013.01); *F24S 30/00* (2018.05)

(58) Field of Classification Search
CPC .......... G02B 30/56; G02B 30/00; G02B 6/04; G02B 6/06; G02B 27/0994; G03H 1/02; G03H 2001/0216; G03H 2001/0232; G03H 1/0005; G03B 21/565; G06F 3/016
See application file for complete search history.

(56) References Cited

U.S. PATENT DOCUMENTS

| 947,702 | A | 1/1910 | Rowley |
| 3,505,046 | A | 4/1970 | Phaneuf |

(Continued)

FOREIGN PATENT DOCUMENTS

| CN | 101095244 A | 12/2007 |
| EP | 0973152 A2 | 1/2000 |

(Continued)

OTHER PUBLICATIONS

JP2019-501554 Non-Final Notice of Reasons for Rejection of the Japan Patent Office dated Jun. 8, 2021.

(Continued)

*Primary Examiner* — Ryan D Howard
(74) *Attorney, Agent, or Firm* — Charles C. Yang

(57) ABSTRACT

Disclosed are systems and methods for manufacturing energy directing systems for directing energy of multiple energy domains. Energy relays and energy waveguides are disclosed for directing energy of multiple energy domains, including electromagnetic energy, acoustic energy, and haptic energy. Systems are disclosed for projecting and sensing 4D energy-fields comprising multiple energy domains.

15 Claims, 45 Drawing Sheets

Related U.S. Application Data

(60) Provisional application No. 62/617,288, filed on Jan. 14, 2018, provisional application No. 62/617,293, filed on Jan. 14, 2018.

(51) Int. Cl.
*G02B 5/02* (2006.01)
*F24V 30/00* (2018.01)
*G02B 30/00* (2020.01)
*G02B 6/04* (2006.01)
*G02B 6/10* (2006.01)
*G02B 27/09* (2006.01)
*G03H 1/02* (2006.01)
*G02B 6/06* (2006.01)
*G02B 27/01* (2006.01)
*G02B 3/00* (2006.01)
*G02B 3/08* (2006.01)
*F24S 30/00* (2018.01)

(56) References Cited

U.S. PATENT DOCUMENTS

| | | |
|---|---|---|
| 3,567,549 A | 3/1971 | Hoffmeister et al. |
| 3,626,040 A | 12/1971 | Nagao et al. |
| 3,870,399 A | 3/1975 | Randall et al. |
| 3,961,931 A | 6/1976 | Nakagawa et al. |
| 4,087,159 A | 5/1978 | Ulrich |
| 4,099,833 A | 7/1978 | Tosswill |
| 4,134,642 A | 1/1979 | Kapron et al. |
| 4,143,234 A | 3/1979 | Johnson et al. |
| 4,149,772 A | 4/1979 | Iyengar et al. |
| 4,265,515 A | 5/1981 | Kao |
| 4,372,769 A | 2/1983 | Hicks, Jr. |
| 5,371,826 A | 12/1994 | Friedman |
| 5,374,976 A | 12/1994 | Spannenburg |
| 5,465,308 A | 11/1995 | Hutcheson et al. |
| 5,481,385 A | 1/1996 | Zimmerman et al. |
| 5,519,801 A | 5/1996 | Noane et al. |
| 5,553,184 A | 9/1996 | Eikelmann et al. |
| 5,974,215 A | 10/1999 | Bilbro et al. |
| 6,041,154 A | 3/2000 | Ono et al. |
| 6,384,400 B1 | 5/2002 | Albagli et al. |
| 6,487,351 B1 | 11/2002 | Cryan et al. |
| 6,611,648 B2 | 8/2003 | Kumar et al. |
| 6,614,972 B1 | 9/2003 | Lundin |
| 6,680,761 B1 | 1/2004 | Greene et al. |
| 7,016,516 B2 | 3/2006 | Rhoads |
| 7,054,850 B2 | 5/2006 | Matsugu |
| 7,235,047 B2 | 6/2007 | MacAulay et al. |
| RE39,864 E | 10/2007 | Athale et al. |
| 7,329,982 B2 | 2/2008 | Conner et al. |
| 7,773,849 B2 | 8/2010 | Shani |
| 8,149,265 B2 | 4/2012 | Smalley et al. |
| 8,369,546 B2 | 2/2013 | Pompei |
| 8,406,595 B2 | 3/2013 | Hayashi |
| 8,477,906 B2 | 7/2013 | Morse et al. |
| 8,619,177 B2 | 12/2013 | Perwass et al. |
| 8,736,675 B1 | 5/2014 | Holzbach et al. |
| 8,743,466 B2 | 6/2014 | Yamamoto |
| 8,879,766 B1 | 11/2014 | Zhang |
| 9,411,511 B1 | 8/2016 | Sivertsen |
| 9,494,738 B1 | 11/2016 | Farmer et al. |
| 9,612,395 B2 | 4/2017 | Karbasivalashani et al. |
| 9,835,812 B2 | 12/2017 | Yadlowsky |
| 9,945,985 B2 | 4/2018 | Morasse |
| 9,958,829 B2 | 5/2018 | Aravkin et al. |
| 10,009,597 B2 | 6/2018 | Karafin et al. |
| 10,052,831 B2 | 8/2018 | Welker et al. |
| 10,094,974 B2 | 10/2018 | Chen et al. |
| 10,132,993 B2 | 11/2018 | Buczynski et al. |
| 10,488,584 B2 | 11/2019 | Karafin et al. |
| 10,551,628 B2 | 2/2020 | Karafin et al. |
| 10,860,142 B1 | 12/2020 | Northcott et al. |
| 10,884,142 B2 | 1/2021 | Welker |
| 10,884,251 B2 | 1/2021 | Karafin et al. |
| 2002/0009261 A1 | 1/2002 | Bhagavatula et al. |
| 2002/0021501 A1 | 2/2002 | Kawashima et al. |
| 2002/0172478 A1 | 11/2002 | Sahlin |
| 2003/0026567 A1 | 2/2003 | Cryan et al. |
| 2004/0108806 A1 | 6/2004 | Cok et al. |
| 2005/0119575 A1 | 6/2005 | Ladabaum et al. |
| 2006/0146428 A1 | 7/2006 | Lim et al. |
| 2006/0165358 A1 | 7/2006 | Trebst et al. |
| 2006/0191566 A1 | 8/2006 | Schaafsma |
| 2006/0256415 A1 | 11/2006 | Holmes et al. |
| 2007/0091638 A1 | 4/2007 | Ijzerman et al. |
| 2007/0097108 A1 | 5/2007 | Brewer |
| 2007/0238296 A1 | 10/2007 | Shimizu |
| 2008/0023137 A1 | 1/2008 | Jiang et al. |
| 2008/0035834 A1 | 2/2008 | Gleckler |
| 2008/0144174 A1 | 6/2008 | Lucente et al. |
| 2008/0285125 A1 | 11/2008 | Lee et al. |
| 2009/0040294 A1 | 2/2009 | Smalley et al. |
| 2009/0085831 A1 | 4/2009 | Odoi et al. |
| 2009/0148098 A1 | 6/2009 | Lewis et al. |
| 2009/0164397 A1 | 6/2009 | Kwok |
| 2009/0235750 A1 | 9/2009 | Chang et al. |
| 2009/0247305 A1 | 10/2009 | Kanekal |
| 2009/0266992 A1 | 10/2009 | Beekman |
| 2009/0273538 A1 | 11/2009 | Smith et al. |
| 2009/0273575 A1 | 11/2009 | Pryor |
| 2010/0245824 A1 | 9/2010 | Schwarz et al. |
| 2010/0265457 A1 | 10/2010 | Chomyn et al. |
| 2010/0278480 A1 | 11/2010 | Vasylyev |
| 2011/0094269 A1 | 4/2011 | Mukasa |
| 2011/0114831 A1 | 5/2011 | Grier |
| 2011/0169832 A1 | 7/2011 | Brown et al. |
| 2012/0050562 A1 | 3/2012 | Perwass et al. |
| 2012/0050833 A1 | 3/2012 | Bove, Jr. et al. |
| 2012/0206390 A1 | 8/2012 | Ueno et al. |
| 2012/0268950 A1 | 10/2012 | Parkyn et al. |
| 2013/0088785 A1 | 4/2013 | Yamamoto |
| 2013/0127832 A1 | 5/2013 | Lee et al. |
| 2013/0140916 A1 | 6/2013 | Dunlap et al. |
| 2013/0163089 A1 | 6/2013 | Bohn |
| 2013/0195410 A1 | 8/2013 | Karbasivalashani et al. |
| 2014/0043370 A1 | 2/2014 | Payne et al. |
| 2014/0072141 A1 | 3/2014 | Cohen et al. |
| 2014/0126322 A1 | 5/2014 | Cipolla et al. |
| 2014/0132694 A1 | 5/2014 | Shacham et al. |
| 2014/0192087 A1 | 7/2014 | Frost |
| 2014/0253613 A1 | 9/2014 | Gilbert |
| 2014/0300694 A1 | 10/2014 | Smalley et al. |
| 2014/0300695 A1 | 10/2014 | Smalley et al. |
| 2014/0300709 A1 | 10/2014 | Futterer et al. |
| 2014/0307179 A1 | 10/2014 | Zhao et al. |
| 2014/0371353 A1 | 12/2014 | Mitchell et al. |
| 2015/0007025 A1 | 1/2015 | Sassi et al. |
| 2015/0016777 A1 | 1/2015 | Abovitz et al. |
| 2015/0022754 A1 | 1/2015 | Jepsen et al. |
| 2015/0185841 A1 | 7/2015 | Levesque et al. |
| 2015/0192995 A1 | 7/2015 | Subramanian et al. |
| 2015/0212274 A1 | 7/2015 | Kopp et al. |
| 2015/0219940 A1 | 8/2015 | Kim et al. |
| 2015/0247976 A1 | 9/2015 | Abovitz et al. |
| 2015/0277378 A1 | 10/2015 | Smithwick et al. |
| 2016/0014529 A1 | 1/2016 | Hecht et al. |
| 2016/0026253 A1 | 1/2016 | Bradski et al. |
| 2016/0070059 A1 | 3/2016 | Chen et al. |
| 2016/0175701 A1 | 6/2016 | Froy et al. |
| 2016/0179261 A1 | 6/2016 | Drumm |
| 2016/0209657 A1 | 7/2016 | Popovich et al. |
| 2016/0223988 A1 | 8/2016 | Bove et al. |
| 2016/0277843 A1 | 9/2016 | Babayoff et al. |
| 2016/0282808 A1 | 9/2016 | Smalley |
| 2017/0016996 A1 | 1/2017 | Welker et al. |
| 2018/0128973 A1 | 5/2018 | Powell et al. |
| 2018/0356591 A1 | 12/2018 | Karafin et al. |
| 2018/0372926 A1 | 12/2018 | Karafin et al. |
| 2018/0372958 A1 | 12/2018 | Karafin et al. |
| 2019/0004228 A1 | 1/2019 | Bevensee et al. |
| 2019/0004319 A1 | 1/2019 | Karafin et al. |

(56) References Cited

U.S. PATENT DOCUMENTS

| | | |
|---|---|---|
| 2019/0004326 A1 | 1/2019 | Karafin et al. |
| 2019/0011621 A1 | 1/2019 | Karafin et al. |
| 2020/0394791 A1 | 12/2020 | Pang et al. |
| 2021/0063766 A1 | 3/2021 | Karafin et al. |
| 2021/0253468 A1 | 8/2021 | Wood et al. |

FOREIGN PATENT DOCUMENTS

| | | |
|---|---|---|
| GB | 474564 A | 11/1937 |
| GB | 1399597 A | 7/1975 |
| GB | 2253070 A | 8/1992 |
| JP | H08179131 A | 7/1996 |
| JP | 2000347046 A | 12/2000 |
| JP | 2003330109 A | 11/2003 |
| JP | 2008052010 A | 3/2008 |
| JP | 2008058583 A | 3/2008 |
| JP | 2009169142 A | 7/2009 |
| JP | 2009169143 A | 7/2009 |
| JP | 2011090272 A | 5/2011 |
| JP | 2014142368 A | 8/2014 |
| JP | 2016518629 A | 6/2016 |
| KR | 101298848 B1 | 8/2013 |
| TW | 200402012 A | 2/2004 |
| TW | 200633258 A | 9/2006 |
| WO | 0106287 A1 | 1/2001 |
| WO | 2005057670 A2 | 6/2005 |
| WO | 2008093721 A1 | 8/2008 |
| WO | 2011158752 A1 | 12/2011 |
| WO | 2012029081 A1 | 3/2012 |
| WO | 2016007920 A1 | 1/2016 |

OTHER PUBLICATIONS

Choi et al., "Multiple-viewing-zone integral imaging using a dynamic barrier array for three-dimensional displays", Optics Express, vol. 11, No. 8, Apr. 21, 2003 (Apr. 21, 2003), p. 927.

EP-19738109.8 European Extended Search Report of European Patent Office dated Oct. 18, 2021.

EP-19738344.1 European Extended Search Report of European Patent Office dated Oct. 7, 2021.

EP-19738383.9 European Extended Search Report of European Patent Office dated Oct. 15, 2021.

JP2019-501531 Non-Final Notice of Reasons for Rejection of the Japan Patent Office dated Sep. 24, 2021.

Lewter, "Adjustable Slab Slump Molds—Electric Cone 6 & Other Ways w/ Clay", Oct. 2, 2017 (Oct. 2, 2017) pp. 1-3.

"Plastics—Vocabulary", International Organization for Standardization, Switzerland 1999, ISO 472 2013.

AU-2017296073 Examination Report No. 1 dated Aug. 15, 2018.
AU-2017296234 Examination Report No. 1 dated Jul. 19, 2018.
AU-2017296234 Examination Report No. 2 dated Sep. 24, 2018.
AU-2019200583 Examination Report No. 1 dated Oct. 17, 2019.
CN201780044006.0 First Office Action of the Chinese Patent Office dated Dec. 16, 2020.
CN201780044008.X First Office Action of the Chinese Patent Office dated Sep. 29, 2020.
EA-201892633 Office Action of the Eurasian Patent Office dated Aug. 10, 2020.

EP-17828596.1 European Extended Search Report of European Patent Office dated Mar. 23, 2020.
EP-17828613.4 European Extended Search Report of European Patent Office dated Mar. 6, 2020.
EP-17828622.5 European Extended Search Report of European Patent Office dated Mar. 6, 2020.
Gerald L., "Size of Letters Required for Visibility as a Function of Viewing Distance and Observer Visual Acuity," U.S. Department of Commerce/National Bureau of Statistics, Jul. 1983.
Hoshi, et al., "Noncontact tactile display based on radiation pressure of airborne ultrasound." IEEE Transactions on Haptics, vol. 3, No. 3 (2010): pp. 155-165.
International Preliminary Report on Patentability of PCT/US2017/042418 dated Mar. 25, 2019.
International Search Report and Written Opinion of PCT/US2016/023753 dated Jul. 15, 2016.
International Search Report and Written Opinion of PCT/US2017/042275 dated Dec. 4, 2017.
International Search Report and Written Opinion of PCT/US2017/042418 dated Dec. 20, 2017.
International Search Report and Written Opinion of PCT/US2017/042452 dated Nov. 17, 2017.
International Search Report and Written Opinion of PCT/US2019/013310 dated May 13, 2019.
International Search Report and Written Opinion of PCT/US2019/013399 dated Jun. 10, 2019.
International Search Report and Written Opinion of PCT/US2019/013552 dated May 2, 2019.
NZ-743822 Further Examination Report dated Jun. 11, 2019.
Plesniak, Coincident Display Using Haptics and Holographic Video, Spatial Imaging Group, pp. 18-23 (Year: 1998).
Smith, T.E., "Notebook for Spatial Data Analysis, Part I, Spatial Point Pattern Analysis", (2016) ESE 502, (http://www.seas.upenn.edu/~ese502/#notebook).
Watanabe, et al., "A Method for controlling tactile sensation of surfaces roughness using ultrasonic vibration." Robotics and Automation, 1995 Proceedings., 1995 IEEE International Conference on vol. 1. IEEE, 1995.
Wetzstein et al., "On Plenoptic Multiplexing and Reconstruction", International Journal on Computer Vision (IJCV, vol. 101, No. 2, (20130000), pp. 384-400, URL: https://hal.inria.fr/hal-00876493, (Sep. 26, 2017).
JP2019-501428 Non-Final Notice of Reasons for Rejection from the Japan Patent Office dated Aug. 3, 2021.
Davis et al., "Simulation of Anderson localization in a random fiber using a fast Fresnel diffraction algorithm", Optical Engineering, Soc. of Photo-Optical Instrumentation Engineers, Bellingham, vol. 55, No. 6, Jun. 1, 2016 (Jun. 1, 2016), p. 66122.
EP-17828613.4 European Exam Report of European Patent Office dated Aug. 16, 2021.
Karbasi et al., "Image transport using Anderson localized modes in disordered optical fibers", Proeedings of SPIE, IEEE, US, vol. 8992, Mar. 8, 2014 (Mar. 8, 2014), pp. 89920J-89920J.
Mafi et al., "Anderson localisation in fibres", 2014 The European Conference on Optical Communication (ECOC), Systematic Paris Region Systems and ICT Cluster, Sep. 21, 2014 (Sep. 21, 2014), pp. 1-3.
Mafi, "Transverse Anderson localization of light: a tutorial", Advances in Optics and Photonics, vol. 7, No. 3, Sep. 30, 2015 (Sep. 30, 2015), p. 459.
TW106123878 Office Action of the Taiwan Patent Office dated Nov. 15, 2021.

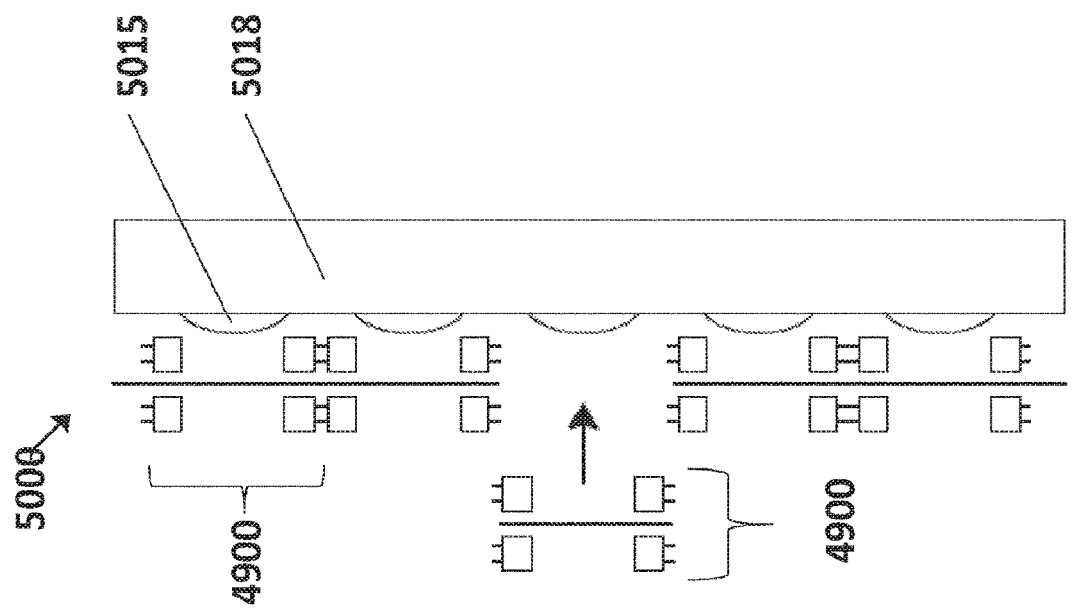
FIG. 50
FIG. 49
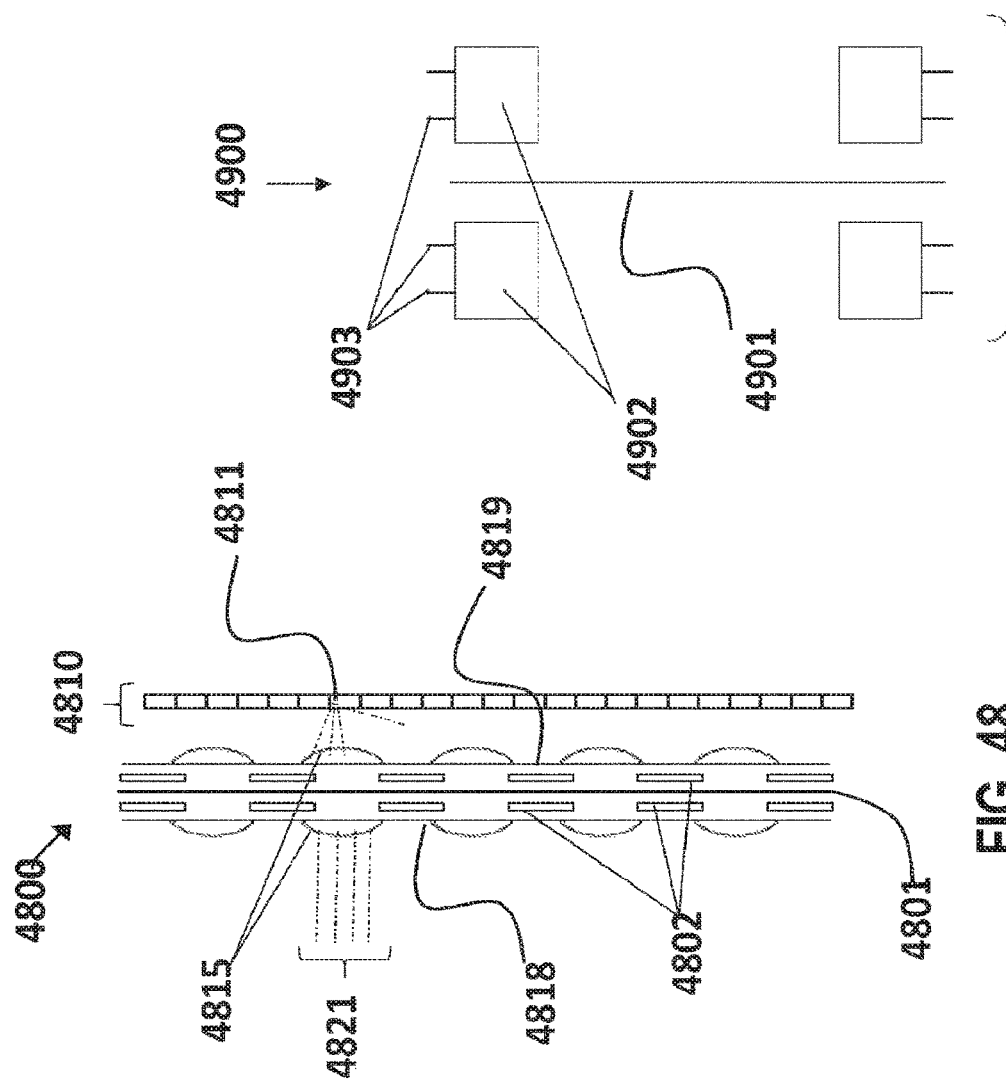
FIG. 48

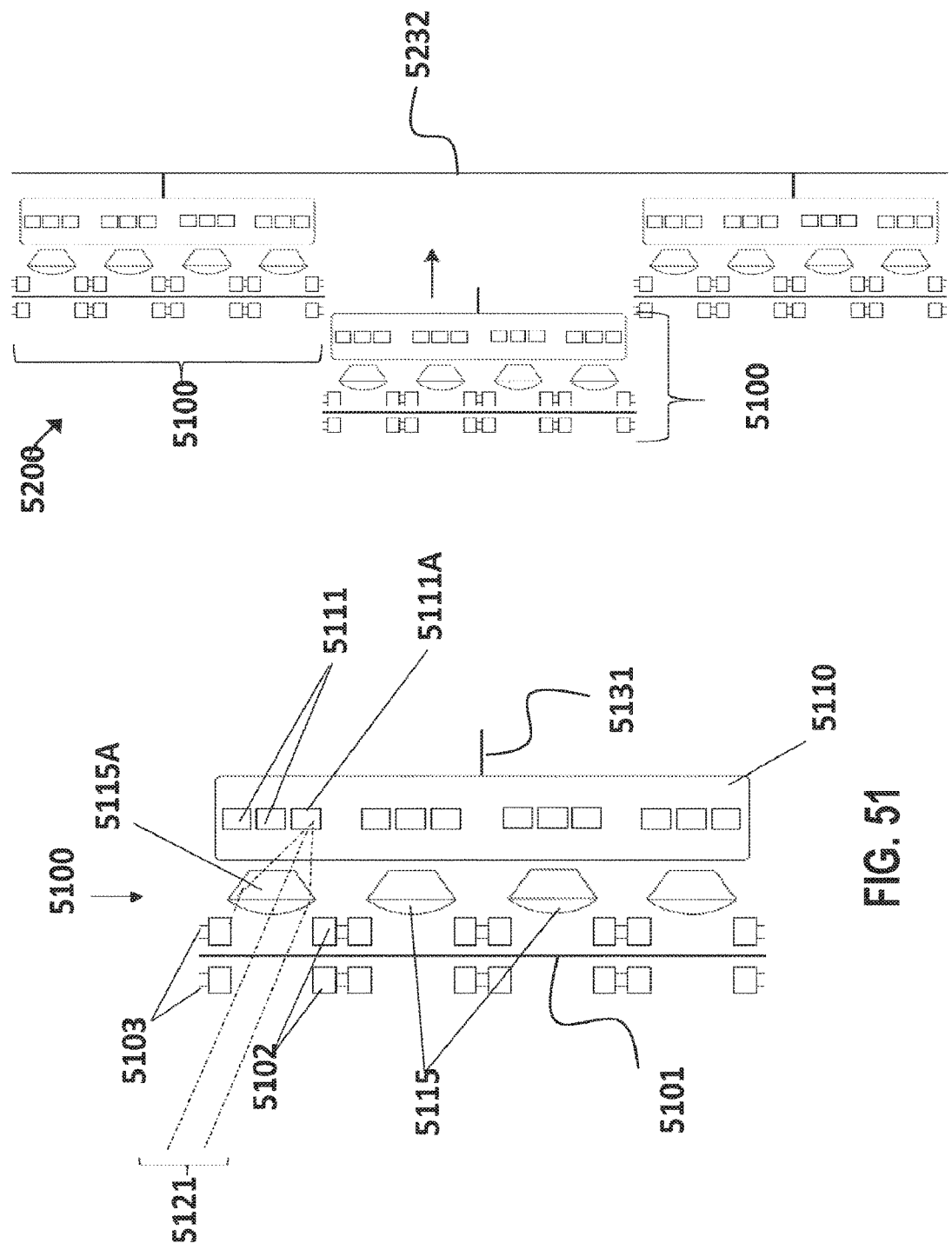

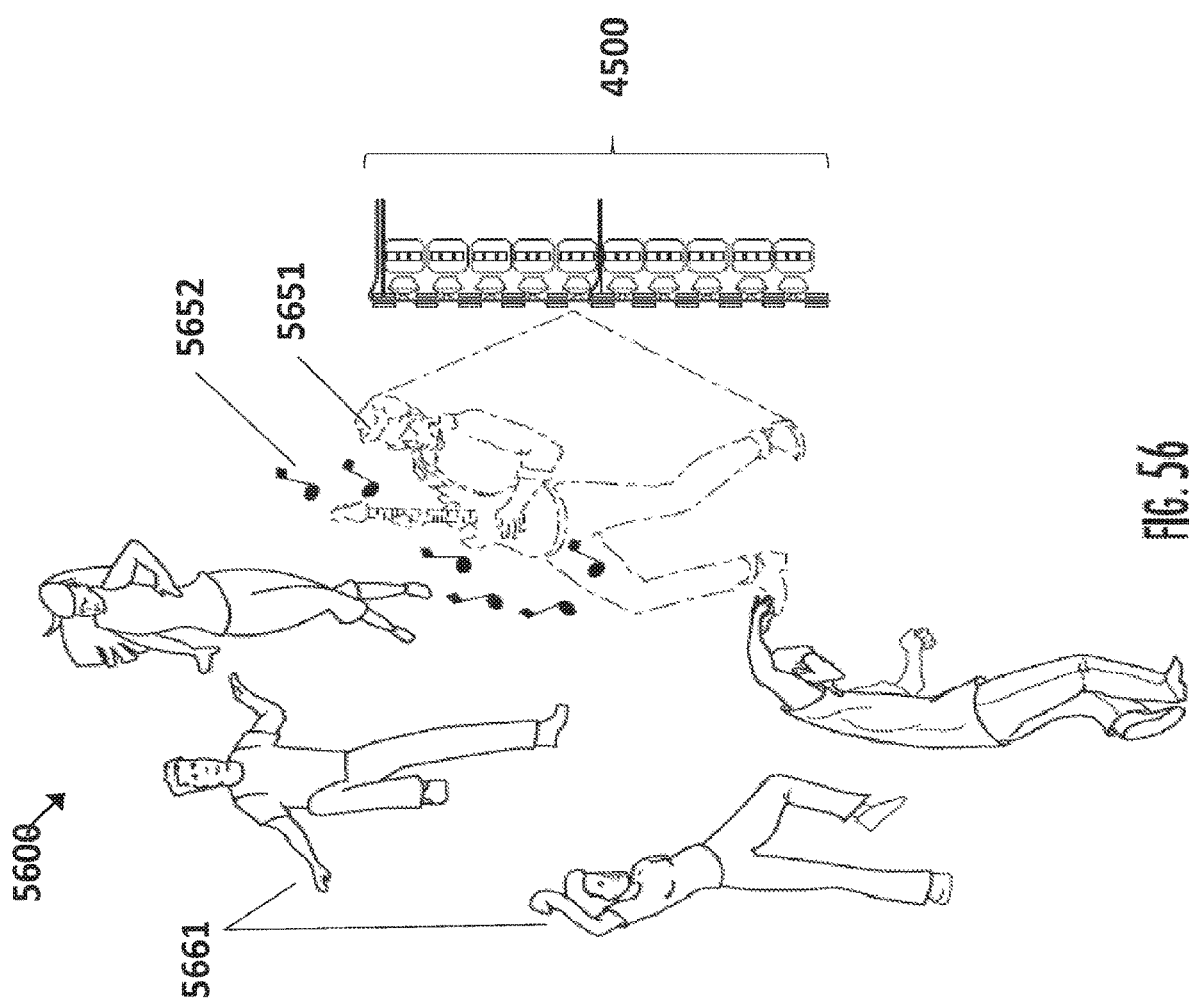

SYSTEMS AND METHODS FOR DIRECTING MULTIPLE 4D ENERGY FIELDS

CROSS-REFERENCE TO RELATED APPLICATIONS

This Application claims the benefit of priority to U.S. Provisional Patent Application No. 62/617,288, entitled "System and Methods for Transverse Energy Localization in Energy Relays Using Ordered Structures," filed Jan. 14, 2018, and to U.S. Provisional Patent Application No. 62/617,293, entitled "Novel Application of Holographic and Light Field Technology," filed Jan. 14, 2018, which are both herein incorporated by reference in their entirety.

TECHNICAL FIELD

This disclosure generally relates to light field energy systems, and more specifically, to systems of transverse localization of energy in energy relays using ordered material distributions and methods of manufacturing energy relays thereof.

BACKGROUND

The dream of an interactive virtual world within a "holodeck" chamber as popularized by Gene Roddenberry's Star Trek and originally envisioned by author Alexander Moszkowski in the early 1900s has been the inspiration for science fiction and technological innovation for nearly a century. However, no compelling implementation of this experience exists outside of literature, media, and the collective imagination of children and adults alike.

SUMMARY

Disclosed are systems and methods for manufacturing of energy directing systems for directing energy of multiple energy domains. Energy relays and energy waveguides are disclosed for directing multiple energy domains. Systems are disclosed for projecting and sensing 4D energy-fields comprising multiple energy domains.

In an embodiment, an energy relay comprises: a first module and a second module, the first module comprising an arrangement of first component engineered structures and second component engineered structures in a transverse plane of the energy relay, and the second module comprising an arrangement of third component engineered structures and fourth component engineered structures in the transverse plane of the energy relay; wherein the first and second component engineered structures are both configured to transport energy belonging to a first energy domain along a longitudinal plane that is normal to the transverse plane, and the third and fourth component engineered structures are both configured to transport energy belonging to a second energy domain, different from the first energy domain, along the longitudinal plane that is normal to the transverse plane, the first module having substantially higher transport efficiency in the longitudinal plane than in the transverse plane for the first energy domain, and the second module having substantially higher transport efficiency in the longitudinal plane than in the transverse plane for the second energy domain.

In an embodiment, an energy relay comprises: a first module comprising an arrangement of first component engineered structures and second component engineered structures in a transverse plane of the energy relay; and an energy relay material; wherein the first module and the energy relay material are distributed across the transverse plane of the energy relay; wherein the first and second component engineered structures are both configured to transport energy belonging to a first energy domain along a longitudinal plane that is normal to the transverse plane, and the energy relay material is configured to transport energy belonging to a second energy domain, different from the first energy domain, along the longitudinal plane that is normal to the transverse plane, the first module having substantially higher transport efficiency in the longitudinal plane than in the transverse plane for the first energy domain, and the energy relay material having substantially higher transport efficiency in the longitudinal plane than in the transverse plane for the second energy domain.

In an embodiment, a method of forming an energy relay comprises: providing a first energy relay material configured to transport energy belonging to a first energy domain along a longitudinal plane of the energy relay; forming one or more mechanical openings in the first energy relay material, the one or more mechanical openings being substantially oriented along the longitudinal plane; integrating a second energy relay material into the one or more mechanical openings, the second energy relay material configured to transport energy belonging to a second energy domain, different than the first energy domain, along the longitudinal plane of the energy relay; wherein the energy relay has substantially higher transport efficiency in the longitudinal plane than in a transverse plane, normal to the longitudinal plane, for the first and second energy domains.

In an embodiment, a method for forming an energy relay comprises: providing a plurality of first and second energy relay materials configured to transport energy belonging to first and second energy domains, respectively, along a longitudinal plane of the energy relay; arranging the plurality of first and second energy relay materials in a substantially non-random pattern in a transverse plane of the energy relay, normal to the longitudinal plane; processing the arrangement of first and second energy relay materials into a fused structure while maintaining the substantially non-random pattern of first and second energy relay materials in the transverse plane of the energy relay; and wherein the energy relay has substantially higher energy transport efficiency in the longitudinal plane than in the transverse plane.

In an embodiment, an energy-directing system comprises: an energy relay device comprising first and second energy relay materials, the first energy relay materials are configured to transport energy belonging to a first energy domain, and the second energy relay materials are configured to transport energy belonging to a second energy domain, different from the first energy domain; wherein the energy relay device comprises a first surface, a second surface, and a third surface, the energy relay configured to relay energy of the first domain along a first plurality of energy propagation paths extending through the first and second surfaces, and to relay energy of the second domain along a second plurality of energy propagation paths extending through the first and third surfaces; wherein the first and second pluralities of energy propagation paths are interleaved at the first surface forming a plurality of first energy locations of the first energy domain and a plurality of second energy locations of the second energy domain along the first surface; and the energy-directing system further comprising an array of waveguides configured to direct energy to or from the pluralities of first and second energy locations.

In an embodiment, an energy directing system comprises: an energy surface comprising a plurality of first energy locations configured to direct a first energy from the energy surface; an energy device comprising one or more conductive diaphragms mounted between one or more pairs of electrically conductive planes comprising a plurality of apertures; wherein the energy device is located adjacent to the energy surface and extends across at least a portion of a surface of the energy surface, the plurality of apertures being substantially coincident with the plurality of first energy locations; wherein the one or more conductive diaphragms are substantially transmissive of the first energy directed from the energy surface; and wherein the one or more pairs of electrically conductive planes are configured to move the one or more conductive diaphragms to thereby produce a second energy directed from the energy device.

In an embodiment, an energy system comprises: an array of waveguides, each waveguide comprising one or more elements disposed on separate substrates, each waveguide comprising at least one aperture; an energy device comprising one or more conductive diaphragms mounted between one or more pairs of electrically conductive planes comprising a plurality of energy apertures; wherein the plurality of energy apertures are substantially coincident with the plurality of waveguide apertures; wherein the energy device is configured to be accommodated between the separate substrates of the array of waveguides.

In an embodiment, an energy directing system comprises: an energy source system configured to produce at least a first energy at a plurality of energy locations; an array of waveguides, wherein each waveguide of the array of waveguides is configured to receive the at least first energy from a corresponding subset of the plurality of energy locations to substantially fill an aperture of each waveguide, and to direct the at least first energy along a plurality of propagation paths determined in part by the corresponding subset of the plurality of energy locations; and an energy device comprising one or more conductive diaphragms mounted between one or more pairs of electrically conductive planes comprising a plurality of apertures; wherein the energy device is located adjacent to the array of waveguides and extends across at least a portion of the array of waveguides, the plurality of apertures of the energy device being substantially coincident with the apertures of the array of waveguides; wherein the one or more conductive diaphragms are substantially transmissive of the at least first energy directed along the plurality of propagation paths; and wherein, the energy device is configured such that, as a voltage is applied across the one or more pairs of electrically conductive planes, the one or more pairs of electrically conductive planes induce a movement of the one or more conductive diaphragms, thereby producing a second energy directed in coordination with the plurality of propagation paths.

BRIEF DESCRIPTION OF THE DRAWINGS

FIG. 48 illustrates an orthogonal view of a portion of a 4D energy projection system which integrates the perforated conductive elements of an electrostatic speaker as energy inhibiting elements within a waveguide array structure, between multiple layers of waveguide elements;

FIG. 49 illustrates an orthogonal view of an embodiment of one module of a modular electrostatic speaker system;

FIG. 50 illustrates an orthogonal view of an embodiment of several electrostatic speaker modules placed in an assembly disposed in front of an array of waveguides mounted on a waveguide substrate;

FIG. 51 illustrates an orthogonal view of an embodiment of a modular 4D energy field package that projects a 4D energy field as well as vibrational sound waves produced by an electrostatic speaker;

FIG. 52 illustrates an orthogonal view of an embodiment of a modular energy-projecting wall consisting of several 4D energy field packages with electrostatic speakers 5100 mounted onto a wall;

FIG. 56 illustrates a perspective view of an embodiment of a scene containing dancers in front of a light field display equipped with an integrated electrostatic speaker, which is projecting a holographic musician and simultaneously playing music;

DETAILED DESCRIPTION

Figure 1:
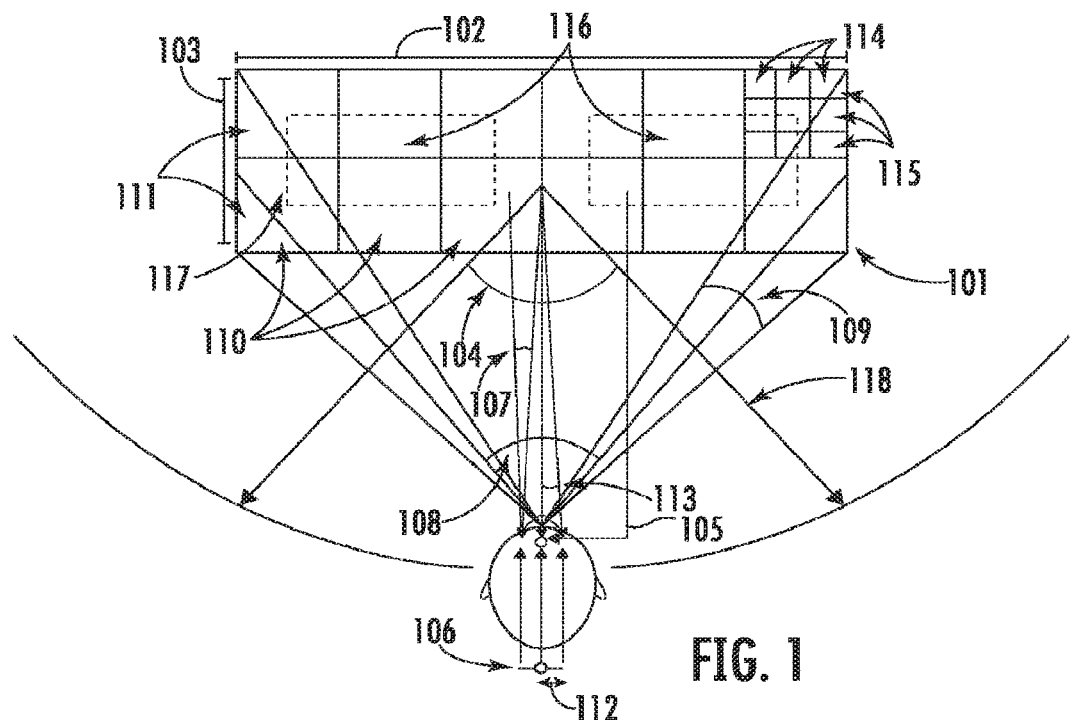
FIG. 1 is a schematic diagram illustrating design parameters for an energy directing system.

An embodiment of a Holodeck (collectively called "Holodeck Design Parameters") provide sufficient energy stimulus to fool the human sensory receptors into believing that received energy impulses within a virtual, social and interactive environment are real, providing: 1) binocular disparity without external accessories, head-mounted eyewear, or other peripherals; 2) accurate motion parallax, occlusion and opacity throughout a viewing volume simultaneously for any number of viewers; 3) visual focus through synchronous convergence, accommodation and miosis of the eye for all perceived rays of light; and 4) converging energy wave propagation of sufficient density and resolution to exceed the human sensory "resolution" for vision, hearing, touch, taste, smell, and/or balance.

Based upon conventional technology to date, we are decades, if not centuries away from a technology capable of providing for all receptive fields in a compelling way as suggested by the Holodeck Design Parameters including the visual, auditory, somatosensory, gustatory, olfactory, and vestibular systems.

In this disclosure, the terms light field and holographic may be used interchangeably to define the energy propagation for stimulation of any sensory receptor response. While initial disclosures may refer to examples of electromagnetic and mechanical energy propagation through energy surfaces for holographic imagery and volumetric haptics, all forms of sensory receptors are envisioned in this disclosure. Furthermore, the principles disclosed herein for energy propagation along propagation paths may be applicable to both energy emission and energy capture.

Many technologies exist today that are often unfortunately confused with holograms including lenticular printing, Pepper's Ghost, glasses-free stereoscopic displays, horizontal parallax displays, head-mounted VR and AR displays (HIVID), and other such illusions generalized as "fauxlography." These technologies may exhibit some of the desired properties of a true holographic display, however, lack the ability to stimulate the human visual sensory response in any way sufficient to address at least two of the four identified Holodeck Design Parameters.

These challenges have not been successfully implemented by conventional technology to produce a seamless energy surface sufficient for holographic energy propagation. There are various approaches to implementing volumetric and direction multiplexed light field displays including parallax barriers, hogels, voxels, diffractive optics, multi-view projection, holographic diffusers, rotational mirrors, multilayered displays, time sequential displays, head mounted display, etc., however, conventional approaches may involve a compromise on image quality, resolution, angular sampling density, size, cost, safety, frame rate, etc., ultimately resulting in an unviable technology.

To achieve the Holodeck Design Parameters for the visual, auditory, somatosensory systems, the human acuity of each of the respective systems is studied and understood to propagate energy waves to sufficiently fool the human sensory receptors. The visual system is capable of resolving to approximately 1 arc min, the auditory system may distinguish the difference in placement as little as three degrees, and the somatosensory systems at the hands are capable of discerning points separated by 2-12 mm. While there are various and conflicting ways to measure these acuities, these values are sufficient to understand the systems and methods to stimulate perception of energy propagation.

Of the noted sensory receptors, the human visual system is by far the most sensitive given that even a single photon can induce sensation. For this reason, much of this introduction will focus on visual energy wave propagation, and vastly lower resolution energy systems coupled within a disclosed energy waveguide surface may converge appropriate signals to induce holographic sensory perception. Unless otherwise noted, all disclosures apply to all energy and sensory domains.

When calculating for effective design parameters of the energy propagation for the visual system given a viewing volume and viewing distance, a desired energy surface may be designed to include many gigapixels of effective energy location density. For wide viewing volumes, or near field viewing, the design parameters of a desired energy surface may include hundreds of gigapixels or more of effective energy location density. By comparison, a desired energy source may be designed to have 1 to 250 effective megapixels of energy location density for ultrasonic propagation of volumetric haptics or an array of 36 to 3,600 effective energy locations for acoustic propagation of holographic sound depending on input environmental variables. What is important to note is that with a disclosed bi-directional energy surface architecture, all components may be configured to form the appropriate structures for any energy domain to enable holographic propagation.

However, the main challenge to enable the Holodeck today involves available visual technologies and electromagnetic device limitations. Acoustic and ultrasonic devices are less challenging given the orders of magnitude difference in desired density based upon sensory acuity in the respective receptive field, although the complexity should not be underestimated. While holographic emulsion exists with resolutions exceeding the desired density to encode interference patterns in static imagery, state-of-the-art display devices are limited by resolution, data throughput and manufacturing feasibility. To date, no singular display device has been able to meaningfully produce a light field having near holographic resolution for visual acuity.

Production of a single silicon-based device capable of meeting the desired resolution for a compelling light field display may not practical and may involve extremely complex fabrication processes beyond the current manufacturing capabilities. The limitation to tiling multiple existing display devices together involves the seams and gap formed by the physical size of packaging, electronics, enclosure, optics and a number of other challenges that inevitably result in an unviable technology from an imaging, cost and/or a size standpoint.

The embodiments disclosed herein may provide a real-world path to building the Holodeck.

Example embodiments will now be described hereinafter with reference to the accompanying drawings, which form a part hereof, and which illustrate example embodiments which may be practiced. As used in the disclosures and the appended claims, the terms "embodiment", "example embodiment", and "exemplary embodiment" do not necessarily refer to a single embodiment, although they may, and various example embodiments may be readily combined and interchanged, without departing from the scope or spirit of example embodiments. Furthermore, the terminology as used herein is for the purpose of describing example embodiments only and is not intended to be limitations. In this respect, as used herein, the term "in" may include "in" and "on", and the terms "a," "an" and "the" may include singular and plural references. Furthermore, as used herein, the term "by" may also mean "from", depending on the context. Furthermore, as used herein, the term "if" may also mean "when" or "upon," depending on the context. Furthermore, as used herein, the words "and/or" may refer to and encompass any and all possible combinations of one or more of the associated listed items.

Holographic System Considerations

Overview of Light Field Energy Propagation Resolution

Light field and holographic display is the result of a plurality of projections where energy surface locations provide angular, color and intensity information propagated within a viewing volume. The disclosed energy surface provides opportunities for additional information to coexist and propagate through the same surface to induce other sensory system responses. Unlike a stereoscopic display, the viewed position of the converged energy propagation paths in space do not vary as the viewer moves around the viewing volume and any number of viewers may simultaneously see propagated objects in real-world space as if it was truly there. In some embodiments, the propagation of energy may be located in the same energy propagation path but in opposite directions. For example, energy emission and energy capture along an energy propagation path are both possible in some embodiments of the present disclosed.

FIG. 1 is a schematic diagram illustrating variables relevant for stimulation of sensory receptor response. These variables may include surface diagonal 101, surface width 102, surface height 103, a determined target seating distance 118, the target seating field of view field of view from the center of the display 104, the number of intermediate samples demonstrated here as samples between the eyes 105, the average adult inter-ocular separation 106, the average resolution of the human eye in arcmin 107, the horizontal field of view formed between the target viewer location and the surface width 108, the vertical field of view formed between the target viewer location and the surface height 109, the resultant horizontal waveguide element resolution, or total number of elements, across the surface 110, the resultant vertical waveguide element resolution, or total number of elements, across the surface 111, the sample distance based upon the inter-ocular spacing between the eyes and the number of intermediate samples for angular projection between the eyes 112, the angular sampling may be based upon the sample distance and the target seating distance 113, the total resolution Horizontal per waveguide element derived from the angular sampling desired 114, the total resolution Vertical per waveguide element derived from the angular sampling desired 115, device Horizontal is the count of the determined number of discreet energy sources desired 116, and device Vertical is the count of the determined number of discreet energy sources desired 117.

A method to understand the desired minimum resolution may be based upon the following criteria to ensure sufficient stimulation of visual (or other) sensory receptor response: surface size (e.g., 84" diagonal), surface aspect ratio (e.g., 16:9), seating distance (e.g., 128" from the display), seating field of view (e.g., 120 degrees or +/−60 degrees about the center of the display), desired intermediate samples at a distance (e.g., one additional propagation path between the eyes), the average inter-ocular separation of an adult (approximately 65 mm), and the average resolution of the human eye (approximately 1 arcmin). These example values should be considered placeholders depending on the specific application design parameters.

Further, each of the values attributed to the visual sensory receptors may be replaced with other systems to determine desired propagation path parameters. For other energy propagation embodiments, one may consider the auditory system's angular sensitivity as low as three degrees, and the somatosensory system's spatial resolution of the hands as small as 2-12 mm.

While there are various and conflicting ways to measure these sensory acuities, these values are sufficient to understand the systems and methods to stimulate perception of virtual energy propagation. There are many ways to consider the design resolution, and the below proposed methodology combines pragmatic product considerations with the biological resolving limits of the sensory systems. As will be appreciated by one of ordinary skill in the art, the following overview is a simplification of any such system design, and should be considered for exemplary purposes only.

With the resolution limit of the sensory system understood, the total energy waveguide element density may be calculated such that the receiving sensory system cannot discern a single energy waveguide element from an adjacent element, given:

$$\text{Surface Aspect Ratio} = \frac{\text{Width } (W)}{\text{Height } (H)}$$

$$\text{Surface Horizontal Size} = \text{Surface Diagonal} * \left( \frac{1}{\sqrt{\left(1 + \left(\frac{H}{W}\right)^2\right)}} \right)$$

$$\text{Surface Vertical Size} = \text{Surface Diagonal} * \left( \frac{1}{\sqrt{\left(1 + \left(\frac{W}{H}\right)^2\right)}} \right)$$

$$\text{Horizontal Field of View} = 2 * \text{atan}\left( \frac{\text{Surface Horizontal Size}}{2 * \text{Seating Distance}} \right)$$

$$\text{Vertical Field of View} = 2 * \text{atan}\left( \frac{\text{Surface Verticle Size}}{2 * \text{Seating Distance}} \right)$$

-continued $$\text{Horizontal Element Resolution} = FoV * \frac{60}{\text{Eye Resolution}}$$

$$\text{Vertical Element Resolution} = FoV * \frac{60}{\text{Eye Resolution}}$$

The above calculations result in approximately a 32×18° field of view resulting in approximately 1920×1080 (rounded to nearest format) energy waveguide elements being desired. One may also constrain the variables such that the field of view is consistent for both (u, v) to provide a more regular spatial sampling of energy locations (e.g. pixel aspect ratio). The angular sampling of the system assumes a defined target viewing volume location and additional propagated energy paths between two points at the optimized distance, given:

$$\text{Sample Distance} = \frac{\text{Inter} - \text{Ocular Distance}}{(\text{Number of Desired Intermediate Samples} + 1)}$$

$$\text{Angular Sampling} = \operatorname{atan}\left(\frac{\text{Sample Distance}}{\text{Seating Distance}}\right)$$

In this case, the inter-ocular distance is leveraged to calculate the sample distance although any metric may be leveraged to account for appropriate number of samples as a given distance. With the above variables considered, approximately one ray per 0.57° may be desired and the total system resolution per independent sensory system may be determined, given:

$$\text{Locations Per Element } (N) = \frac{\text{Seating } FoV}{\text{Angular Sampling}}$$

$$\text{Total Resolution } H = N * \text{Horizontal Element Resolution}$$

$$\text{Total Resolution } V = N * \text{Vertical Element Resolution}$$

With the above scenario given the size of energy surface and the angular resolution addressed for the visual acuity system, the resultant energy surface may desirably include approximately 400k×225k pixels of energy resolution locations, or 90 gigapixels holographic propagation density. These variables provided are for exemplary purposes only and many other sensory and energy metrology considerations should be considered for the optimization of holographic propagation of energy. In an additional embodiment, 1 gigapixel of energy resolution locations may be desired based upon the input variables. In an additional embodiment, 1,000 gigapixels of energy resolution locations may be desired based upon the input variables.

Current Technology Limitations

Active Area, Device Electronics, Packaging, and the Mechanical Envelope

Figure 2:
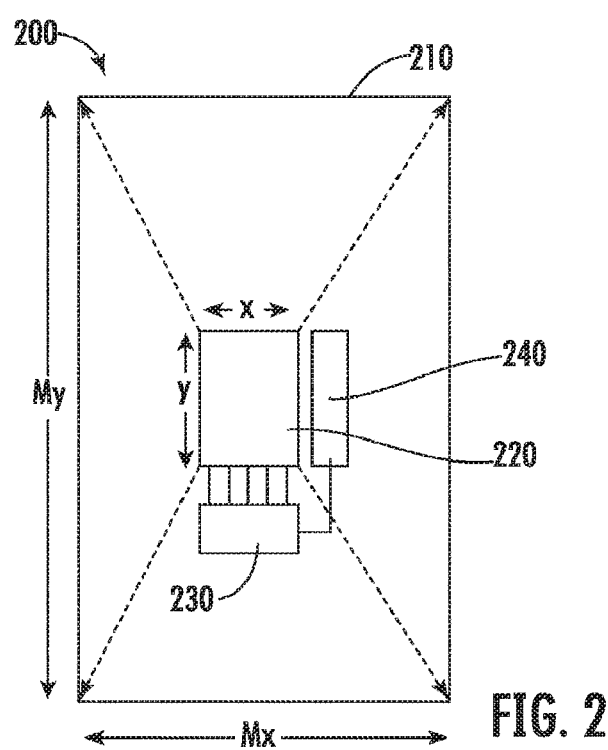
FIG. 2 is a schematic diagram illustrating an energy system having an active device area with a mechanical envelope.

FIG. 2 illustrates a device 200 having an active area 220 with a certain mechanical form factor. The device 200 may include drivers 230 and electronics 240 for powering and interface to the active area 220, the active area having a dimension as shown by the x and y arrows. This device 200 does not take into account the cabling and mechanical structures to drive, power and cool components, and the mechanical footprint may be further minimized by introducing a flex cable into the device 200. The minimum footprint for such a device 200 may also be referred to as a mechanical envelope 210 having a dimension as shown by the M:x and M:y arrows. This device 200 is for illustration purposes only and custom electronics designs may further decrease the mechanical envelope overhead, but in almost all cases may not be the exact size of the active area of the device. In an embodiment, this device 200 illustrates the dependency of electronics as it relates to active image area 220 for a micro OLED, DLP chip or LCD panel, or any other technology with the purpose of image illumination.

In some embodiments, it may also be possible to consider other projection technologies to aggregate multiple images onto a larger overall display. However, this may come at the cost of greater complexity for throw distance, minimum focus, optical quality, uniform field resolution, chromatic aberration, thermal properties, calibration, alignment, additional size or form factor. For most practical applications, hosting tens or hundreds of these projection sources 200 may result in a design that is much larger with less reliability.

For exemplary purposes only, assuming energy devices with an energy location density of 3840×2160 sites, one may determine the number of individual energy devices (e.g., device 100) desired for an energy surface, given:

$$\text{Devices } H = \frac{\text{Total Resolution } H}{\text{Device Resolution } H}$$

$$\text{Devices } V = \frac{\text{Total Resolution } V}{\text{Device Resolution } V}$$

Given the above resolution considerations, approximately 105×105 devices similar to those shown in FIG. 2 may be desired. It should be noted that many devices consist of various pixel structures that may or may not map to a regular grid. In the event that there are additional sub-pixels or locations within each full pixel, these may be exploited to generate additional resolution or angular density. Additional signal processing may be used to determine how to convert the light field into the correct (u,v) coordinates depending on the specified location of the pixel structure(s) and can be an explicit characteristic of each device that is known and calibrated. Further, other energy domains may involve a different handling of these ratios and device structures, and those skilled in the art will understand the direct intrinsic relationship between each of the desired frequency domains. This will be shown and discussed in more detail in subsequent disclosure.

The resulting calculation may be used to understand how many of these individual devices may be desired to produce a full resolution energy surface. In this case, approximately 105×105 or approximately 11,080 devices may be desired to achieve the visual acuity threshold. The challenge and novelty exists within the fabrication of a seamless energy surface from these available energy locations for sufficient sensory holographic propagation.

Summary of Seamless Energy Surfaces

Configurations and Designs for Arrays of Energy Relays

In some embodiments, approaches are disclosed to address the challenge of generating high energy location density from an array of individual devices without seams due to the limitation of mechanical structure for the devices. In an embodiment, an energy propagating relay system may allow for an increase the effective size of the active device area to meet or exceed the mechanical dimensions to configure an array of relays and form a singular seamless energy surface.

Figure 3:
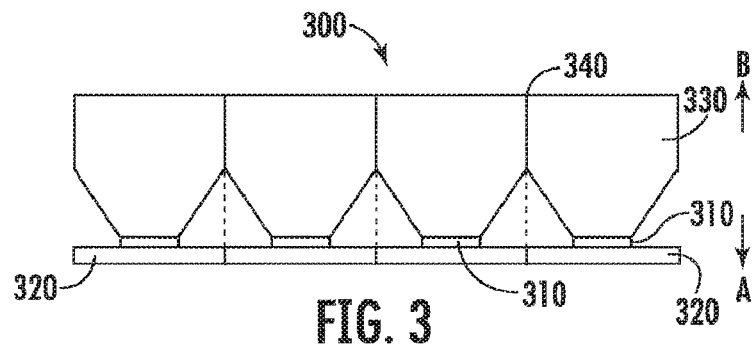
FIG. 3 is a schematic diagram illustrating an energy relay system.

FIG. 3 illustrates an embodiment of such an energy relay system 300. As shown, the relay system 300 may include a device 310 mounted to a mechanical envelope 320, with an energy relay element 330 propagating energy from the device 310. The relay element 330 may be configured to provide the ability to mitigate any gaps 340 that may be produced when multiple mechanical envelopes 320 of the device are placed into an array of multiple devices 310.

For example, if a device's active area 310 is 20 mm×10 mm and the mechanical envelope 320 is 40 mm×20 mm, an energy relay element 330 may be designed with a magnification of 2:1 to produce a tapered form that is approximately 20 mm×10 mm on a minified end (arrow A) and 40 mm×20 mm on a magnified end (arrow B), providing the ability to align an array of these elements 330 together seamlessly without altering or colliding with the mechanical envelope 320 of each device 310. Mechanically, the relay elements 330 may be bonded or fused together to align and polish ensuring minimal seam gap 340 between devices 310. In one such embodiment, it is possible to achieve a seam gap 340 smaller than the visual acuity limit of the eye.

Figures 4, 5A, 5B:
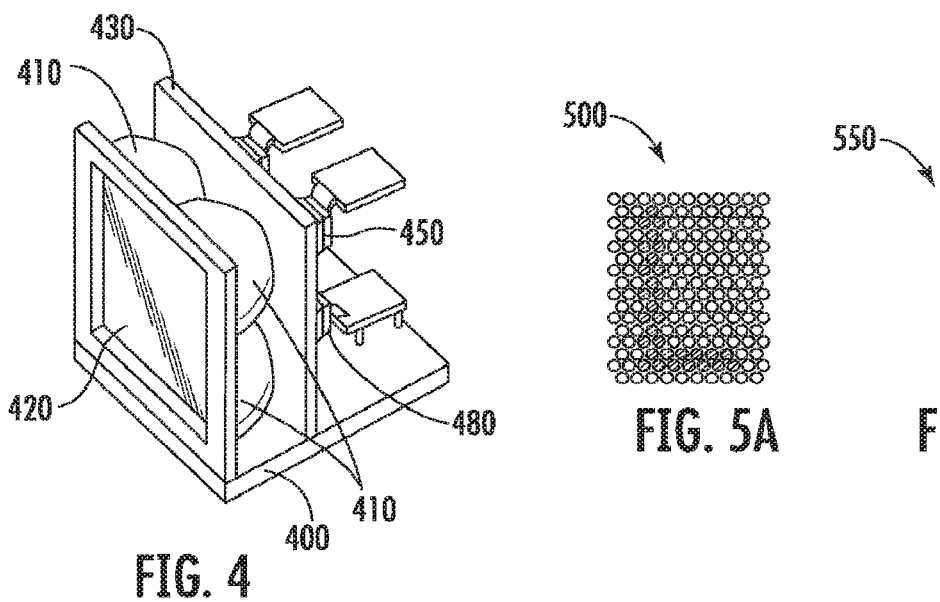
FIG. 4 is a schematic diagram illustrating an embodiment of energy relay elements adhered together and fastened to a base structure.
FIG. 5A is a schematic diagram illustrating an example of a relayed image through multi-core optical fibers.
FIG. 5B is a schematic diagram illustrating an example of a relayed image through an optical relay that exhibits the properties of the Transverse Anderson Localization principle.

FIG. 4 illustrates an example of a base structure 400 having energy relay elements 410 formed together and securely fastened to an additional mechanical structure 430. The mechanical structure of the seamless energy surface 420 provides the ability to couple multiple energy relay elements 410, 450 in series to the same base structure through bonding or other mechanical processes to mount relay elements 410, 450. In some embodiments, each relay element 410 may be fused, bonded, adhered, pressure fit, aligned or otherwise attached together to form the resultant seamless energy surface 420. In some embodiments, a device 480 may be mounted to the rear of the relay element 410 and aligned passively or actively to ensure appropriate energy location alignment within the determined tolerance is maintained.

In an embodiment, the seamless energy surface comprises one or more energy locations and one or more energy relay element stacks comprise a first and second side and each energy relay element stack is arranged to form a singular seamless display surface directing energy along propagation paths extending between one or more energy locations and the seamless display surface, and where the separation between the edges of any two adjacent second sides of the terminal energy relay elements is less than the minimum perceptible contour as defined by the visual acuity of a human eye having better than 20/40 vision at a distance greater than the width of the singular seamless display surface.

In an embodiment, each of the seamless energy surfaces comprise one or more energy relay elements each with one or more structures forming a first and second surface with a transverse and longitudinal orientation. The first relay surface has an area different than the second resulting in positive or negative magnification and configured with explicit surface contours for both the first and second surfaces passing energy through the second relay surface to substantially fill a +/−10-degree angle with respect to the normal of the surface contour across the entire second relay surface.

In an embodiment, multiple energy domains may be configured within a single, or between multiple energy relays to direct one or more sensory holographic energy propagation paths including visual, acoustic, tactile or other energy domains.

In an embodiment, the seamless energy surface is configured with energy relays that comprise two or more first sides for each second side to both receive and emit one or more energy domains simultaneously to provide bi-directional energy propagation throughout the system.

In an embodiment, the energy relays are provided as loose coherent elements.

Introduction to Component Engineered Structures

Disclosed Advances in Transverse Anderson Localization Energy Relays

The properties of energy relays may be significantly optimized according to the principles disclosed herein for energy relay elements that induce Transverse Anderson Localization. Transverse Anderson Localization is the propagation of a ray transported through a transversely disordered but longitudinally consistent material.

This implies that the effect of the materials that produce the Anderson Localization phenomena may be less impacted by total internal reflection than by the randomization between multiple-scattering paths where wave interference can completely limit the propagation in the transverse orientation while continuing in the longitudinal orientation.

Of significant additional benefit is the elimination of the cladding of traditional multi-core optical fiber materials. The cladding is to functionally eliminate the scatter of energy between fibers, but simultaneously act as a barrier to rays of energy thereby reducing transmission by at least the core to clad ratio (e.g., a core to clad ratio of 70:30 will transmit at best 70% of received energy transmission) and additionally forms a strong pixelated patterning in the propagated energy.

FIG. 5A illustrates an end view of an example of one such non-Anderson Localization energy relay 500, wherein an image is relayed through multi-core optical fibers where pixilation and fiber noise may be exhibited due to the intrinsic properties of the optical fibers. With traditional multi-mode and multi-core optical fibers, relayed images may be intrinsically pixelated due to the properties of total internal reflection of the discrete array of cores where any cross-talk between cores will reduce the modulation transfer function and increase blurring. The resulting imagery produced with traditional multi-core optical fiber tends to have a residual fixed noise fiber pattern similar to those shown in FIG. 5A.

FIG. 5B, illustrates an example of the same relayed image 550 through an energy relay comprising materials that exhibit the properties of Transverse Anderson Localization, where the relayed pattern has a greater density grain structures as compared to the fixed fiber pattern from FIG. 5A. In an embodiment, relays comprising randomized microscopic component engineered structures induce Transverse Anderson Localization and transport light more efficiently with higher propagation of resolvable resolution than commercially available multi-mode glass optical fibers.

In an embodiment, a relay element exhibiting Transverse Anderson Localization may comprise a plurality of at least two different component engineered structures in each of three orthogonal planes arranged in a dimensional lattice and the plurality of structures form randomized distributions of material wave propagation properties in a transverse plane within the dimensional lattice and channels of similar values of material wave propagation properties in a longitudinal plane within the dimensional lattice, wherein energy waves propagating through the energy relay have higher transport efficiency in the longitudinal orientation versus the transverse orientation and are spatially localized in the transverse orientation.

In an embodiment, a randomized distribution of material wave propagation properties in a transverse plane within the dimensional lattice may lead to undesirable configurations due to the randomized nature of the distribution. A randomized distribution of material wave propagation properties may induce Anderson Localization of energy on average across the entire transverse plane, however limited areas of similar material wave propagation properties may form inadvertently as a result of the uncontrolled random distribution. For example, if the size of these local areas of similar wave propagation properties become too large relative to their intended energy transport domain, there may be a potential reduction in the efficiency of energy transport through the material.

In an embodiment, a relay may be formed from a randomized distribution of component engineered structures to transport visible light of a certain wavelength range by inducing Transverse Anderson Localization of the light. However, due to their random distribution, the structures may inadvertently arrange such that a continuous area of a single component engineered structure forms across the transverse plane which is multiple times larger than the wavelength of visible light. As a result, visible light propagating along the longitudinal axis of the large, continuous, single-material region may experience a lessened Transverse Anderson Localization effect and may suffer degradation of transport efficiency through the relay.

In an embodiment, it may be desirable to design an ordered distribution of material wave propagation properties in the transverse plane of an energy relay material. Such an ordered distribution would ideally induce an energy localization effect through methods similar to Transverse Anderson Localization, while minimizing potential reductions in transport efficiency due to abnormally distributed material properties inherently resulting from a random property distribution. Using an ordered distribution of material wave propagation properties to induce a transverse energy localization effect similar to that of Transverse Anderson Localization in an energy relay element will hereafter be referred to as Ordered Energy Localization.

In an embodiment, multiple energy domains may be configured within a single, or between multiple Ordered Energy Localization energy relays to direct one or more sensory holographic energy propagation paths including visual, acoustic, tactile or other energy domains.

In an embodiment, the seamless energy surface is configured with Ordered Energy Localization energy relays that comprise two or more first sides for each second side to both receive and emit one or more energy domains simultaneously to provide bi-directional energy propagation throughout the system.

In an embodiment, the Ordered Energy Localization energy relays are configured as loose coherent or flexible energy relay elements.

Considerations for 4D Plenoptic Functions

Selective Propagation of Energy Through Holographic Waveguide Arrays

As discussed above and herein throughout, a light field display system generally includes an energy source (e.g., illumination source) and a seamless energy surface configured with sufficient energy location density as articulated in the above discussion. A plurality of relay elements may be used to relay energy from the energy devices to the seamless energy surface. Once energy has been delivered to the seamless energy surface with the requisite energy location density, the energy can be propagated in accordance with a 4D plenoptic function through a disclosed energy waveguide system. As will be appreciated by one of ordinary skill in the art, a 4D plenoptic function is well known in the art and will not be elaborated further herein.

The energy waveguide system selectively propagates energy through a plurality of energy locations along the seamless energy surface representing the spatial coordinate of the 4D plenoptic function with a structure configured to alter an angular direction of the energy waves passing through representing the angular component of the 4D plenoptic function, wherein the energy waves propagated may converge in space in accordance with a plurality of propagation paths directed by the 4D plenoptic function. In an embodiment, an energy propagation path may be defined by a 4D coordinate comprising a 2D spatial coordinate and a 2D angular coordinate. In an embodiment, a plurality of energy propagation paths defined by 4D coordinates may be described by a 4D energy-field function.

Figure 6:
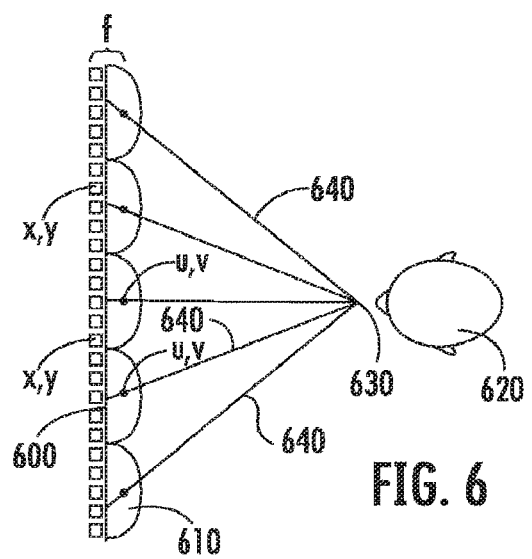
FIG. 6 is a schematic diagram showing rays propagated from an energy surface to a viewer.

Reference is now made to FIG. 6 illustrating an example of light field energy surface in 4D image space in accordance with a 4D plenoptic function. The figure illustrates an embodiment of ray traces of an energy surface 600 to a viewer 620 in describing how the rays of energy converge in space 630 from various positions within the viewing volume. As shown, each waveguide element 610 defines four dimensions of information describing energy propagation 640 through the energy surface 600. Two spatial dimensions (herein referred to as x and y) are the physical plurality of energy locations that can be viewed in image space, and the angular components theta and phi (herein referred to as u and v), which is viewed in virtual space when projected through the energy waveguide array. In general, and in accordance with a 4D plenoptic function, the plurality of waveguides (e.g., lenslets) are able to direct an energy location from the x, y dimension to a unique location in virtual space, along a direction defined by the u, v angular component, in forming the holographic or light field system described herein.

However, one skilled in the art will understand that a significant challenge to light field and holographic display technologies arises from uncontrolled propagation of energy due designs that have not accurately accounted for any of diffraction, scatter, diffusion, angular direction, calibration, focus, collimation, curvature, uniformity, element crosstalk, as well as a multitude of other parameters that contribute to decreased effective resolution as well as an inability to accurately converge energy with sufficient fidelity.

In an embodiment, an approach to selective energy propagation for addressing challenges associated with holographic display may include energy inhibiting elements and substantially filling waveguide apertures with near-collimated energy into an environment defined by a 4D plenoptic function.

In an embodiment, an array of energy waveguides may define a plurality of energy propagation paths for each waveguide element configured to extend through and substantially fill the waveguide element's effective aperture in unique directions defined by a prescribed 4D function to a plurality of energy locations along a seamless energy surface inhibited by one or more elements positioned to limit propagation of each energy location to only pass through a single waveguide element.

In an embodiment, multiple energy domains may be configured within a single, or between multiple energy waveguides to direct one or more sensory holographic energy propagations including visual, acoustic, tactile or other energy domains.

In an embodiment, the energy waveguides and seamless energy surface are configured to both receive and emit one or more energy domains to provide bi-directional energy propagation throughout the system.

In an embodiment, the energy waveguides are configured to propagate non-linear or non-regular distributions of energy, including non-transmitting void regions, leveraging digitally encoded, diffractive, refractive, reflective, grin, holographic, Fresnel, or the like waveguide configurations for any seamless energy surface orientation including wall, table, floor, ceiling, room, or other geometry based environments. In an additional embodiment, an energy waveguide element may be configured to produce various geometries that provide any surface profile and/or tabletop viewing allowing users to view holographic imagery from all around the energy surface in a 360-degree configuration.

In an embodiment, the energy waveguide array elements may be reflective surfaces and the arrangement of the elements may be hexagonal, square, irregular, semi-regular, curved, non-planar, spherical, cylindrical, tilted regular, tilted irregular, spatially varying and/or multi-layered.

For any component within the seamless energy surface, waveguide, or relay components may include, but not limited to, optical fiber, silicon, glass, polymer, optical relays, diffractive, holographic, refractive, or reflective elements, optical face plates, energy combiners, beam splitters, prisms, polarization elements, spatial light modulators, active pixels, liquid crystal cells, transparent displays, or any similar materials exhibiting Anderson localization or total internal reflection.

Realizing the Holodeck

Aggregation of Bi-directional Seamless Energy Surface Systems to Stimulate Human Sensory Receptors within Holographic Environments It is possible to construct large-scale environments of seamless energy surface systems by tiling, fusing, bonding, attaching, and/or stitching multiple seamless energy surfaces together forming arbitrary sizes, shapes, contours or form-factors including entire rooms. Each energy surface system may comprise an assembly having a base structure, energy surface, relays, waveguide, devices, and electronics, collectively configured for bi-directional holographic energy propagation, emission, reflection, or sensing.

In an embodiment, an environment of tiled seamless energy systems are aggregated to form large seamless planar or curved walls including installations comprising up to all surfaces in a given environment, and configured as any combination of seamless, discontinuous planar, faceted, curved, cylindrical, spherical, geometric, or non-regular geometries.

In an embodiment, aggregated tiles of planar surfaces form wall-sized systems for theatrical or venue-based holographic entertainment. In an embodiment, aggregated tiles of planar surfaces cover a room with four to six walls including both ceiling and floor for cave-based holographic installations. In an embodiment, aggregated tiles of curved surfaces produce a cylindrical seamless environment for immersive holographic installations. In an embodiment, aggregated tiles of seamless spherical surfaces form a holographic dome for immersive Holodeck-based experiences.

In an embodiment, aggregates tiles of seamless curved energy waveguides provide mechanical edges following the precise pattern along the boundary of energy inhibiting elements within the energy waveguide structure to bond, align, or fuse the adjacent tiled mechanical edges of the adjacent waveguide surfaces, resulting in a modular and seamless energy waveguide system.

In a further embodiment of an aggregated tiled environment, energy is propagated bi-directionally for multiple simultaneous energy domains. In an additional embodiment, the energy surface provides the ability to both display and capture simultaneously from the same energy surface with waveguides designed such that light field data may be projected by an illumination source through the waveguide and simultaneously received through the same energy surface. In an additional embodiment, additional depth sensing and active scanning technologies may be leveraged to allow for the interaction between the energy propagation and the viewer in correct world coordinates. In an additional embodiment, the energy surface and waveguide are operable to emit, reflect or converge frequencies to induce tactile sensation or volumetric haptic feedback. In some embodiments, any combination of bi-directional energy propagation and aggregated surfaces are possible.

In an embodiment, the system comprises an energy waveguide capable of bi-directional emission and sensing of energy through the energy surface with one or more energy devices independently paired with two-or-more-path energy combiners to pair at least two energy devices to the same portion of the seamless energy surface, or one or more energy devices are secured behind the energy surface, proximate to an additional component secured to the base structure, or to a location in front and outside of the FOV of the waveguide for off-axis direct or reflective projection or sensing, and the resulting energy surface provides for bi-directional transmission of energy allowing the waveguide to converge energy, a first device to emit energy and a second device to sense energy, and where the information is processed to perform computer vision related tasks including, but not limited to, 4D plenoptic eye and retinal tracking or sensing of interference within propagated energy patterns, depth estimation, proximity, motion tracking, image, color, or sound formation, or other energy frequency analysis. In an additional embodiment, the tracked positions actively calculate and modify positions of energy based upon the interference between the bi-directional captured data and projection information.

In some embodiments, a plurality of combinations of three energy devices comprising an ultrasonic sensor, a visible electromagnetic display, and an ultrasonic emitting device are configured together for each of three first relay surfaces propagating energy combined into a single second energy relay surface with each of the three first surfaces comprising engineered properties specific to each device's energy domain, and two engineered waveguide elements configured for ultrasonic and electromagnetic energy respectively to provide the ability to direct and converge each device's energy independently and substantially unaffected by the other waveguide elements that are configured for a separate energy domain.

In some embodiments, disclosed is a calibration procedure to enable efficient manufacturing to remove system artifacts and produce a geometric mapping of the resultant energy surface for use with encoding/decoding technologies as well as dedicated integrated systems for the conversion of data into calibrated information appropriate for energy propagation based upon the calibrated configuration files.

In some embodiments, additional energy waveguides in series and one or more energy devices may be integrated into a system to produce opaque holographic pixels.

In some embodiments, additional waveguide elements may be integrated comprising energy inhibiting elements, beam-splitters, prisms, active parallax barriers or polarization technologies in order to provide spatial and/or angular resolutions greater than the diameter of the waveguide or for other super-resolution purposes.

In some embodiments, the disclosed energy system may also be configured as a wearable bi-directional device, such as virtual reality (VR) or augmented reality (AR). In other embodiments, the energy system may include adjustment optical element(s) that cause the displayed or received energy to be focused proximate to a determined plane in space for a viewer. In some embodiments, the waveguide array may be incorporated to holographic head-mounted-display. In other embodiments, the system may include multiple optical paths to allow for the viewer to see both the energy system and a real-world environment (e.g., transparent holographic display). In these instances, the system may be presented as near field in addition to other methods.

In some embodiments, the transmission of data comprises encoding processes with selectable or variable compression ratios that receive an arbitrary dataset of information and metadata; analyze said dataset and receive or assign material properties, vectors, surface IDs, new pixel data forming a more sparse dataset, and wherein the received data may comprise: 2D, stereoscopic, multi-view, metadata, light field, holographic, geometry, vectors or vectorized metadata, and an encoder/decoder may provide the ability to convert the data in real-time or off-line comprising image processing for: 2D; 2D plus depth, metadata or other vectorized information; stereoscopic, stereoscopic plus depth, metadata or other vectorized information; multi-view; multi-view plus depth, metadata or other vectorized information; holographic; or light field content; through depth estimation algorithms, with or without depth metadata; and an inverse ray tracing methodology appropriately maps the resulting converted data produced by inverse ray tracing from the various 2D, stereoscopic, multi-view, volumetric, light field or holographic data into real world coordinates through a characterized 4D plenoptic function. In these embodiments, the total data transmission desired may be multiple orders of magnitudes less transmitted information than the raw light field dataset.

Figure 61:
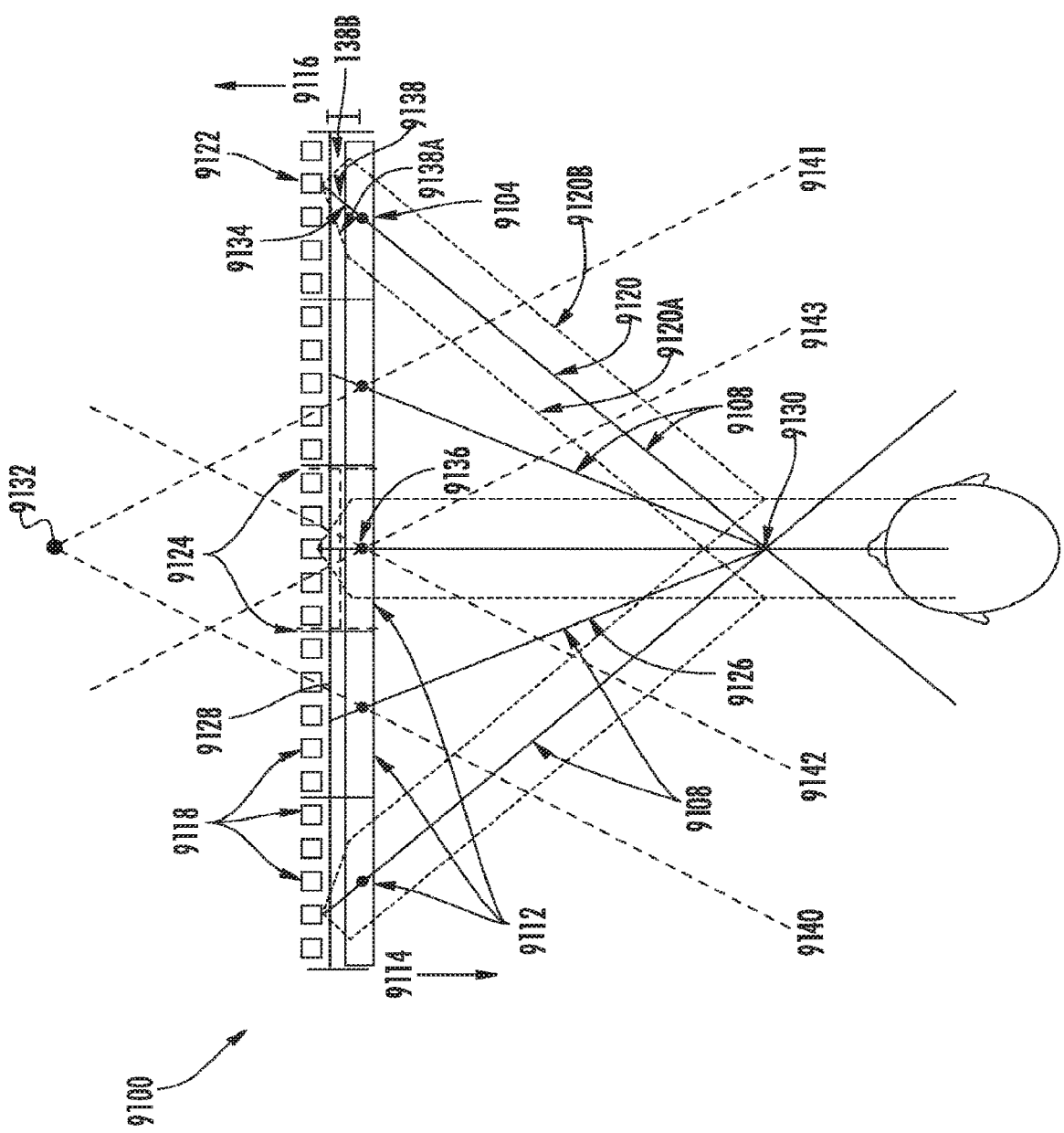
FIG. 61 illustrates a top-down perspective view of an embodiment of an energy waveguide system operable to define a plurality of energy propagation paths.

FIG. 61 illustrates a top-down perspective view of an embodiment of an energy waveguide system 9100 operable to define a plurality of energy propagation paths 9108. Energy waveguide system 9100 comprises an array of energy waveguides 9112 configured to direct energy therethrough along the plurality of energy propagation paths 9108. In an embodiment, the plurality of energy propagation paths 9108 extend through a plurality of energy locations 9118 on a first side of the array 9116 to a second side of the array 9114.

Referring to FIG. 61, in an embodiment, a first subset of the plurality of energy propagation paths 9108 extend through a first energy location 9122. The first energy waveguide 9104 is configured to direct energy along a first energy propagation path 9120 of the first subset of the plurality of energy propagation paths 9108. The first energy propagation path 9120 may be defined by a first chief ray 9138 formed between the first energy location 9122 and the first energy waveguide 9104. The first energy propagation path 9120 may comprise rays 9138A and 9138B, formed between the first energy location 9122 and the first energy waveguide 9104, which are directed by first energy waveguide 9104 along energy propagation paths 9120A and 9120B, respectively. The first energy propagation path 9120 may extend from the first energy waveguide 9104 towards the second side of the array 9114. In an embodiment, energy directed along the first energy propagation path 9120 comprises one or more energy propagation paths between or including energy propagation paths 9120A and 9120B, which are directed through the first energy waveguide 9104 in a direction that is substantially parallel to the angle propagated through the second side 9114 by the first chief ray 9138.

Embodiments may be configured such that energy directed along the first energy propagation path 9120 may exit the first energy waveguide 9104 in a direction that is substantially parallel to energy propagation paths 9120A and 9120B and to the first chief ray 9138. It may be assumed that an energy propagation path extending through an energy waveguide element 9112 on the second side 9114 comprises a plurality of energy propagation paths of a substantially similar propagation direction.

Figure 62:
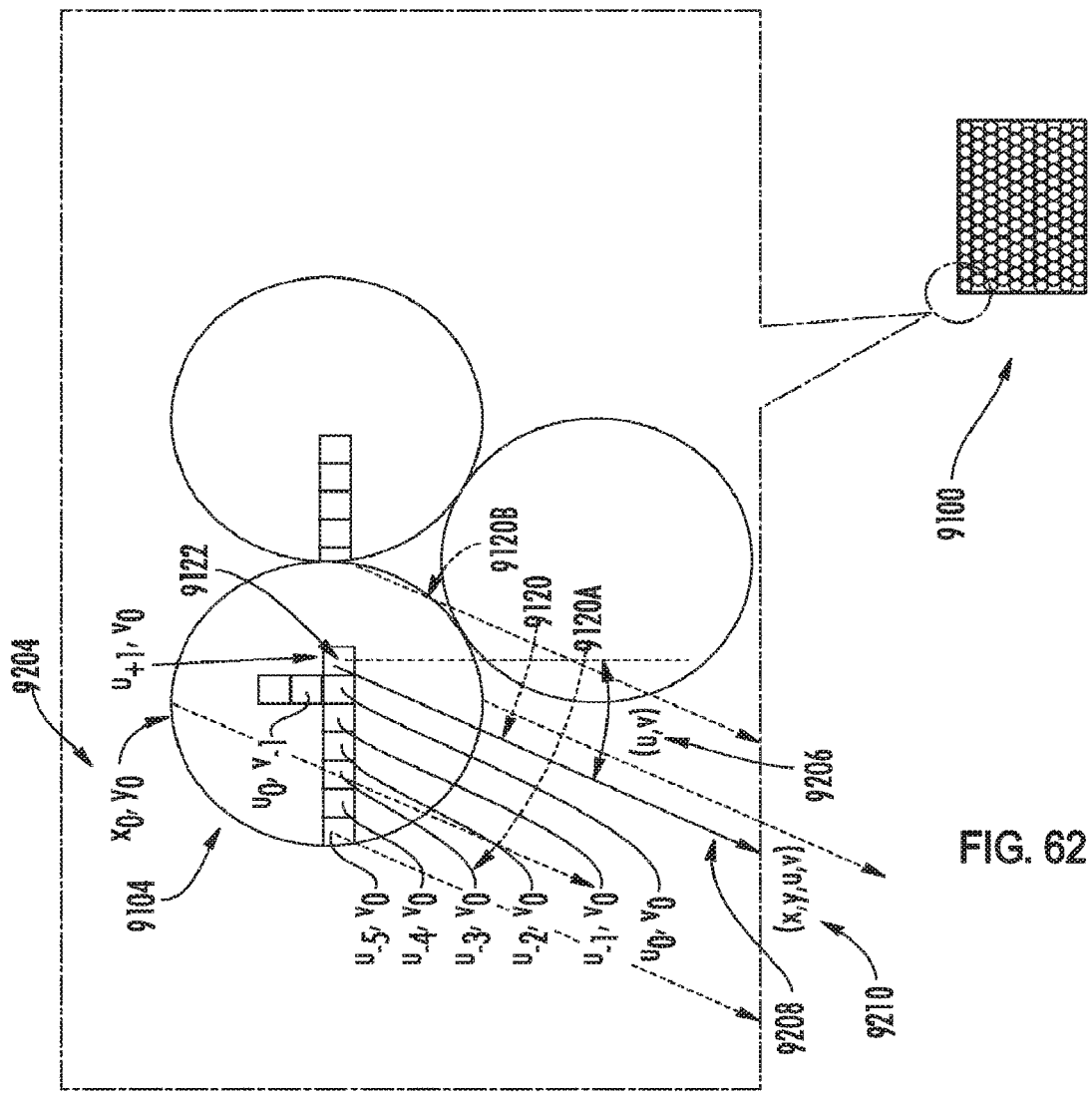
FIG. 62 illustrates a front perspective view of the embodiment shown in FIG. 61.

FIG. 62 is a front view illustration of an embodiment of energy waveguide system 9100. The first energy propagation path 9120 may extend towards the second side 9114 of the array 9112 shown in FIG. 61 in a unique direction 9208 extending from the first energy waveguide 9104, which is determined at least by the first energy location 9122. The first energy waveguide 9104 may be defined by a spatial coordinate 9204, and the unique direction 9208 which is determined at least by first energy location 9122 may be defined by an angular coordinate 9206 defining the directions of the first energy propagation path 9120. The spatial coordinate 9204 and the angular coordinate 9206 may form a four-dimensional plenoptic coordinate set 9210 which defines the unique direction 9208 of the first energy propagation path 9120.

In an embodiment, energy directed along the first energy propagation path 9120 through the first energy waveguide 9104 substantially fills a first aperture 9134 of the first energy waveguide 9104, and propagates along one or more energy propagation paths which lie between energy propagation paths 9120A and 9120B and are parallel to the direction of the first energy propagation path 9120. In an embodiment, the one or more energy propagation paths that substantially fill the first aperture 9134 may comprise greater than 50% of the first aperture 9134 diameter. In an embodiment, the array of waveguides 9100 may be arranged to form a display wall.

In an embodiment, energy directed along the first energy propagation path 9120 through the first energy waveguide 9104 which substantially fills the first aperture 9134 may comprise between 50% to 80% of the first aperture 9134 diameter.

Turning back to FIG. 61, in an embodiment, the energy waveguide system 9100 may further comprise an energy inhibiting element 9124 positioned to limit propagation of energy between the first side 9116 and the second side 9114 and to inhibit energy propagation between adjacent waveguides 9112. In an embodiment, the energy inhibiting element is configured to inhibit energy propagation along a portion of the first subset of the plurality of energy propagation paths 108 that do not extend through the first aperture 9134. In an embodiment, the energy inhibiting element 9124 may be located on the first side 9116 between the array of energy waveguides 9112 and the plurality of energy locations 9118. In an embodiment, the energy inhibiting element 9124 may be located on the second side 9114 between the plurality of energy locations 9118 and the energy propagation paths 9108. In an embodiment, the energy inhibiting element 9124 may be located on the first side 9116 or the second side 9114 orthogonal to the array of energy waveguides 9112 or the plurality of energy locations 9118.

In an embodiment, energy directed along the first energy propagation path 9120 may converge with energy directed along a second energy propagation path 9126 through a second energy waveguide 9128. The first and second energy propagation paths may converge at a location 9130 on the second side 9114 of the array 9112. In an embodiment, a third and fourth energy propagation paths 9140, 9141 may also converge at a location 9132 on the first side 9116 of the array 9112. In an embodiment, a fifth and sixth energy propagation paths 9142, 9143 may also converge at a location 9136 between the first and second sides 9116, 9114 of the array 9112.

In an embodiment, the energy waveguide system 9100 may comprise structures for directing energy such as: a structure configured to alter an angular direction of energy passing therethrough, for example a refractive, diffractive, reflective, gradient index, holographic, or other optical element; a structure comprising at least one numerical aperture; a structure configured to redirect energy off at least one internal surface; an optical relay; etc. It is to be appreciated that the waveguides 9112 may include any one or combination of bidirectional energy directing structure or material, such as:

a) refraction, diffraction, or reflection;
b) single or compound multilayered elements;
c) holographic optical elements and digitally encoded optics;
d) 3D printed elements or lithographic masters or replicas;
e) Fresnel lenses, gratings, zone plates, binary optical elements;
f) retro reflective elements;
g) fiber optics, total internal reflection or Anderson Localization;
h) gradient index optics or various refractive index matching materials;
i) glass, polymer, gas, solids, liquids;
j) acoustic waveguides;
k) micro & nano scale elements; or
l) polarization, prisms or beam splitters.

In an embodiment, the energy waveguide systems propagate energy bidirectionally.

In an embodiment, the energy waveguides are configured for propagation of mechanical energy in the form of sound waves.

In an embodiment, the energy waveguides are configured for propagation of electromagnetic energy.

In an embodiment, by interlacing, layering, reflecting, combining, or otherwise provisioning the appropriate material properties within one or more structures within an energy waveguide element, and within one or more layers comprising an energy waveguide system, the energy waveguides are configured for simultaneous propagation of mechanical, electromagnetic and/or other forms of energy.

In an embodiment, the energy waveguides propagate energy with differing ratios for u and v respectively within a 4D coordinate system.

In an embodiment, the energy waveguides propagate energy with an anamorphic function. In an embodiment, the energy waveguides comprise multiple elements along the energy propagation path.

In an embodiment, the energy waveguides are directly formed from optical fiber relay polished surfaces.

In an embodiment, the energy waveguide system comprises materials exhibiting Transverse Anderson Localization. In an embodiment, the energy waveguide system propagates hypersonic frequencies to converge tactile sensation in a volumetric space.

In an embodiment, the array of energy waveguide elements may include:

a) A hexagonal packing of the array of energy waveguides;
b) A square packing of the array of energy waveguides;
c) An irregular or semi-regular packing of the array of energy waveguides;
d) Curved or Non-planar array of energy waveguides;
e) Spherical array of energy waveguides;
f) Cylindrical array of energy waveguides;
g) Tilted regular array of energy waveguides;
h) Tilted irregular array of energy waveguides;
i) Spatially varying array of energy waveguides;
j) Multi-layered array of energy waveguides;

Limitations of Anderson Localization Materials and Introduction of Ordered Energy Localization While the Anderson localization principle was introduced in the 1950s, it wasn't until recent technological breakthroughs in materials and processes which allowed the principle to be explored practically in optical transport. Transverse Anderson localization is the propagation of a wave transported through a transversely disordered but longitudinally invariant material without diffusion of the wave in the transverse plane.

Within the prior art, Transverse Anderson localization has been observed through experimentation in which a fiber optic face plate is fabricated through drawing millions of individual strands of fiber with different refractive index (RI) that were mixed randomly and fused together. When an input beam is scanned across one of the surfaces of the face plate, the output beam on the opposite surface follows the transverse position of the input beam. Since Anderson localization exhibits in disordered mediums an absence of diffusion of waves, some of the fundamental physics are different when compared to optical fiber relays. This implies that the effect of the optical fibers that produce the Anderson localization phenomena are less impacted by total internal reflection than by the randomization between multiple-scattering paths where wave interference can completely limit the propagation in the transverse orientation while continuing in the longitudinal path. Further to this concept, it is introduced herein that an ordered distribution of material wave propagation properties may be used in place of a randomized distribution in the transverse plane of an energy transport device. Such an ordered distribution may induce what is referred to herein as Ordered Energy Localization in a transverse plane of the device. This Ordered Energy Localization reduces the occurrence of localized grouping of similar material properties, which can arise due to the nature of random distributions but which act to degrade the overall efficacy of energy transport through the device.

In an embodiment, it may be possible for Ordered Energy Localization materials to transport light with a contrast as high as, or better than, the highest quality commercially available multimode glass image fibers, as measured by an optical modulation transfer function (MTF). With multimode and multicore optical fibers, the relayed images are intrinsically pixelated due to the properties of total internal reflection of the discrete array of cores where any cross-talk between cores will reduce MTF and increase blurring. The resulting imagery produced with multicore optical fiber tends to have a residual fixed noise fiber pattern, as illustrated in FIG. 5A. By contrast, FIG. 5B illustrates the same relayed image through an example material sample that exhibits Ordered Energy Localization, which is similar to that of the Transverse Anderson Localization principle, where the noise pattern appears much more like a grain structure than a fixed fiber pattern.

Another advantage to optical relays that exhibit the Ordered Energy localization phenomena is that it they can be fabricated from a polymer material, resulting in reduced cost and weight. A similar optical-grade material, generally made of glass or other similar materials, may cost more than a hundred times the cost of the same dimension of material generated with polymers. Further, the weight of the polymer relay optics can be 10-100× less given that up to a majority of the density of the material is air and other light weight plastics. For the avoidance of doubt, any material that exhibits the Anderson localization property, or the Ordered Energy Localization property as described herein, may be included in this disclosure, even if it does not meet the above cost and weight suggestions. As one skilled in the art will understand that the above suggestion is a single embodiment that lends itself to significant commercial viabilities that similar glass products exclude. Of additional benefit is that for Ordered Energy Localization to work, optical fiber cladding may not be needed, which for traditional multicore fiber optics is required to prevent the scatter of light between fibers, but simultaneously blocks a portion of the rays of light and thus reduces transmission by at least the core-to-clad ratio (e.g. a core-to-clad ratio of 70:30 will transmit at best 70% of received illumination).

Another benefit is the ability to produce many smaller parts that can be bonded or fused without seams as the material fundamentally has no edges in the traditional sense, and the merger of any two pieces is nearly the same as generating the component as a singular piece depending on the process to merge the two or more pieces together. For large scale applications, this is a significant benefit for the ability to manufacture without massive infrastructure or tooling costs, and it provides the ability to generate single pieces of material that would otherwise be impossible with other methods. Traditional plastic optical fibers have some of these benefits, but due to the cladding generally still involve a seam line of some distances.

The present disclosure includes methods of manufacturing materials exhibiting the Ordered Energy Localization phenomena. A process is proposed to construct relays of electromagnetic energy, acoustic energy, or other types of energy using building blocks that consist of one or more component engineered structures (CES). The term CES refers to a building block component with specific engineered properties (EP) that include, but are not limited to, material type, size, shape, refractive index, center-of-mass, charge, weight, absorption, and magnetic moment, among other properties. The size scale of the CES may be on the order of wavelength of the energy wave being relayed, and can vary across the milli-scale, the micro-scale, or the nano-scale. The other EP's are also highly dependent on the wavelength of the energy wave.

Within the scope of the present disclosure, a particular arrangement of multiple CES may form an ordered pattern, which may be repeated in the transverse direction across a relay to effectively induce Ordered Energy Localization. A single instance of such an ordered pattern of CES is referred to herein as a module. A module may comprise two or more CES. A grouping of two or more modules within a relay is referred to herein as a structure.

Ordered Energy Localization is a general wave phenomenon that applies to the transport of electromagnetic waves, acoustic waves, quantum waves, energy waves, among others. The one or more building block structures required to form an energy wave relay that exhibits Ordered Energy Localization each have a size that is on the order of the corresponding wavelength. Another parameter for the building blocks is the speed of the energy wave in the materials used for those building blocks, which includes refractive index for electromagnetic waves, and acoustic impedance for acoustic waves. For example, the building block sizes and refractive indices can vary to accommodate any frequency in the electromagnetic spectrum, from X-rays to radio waves.

For this reason, discussions in this disclosure about optical relays can be generalized to not only the full electromagnetic spectrum, but to acoustical energy and other types of energy. For this reason, the use of the terms energy source, energy surface, and energy relay will be used often, even if the discussion is focused on one particular form of energy such as the visible electromagnetic spectrum.

For the avoidance of doubt, the material quantities, process, types, refractive index, and the like are merely exemplary and any optical material that exhibits the Ordered Energy localization property is included herein. Further, any use of ordered materials and processes is included herein.

It should be noted that the principles of optical design noted in this disclosure apply generally to all forms of energy relays, and the design implementations chosen for specific products, markets, form factors, mounting, etc. may or may not need to address these geometries but for the purposes of simplicity, any approach disclosed is inclusive of all potential energy relay materials.

In one embodiment, for the relay of visible electromagnetic energy, the transverse size of the CES should be on the order of 1 micron. The materials used for the CES can be any optical material that exhibits the optical qualities desired to include, but not limited to, glass, plastic, resin and the like. The index of refraction of the materials are higher than 1, and if two CES types are chosen, the difference in refractive index becomes a key design parameter. The aspect ratio of the material may be chosen to be elongated, in order to assist wave propagation in a longitudinal direction.

In embodiments, energy from other energy domains may be relayed using CES. For example, acoustic energy or haptic energy, which may be mechanical vibrational forms of energy, may be relayed. Appropriate CES may be chosen based on transport efficiency in these alternate energy domains. For example, air may be selected as a CES material type in relaying acoustic or haptic energy. In embodiments, empty space or a vacuum may be selected as a CES in order to relay certain forms of electromagnetic energy. Furthermore, two different CES may share a common material type, but may differ in another engineered property, such as shape.

The formation of a CES may be completed as a destructive process that takes formed materials and cuts the pieces into a desired shaped formation or any other method known in the art, or additive, where the CES may be grown, printed, formed, melted, or produced in any other method known in the art. Additive and destructive processes may be combined for further control over fabrication. These pieces are now constructed to a specified structure size and shape.

In one embodiment, for electromagnetic energy relays, it may be possible to use optical grade bonding agents, epoxies, or other known optical materials that may start as a liquid and form an optical grade solid structure through various means including but not limited to UV, heat, time, among other processing parameters. In another embodiment, the bonding agent is not cured or is made of index matching oils for flexible applications. Bonding agent may be applied to solid structures and non-curing oils or optical liquids. These materials may exhibit certain refractive index (RI) properties. The bonding agent needs to match the RI of either CES material type 1 or CES material type 2. In one embodiment, the RI of this optical bonding agent is 1.59, the same as PS. In a second embodiment, the RI of this optical bonding agent is 1.49, the same as PMMA. In another embodiment, the RI of this optical bonding agent is 1.64, the same as a thermoplastic polyester (TP) material.

In one embodiment, for energy waves, the bonding agent may be mixed into a blend of CES material type 1 and CES material type 2 in order to effectively cancel out the RI of the material that the bonding agent RI matches. The bonding agent may be thoroughly intermixed, with enough time given to achieve escape of air voids, desired distributions of materials, and development of viscous properties. Additional constant agitation may be implemented to ensure the appropriate mixture of the materials to counteract any separation that may occur due to various densities of materials or other material properties.

It may be required to perform this process in a vacuum or in a chamber to evacuate any air bubbles that may form. An additional methodology may be to introduce vibration during the curing process.

An alternate method provides for three or more CES with additional form characteristics and EPs.

In one embodiment, for electromagnetic energy relays, an additional method provides for only a single CES to be used with only the bonding agent, where the RI of the CES and the bonding agent differ.

An additional method provides for any number of CESs and includes the intentional introduction of air bubbles.

In one embodiment, for electromagnetic energy relays, a method provides for multiple bonding agents with independent desired RIs, and a process to intermix the zero, one, or more CES's as they cure either separately or together to allow for the formation of a completely intermixed structure. Two or more separate curing methodologies may be leveraged to allow for the ability to cure and intermix at different intervals with different tooling and procedural methodologies. In one embodiment, a UV cure epoxy with a RI of 1.49 is intermixed with a heat cure second epoxy with a RI of 1.59 where constant agitation of the materials is provisioned with alternating heat and UV treatments with only sufficient duration to begin to see the formation of solid structures from within the larger mixture, but not long enough for any large particles to form, until such time that no agitation can be continued once the curing process has nearly completed, whereupon the curing processes are implemented simultaneously to completely bond the materials together. In a second embodiment, CES with a RI of 1.49 are added. In a third embodiment, CES with both a RI of 1.49 and 1.59 both added.

In another embodiment, for electromagnetic energy relays, glass and plastic materials are intermixed based upon their respective RI properties.

In an additional embodiment, the cured mixture is formed in a mold and after curing is cut and polished. In another embodiment, the materials leveraged will re-liquefy with heat and are cured in a first shape and then pulled into a second shape to include, but not limited to, tapers or bends.

It should be appreciated that there exist a number of well-known conventional methods used to weld polymeric materials together. Many of these techniques are described in ISO 472 ("Plastics-Vocabulary", International Organization for Standardization, Switzerland 1999) which is herein incorporated by reference in its entirety, and which describes processes for uniting softened surfaces of material including thermal, mechanical (e.g. vibration welding, ultrasonic welding, etc.), electromagnetic, and chemical (solvent) welding methods. In the context of the present disclosure, the terms "fuse," "fusing" or "fused" have the meaning that two or more polymeric materials in an embodiment have had their surfaces united or joined together by any of the above-described techniques known to those skilled in the art. Furthermore, non-polymeric materials may also be used in certain embodiments. The meaning of the terms "fuse," "fusing" or "fused" in the context of those materials have similar meanings analogous to the array of welding techniques described above and known to one skilled in the art of uniting or joining those non-polymeric materials.

Figure 7A:
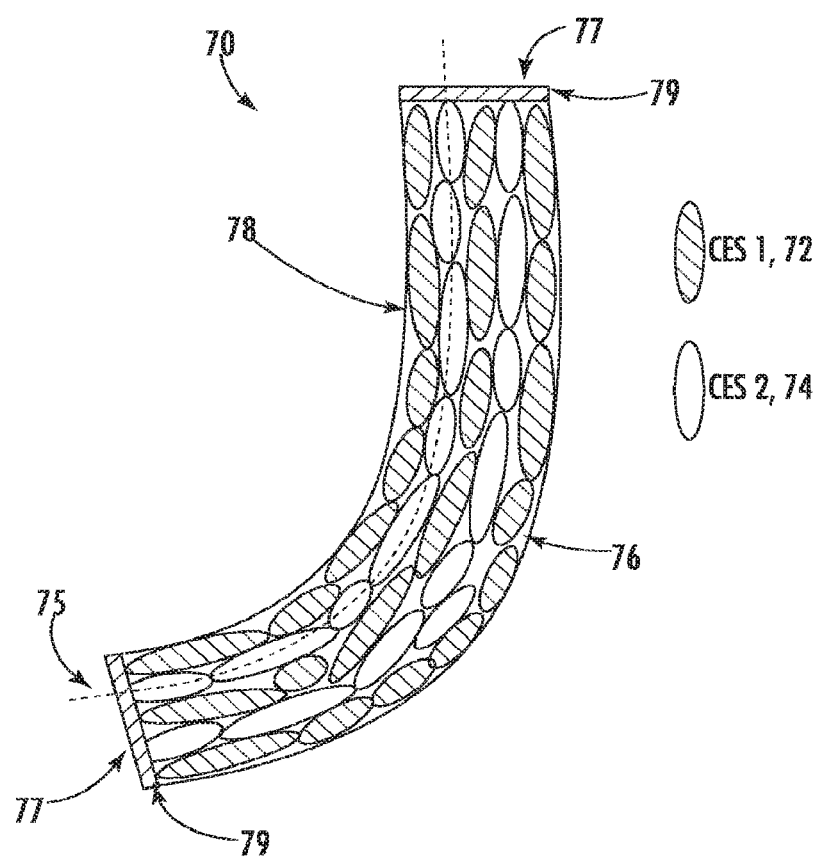
FIG. 7A illustrates a cutaway view of a flexible energy relay which achieves Transverse Anderson Localization by intermixing two component materials within an oil or liquid, in accordance with one embodiment of the present disclosure.

FIG. 7A illustrates a cutaway view of a flexible implementation 70 of a relay exhibiting the Transverse Anderson Localization approach using CES material type 1 (72) and CES material type 2 (74) with intermixing oil or liquid 76 and with the possible use of end cap relays 79 to relay the energy waves from a first surface 77 to a second surface 77 on either end of the relay within a flexible tubing enclosure 78 in accordance with one embodiment of the present disclosure. The CES material type 1 (72) and CES material type 2 (74) both have the engineered property of being elongated—in this embodiment, the shape is elliptical, but any other elongated or engineered shape such as cylindrical or stranded is also possible. The elongated shape allows for channels of minimum engineered property variation 75.

For an embodiment for visible electromagnetic energy relays, implementation 70 may have the bonding agent replaced with a refractive index matching oil 76 with a refractive index that matches CES material type 2 (74) and placed into the flexible tubing enclosure 78 to maintain flexibility of the mixture of CES material type 1 and CES material 2, and the end caps 79 would be solid optical relays to ensure that an image can be relayed from one surface of an end cap to the other. The elongated shape of the CES materials allows channels of minimum refractive index variation 75.

Multiple instances of 70 can be interlaced into a single surface in order to form a relay combiner in solid or flexible form.

In one embodiment, for visible electromagnetic energy relays, several instances of 70 may each be connected on one end to a display device showing only one of many specific tiles of an image, with the other end of the optical relay placed in a regular mosaic, arranged in such a way to display the full image with no noticeable seams. Due to the properties of the CES materials, it is additionally possible to fuse multiple the multiple optical relays within the mosaic together.

Figure 7B:
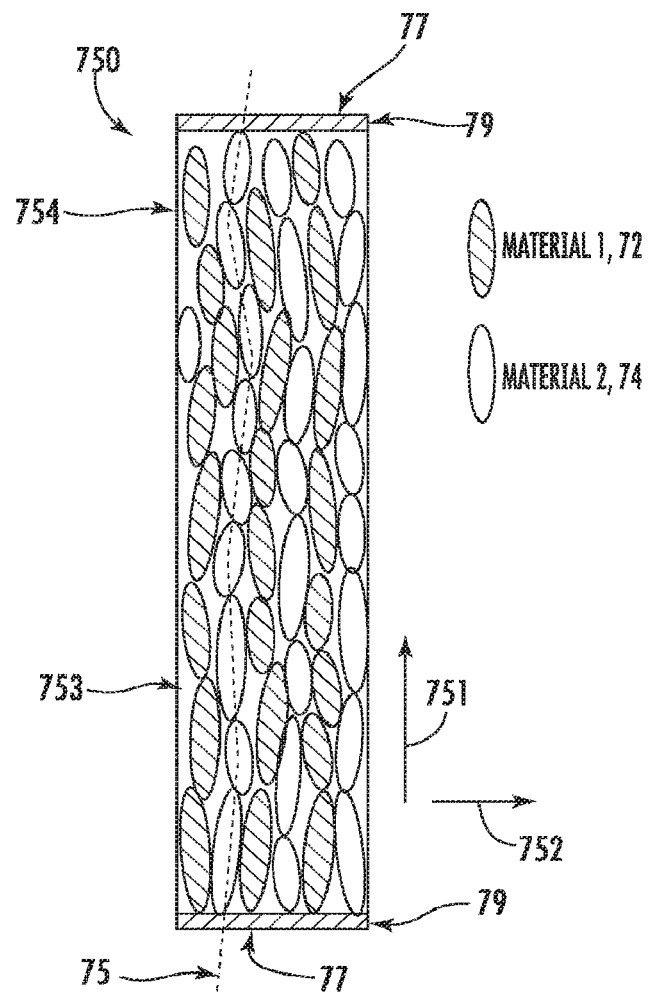
FIG. 7B illustrates a cutaway view of a rigid energy relay which achieves Transverse Anderson Localization by intermixing two component materials within a bonding agent, and in doing so, achieves a path of minimum variation in one direction for one material property, in accordance with one embodiment of the present disclosure.

FIG. 7B illustrates a cutaway view of a rigid implementation 750 of a CES Transverse Anderson Localization energy relay. CES material type 1 (72) and CES material type 2 (74) are intermixed with bonding agent 753 which matches the index of refraction of material 2 (74). It is possible to use optional relay end caps 79 to relay the energy wave from the first surface 77 to a second surface 77 within the enclosure 754. The CES material type 1 (72) and CES material type 2 (74) both have the engineered property of being elongated—in this embodiment, the shape is elliptical, but any other elongated or engineered shape such as cylindrical or stranded is also possible. Also shown in FIG. 7B is a path of minimum engineered property variation 75 along the longitudinal direction 751, which assists the energy wave propagation in this direction 751 from one end cap surface 77 to the other end cap surface 77.

The initial configuration and alignment of the CESs can be done with mechanical placement, or by exploiting the EP of the materials, including but not limited to: electric charge, which when applied to a colloid of CESs in a liquid can result in colloidal crystal formation; magnetic moments which can help order CESs containing trace amounts of ferromagnetic materials, or relative weight of the CESs used, which with gravity helps to create layers within the bonding liquid prior to curing.

In one embodiment, for electromagnetic energy relays, the implementation depicted in FIG. 7B would have the bonding agent 753 matching the index of refraction of CES material type 2 (74), the optional end caps 79 would be solid optical relays to ensure that an image can be relayed from one surface of an end cap to the other, and the EP with minimal longitudinal variation would be refractive index, creating channels 75 which would assist the propagation of localized electromagnetic waves.

Figure 8:
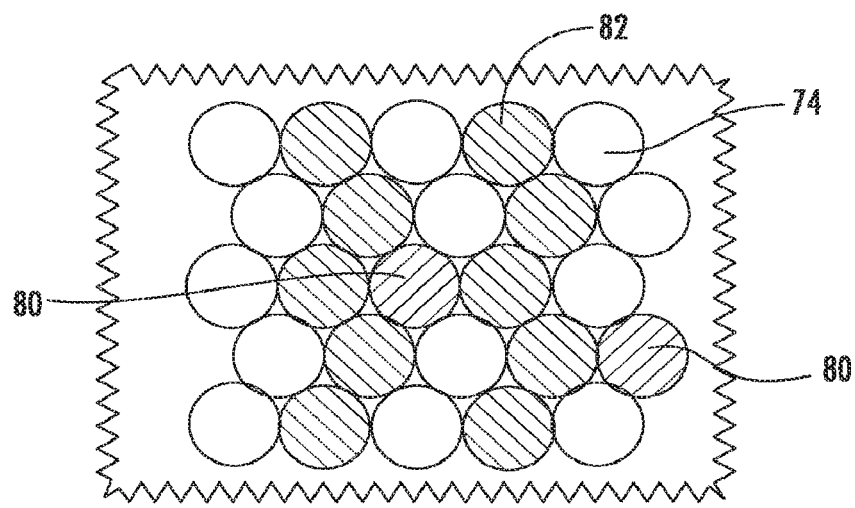
FIG. 8 illustrates a cutaway view in the transverse plane the inclusion of a DEMA (dimensional extra mural absorption) material in the longitudinal direction designed to absorb energy, in accordance with one embodiment of the present disclosure.

In an embodiment for visible electromagnetic energy relays, FIG. 8 illustrates a cutaway view in the transverse plane the inclusion of a DEMA (dimensional extra mural absorption) CES, 80, along with CES material types 72, 74 in the longitudinal direction of one exemplary material at a given percentage of the overall mixture of the material, which controls stray light, in accordance with one embodiment of the present disclosure for visible electromagnetic energy relays.

The additional CES materials that do not transmit light are added to the mixture(s) to absorb random stray light, similar to EMA in traditional optical fiber technologies, except that the distribution of the absorbing materials may be random in all three dimensions, as opposed to being invariant in the longitudinal dimension. Herein this material is called DEMA, 80. Leveraging this approach in the third dimension provides far more control than previous methods of implementation. Using DEMA, the stray light control is much more fully randomized than any other implementation, including those that include a stranded EMA that ultimately reduces overall light transmission by the fraction of the area of the surface of all the optical relay components it occupies. In contrast, DEMA is intermixed throughout the relay material, effectively controlling the light transmission in the longitudinal direction without the same reduction of light in the transverse. The DEMA can be provided in any ratio of the overall mixture. In one embodiment, the DEMA is 1% of the overall mixture of the material. In a second embodiment, the DEMA is 10% of the overall mixture of the material.

In an additional embodiment, the two or more materials are treated with heat and/or pressure to perform the bonding process and this may or may not be completed with a mold or other similar forming process known in the art. This may or may not be applied within a vacuum or a vibration stage or the like to eliminate air bubbles during the melt process. For example, CES with material type polystyrene (PS) and polymethylmethacrylate (PMMA) may be intermixed and then placed into an appropriate mold that is placed into a uniform heat distribution environment capable of reaching the melting point of both materials and cycled to and from the respective temperature without causing damage/fractures due to exceeding the maximum heat elevation or declination per hour as dictated by the material properties.

For processes that require intermixing materials with additional liquid bonding agents, in consideration of the variable specific densities of each material, a process of constant rotation at a rate that prevents separation of the materials may be required.

Differentiating Anderson and Ordered Energy Relay Materials

Figure 9:
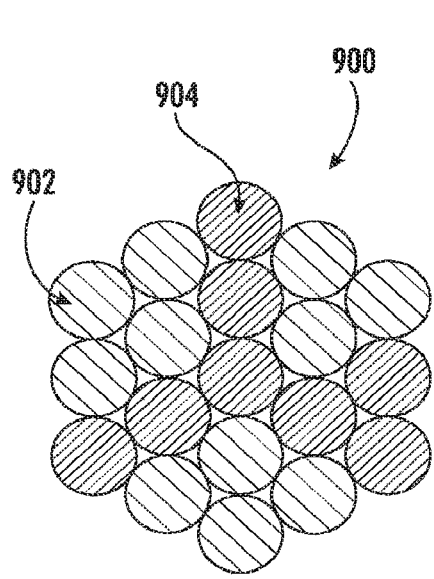
FIG. 9 illustrates a cutaway view in the transverse plane of a portion of an energy relay comprising a random distribution of two component materials.

FIG. 9 illustrates a cutaway view in the transverse plane of a portion 900 of a pre-fused energy relay comprising a randomized distribution of particles, each particle comprising one of two component materials, component engineered structure (CES) 902 and CES 904. In an embodiment, particles comprising either CES 902 or CES 904 may possess different material properties, such as different refractive indices, and may induce an Anderson Localization effect in energy transported therethrough, localizing energy in the transverse plane of the material. In an embodiment, particles comprising either CES 902 or CES 904 may extend into and out of the plane of the illustration in a longitudinal direction, thereby allowing energy propagation along the longitudinal direction with decreased scattering effects compared to traditional optical fiber energy relays due to the localization of energy in the transverse plane of the material.

Figure 10:
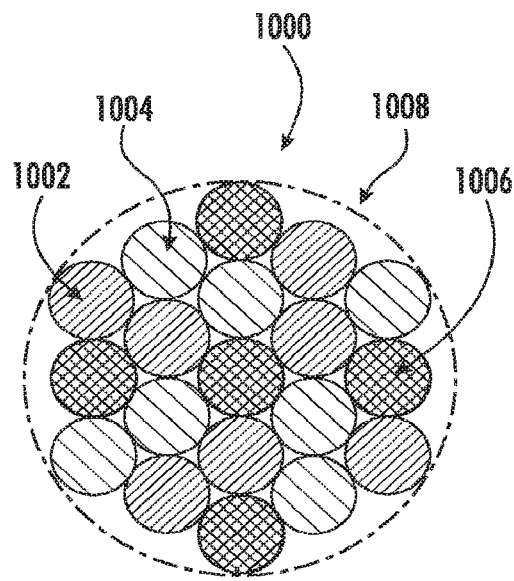
FIG. 10 illustrates a cutaway view in the transverse plane of a module of an energy relay comprising a non-random pattern of three component materials which define a single module.

FIG. 10 illustrates a cutaway view in the transverse plane of module 1000 of a pre-fused energy relay comprising an ordered distribution of particles, each particle comprising one of three component materials, CES 1002, CES 1004, or CES 1006. Particles comprising one of CES's 1002, 1004, or 1006 may possess different material properties, such as different refractive indices, which may induce an energy localization effect in the transverse plane of the module. The pattern of particles comprising one of CES's 1002, 1004, or 1006 may be contained within a module boundary 1008, which defines the particular pattern that particles comprising one of CES's 1002, 1004, or 1006 are arranged in. Similar to FIG. 9, particles comprising one of CES's 1002, 1004, or 1006 may extend in a longitudinal direction into and out of the plane of the illustration to allow energy propagation along the longitudinal direction with decreased scattering effects compared to traditional optical fiber energy relays due to the localization of energy in the transverse plane of the material.

Particles comprising one of CES's 902 or 904 from FIG. 9 and particles comprising one of CES's 1002, 1004, or 1006 from FIG. 10 may be long, thin rods of respective material which extend in a longitudinal direction normal to the plane of the illustration and are arranged in the particular patterns shown in FIG. 9 and FIG. 10 respectively. Although small gaps may exist between individual particles of CES due to the circular cross-sectional shape of the particles shown in FIG. 9 and FIG. 10, these gaps would effectively be eliminated upon fusing, as the CES materials would gain some fluidity during the fusing process and "melt" together to fill in any gaps. While the cross-sectional shapes illustrated in FIG. 9 and FIG. 10 are circular, this should not be considered limiting of the scope of this disclosure, and one skilled in the art should recognize that any shape or geometry of pre-fused material may be utilized in accordance with the principles disclosed herein.

Figure 11:
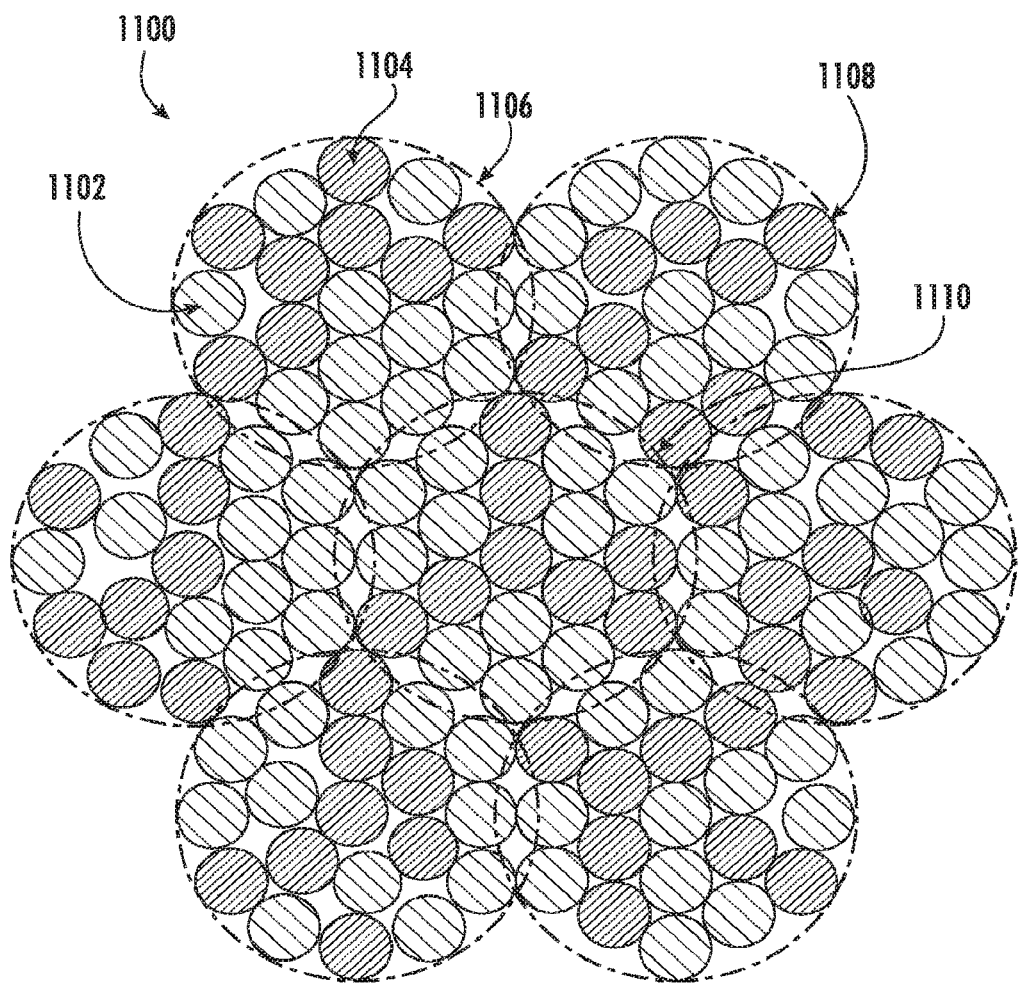
FIG. 11 illustrates a cutaway view in the transverse plane of a portion of a pre-fused energy relay comprising a random distribution of two component materials.

FIG. 11 illustrates a cutaway view in the transverse plane of a portion 1100 of a pre-fused energy relay comprising a random distribution of particles comprising one of two component materials, CES 1102 or CES 1104. The portion 1100 may have a plurality of sub-portions, such as sub-portions 1106 and 1108 each comprising a randomized distribution of particles comprising either CES 1102 or 1104. The random distribution of particles comprising either CES 1102 or CES 1104 may, after fusing of the relay, induce a Transverse Anderson Localization effect in energy relayed in a longitudinal direction through portion 1100.

Figure 13:
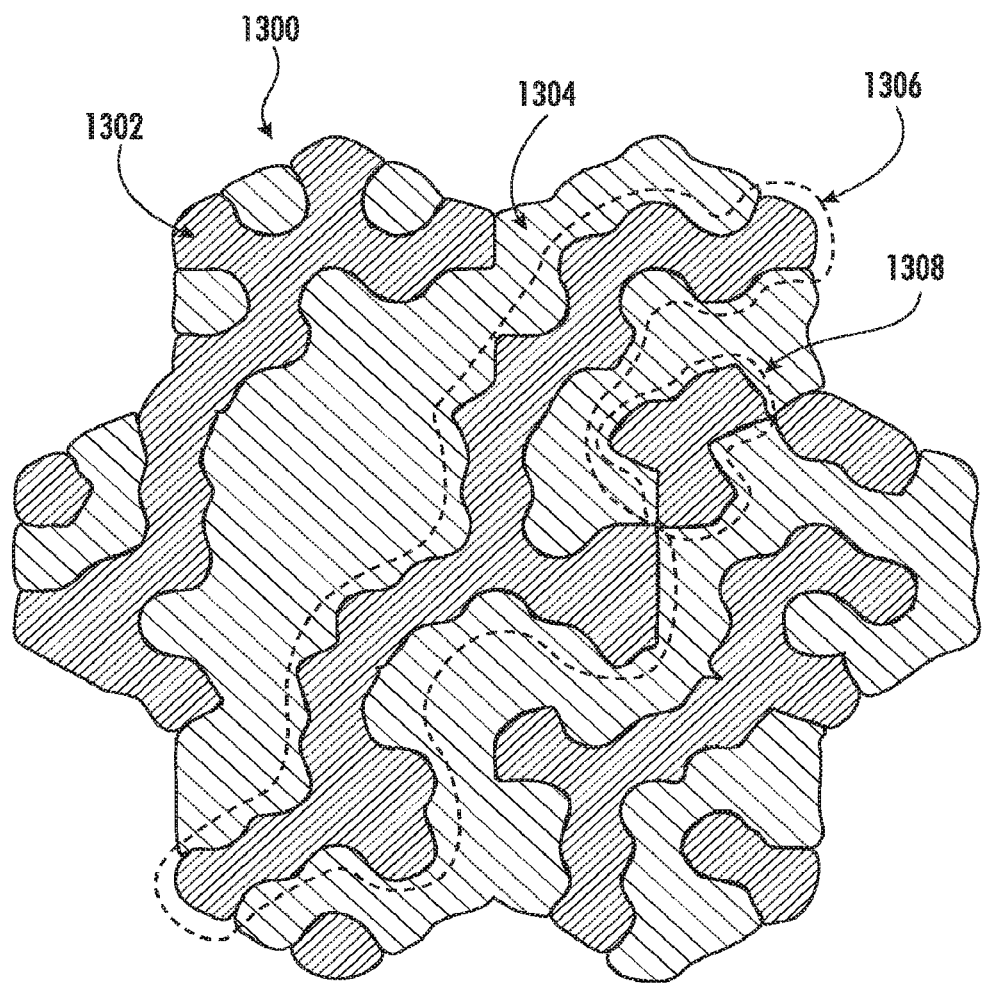
FIG. 13 illustrates a cutaway view in the transverse plane of a portion of a fused energy relay comprising a random distribution of two component materials.

FIG. 13 illustrates a cutaway view in the transverse plane of a portion 1300 of a fused energy relay comprising a random distribution of particles comprising one of two component materials CES 1302 or CES 1304. Portion 1300 may represent a possible fused form of portion 1100 from FIG. 11. In the context of the present disclosure, when adjacent particles of similar CES aggregate together upon fusing, this is referred to as an aggregated particle (AP). An example of an AP of CES 1302 can be seen at 1308, which may represent the fused form of several unfused CES 1302 particles (shown in FIG. 11). As illustrated in FIG. 13, the boundaries between each continuous particle of similar CES, as well as the boundaries between modules with similar CES border particles, are eliminated upon fusing, while new boundaries are formed between AP's of different CES.

According to the Anderson Localization principle, a randomized distribution of materials with different energy wave propagation properties distributed in the transverse direction of a material will localize energy within that direction, inhibiting energy scattering and reducing interference which may degrade the transport efficiency of the material. In the context of transporting electromagnetic energy, for example, through increasing the amount of variance in refractive index in the transverse direction by randomly distributing materials with differing refractive indices, it becomes possible to localize the electromagnetic energy in the transverse direction.

However, as discussed previously, due to the nature of randomized distributions, there exists the possibility that undesirable arrangements of materials may inadvertently form, which may limit the realization of energy localization effects within the material. For example, AP 1306 of FIG. 13 could potentially form after fusing the randomized distribution of particles shown in the corresponding location in FIG. 11. When designing a material for transporting electromagnetic energy, for example, a design consideration is the transverse size of pre-fused particles of CES. In order to prevent energy from scattering in the transverse direction, one may select a particle size such that upon fusing, the resultant average AP size is substantially on the order of the wavelength of the electromagnetic energy the material is intended to transport. However, while the average AP size can be designed for, one skilled in the art would recognize that a random distribution of particles will result in a variety of unpredictable sizes of AP, some being smaller than the intended wavelength and some being larger than the intended wavelength.

In FIG. 13, AP 1306 extends across the entire length of portion 1300 and represents an AP of a size much larger than average. This may imply that the size of AP 1306 is also much larger than the wavelength of energy that portion 1300 is intended to transport in the longitudinal direction. Consequently, energy propagation through AP 1306 in the longitudinal direction may experience scattering effects in the transverse plane, reducing the Anderson Localization effect and resulting in interference patterns within energy propagating through AP 1306 and a reduction in the overall energy transport efficiency of portion 1300.

It should be understood that, according to the principles disclosed herein and due to the nature of randomized distributions, a sub-portion within portion 1100, such as sub-portion 1108 for example, may be of arbitrary significance, since there is no defined distribution pattern. However, it should be apparent to one skilled in the art that in a given randomized distribution, there exists the possibility that one may identify distinct sub-portions that comprise the same or substantially similar patterns of distribution. This occurrence may not significantly inhibit the overall induced Transverse Anderson Localization effect, and the scope of the present disclosure should not be seen as limited to exclude such cases.

The non-random, Ordered pattern design considerations disclosed herein represent an alternative to a randomized distribution of component materials, allowing energy relay materials to exhibit energy localization effects in the transverse direction while avoiding the potentially limiting deviant cases inherent to randomized distributions.

It should be noted that across different fields and throughout many disciplines, the concept of "randomness," and indeed the notions of what is and is not random are not always clear. There are several important points to consider in the context of the present disclosure when discussing random and non-random distributions, arrangements, patterns, et cetera, which are discussed below. However, it should be appreciated that the disclosures herein are by no means the only way to conceptualize and/or systematize the concepts of randomness or non-randomness. Many alternate and equally valid conceptualizations exist, and the scope of the present disclosure should not be seen as limited to exclude any approach contemplated by one skilled in the art in the present context.

Complete spatial randomness (CSR), which is well-known in the art and is described in Smith, T.E., (2016) Notebook on Spatial Data Analysis [online] (http://www.seas.upenn.edu/ese502/#notebook), which is herein incorporated by reference, is a concept used to describe a distribution of points within a space (in this case, within a 2D plane) which are located in a completely random fashion. There are two common characteristics used to describe CSR: The spatial Laplace principle, and the assumption of statistical independence.

The spatial Laplace principle, which is an application of the more general Laplace principle to the domain of spatial probability essentially states that, unless there is information to indicate otherwise, the chance of a particular event, which may be thought of as the chance of a point being located in a particular location, is equally as likely for each location within a space. That is to say, each location within a region has an equal likelihood of containing a point, and therefore, the probability of finding a point is the same across each location within the region. A further implication of this is that the probability of finding a point within a particular sub-region is proportional to the ratio of the area of that sub-region to the area of the entire reference region.

A second characteristic of CSR is the assumption of spatial independence. This principle assumes that the locations of other data points within a region have no influence or effect on the probability of finding a data point at a particular location. In other words, the data points are assumed to be independent of one another, and the state of the "surrounding areas", so to speak, do not affect the probability of finding a data point at a location within a reference region.

The concept of CSR is useful as a contrasting example of an ordered distribution of materials, such as some embodiments of CES materials described herein. An Anderson material is described elsewhere in this disclosure as being a random distribution of energy propagation materials in a transverse plane of an energy relay. Keeping in mind the CSR characteristics described above, it is possible to apply these concepts to some of the embodiments of the Anderson materials described herein in order to determine whether the "randomness" of those Anderson material distributions complies with CSR. Assuming embodiments of an energy relay comprising first and second materials, since a CES of either the first or second material may occupy roughly the same area in the transverse plane of the embodiments (meaning they are roughly the same size in the transverse dimension), and further since the first and second CES may be assumed to be provided in equal amounts in the embodiments, we can assume that for any particular location along the transverse plane of the energy relay embodiments, there is an equally likely chance of there being either a first CES or a second CES, in accordance with spatial Laplace principle as applied in this context. Alternatively, if the relay materials are provided in differing amounts in other energy relay embodiments, or possess a differing transverse size from one another, we would likewise expect that the probability of finding either material be in proportion to the ratio of materials provided or to their relative sizes, in keeping with the spatial Laplace principle.

Next, because both the first and second materials of Anderson energy relay embodiments are arranged in a random manner (either by thorough mechanical mixing, or other means), and further evidenced by the fact that the "arrangement" of the materials may occur simultaneously and arise spontaneously as they are randomized, we can assert that the identities of neighboring CES materials will have substantially no effect on the identity of a particular CES material, and vice versa, for these embodiments. That is, the identities of CES materials within these embodiments are independent of one another. Therefore, the Anderson material embodiments described herein may be said to satisfy the described CSR characteristics. Of course, as discussed above, the nature of external factors and "real-world" confounding factors may affect the compliance of embodiments of Anderson energy relay materials with strict CSR definitions, but one of ordinary skill in the art would appreciate that these Anderson material embodiments substantially fall within reasonable tolerance of such definitions.

By contrast, an analysis of some of the Ordered Energy relay material embodiments as disclosed herein highlights particular departures from their counterpart Anderson material embodiments (and from CSR). Unlike an Anderson material, a CES material within an Ordered energy relay embodiment may not be unconcerned with the identities of its neighbors. The very pattern of the arrangement of CES materials within certain Ordered Energy relay embodiments is designed to, among other things, influence how similar materials are arranged spatially relative to one another in order to control the effective size of the APs formed by such materials upon fusing. In other words, one of the goals of some embodiments which arrange materials in an Ordered distribution is to affect the ultimate cross-sectional area (or size), in the transverse dimension, of any region comprising a single material (an AP), in order to, among other goals, limit the effects of transverse energy scattering and interference within said regions as energy is relayed along a longitudinal direction. Therefore, some degree of specificity and/or selectivity is exercised when energy relay materials are first "arranged" in an Ordered distribution embodiment, which may disallow for a particular CES identity to be "independent" of the identity of other CES, particularly those materials immediately surrounding it. On the contrary, in certain embodiments materials are specifically chosen based on a non-random pattern, with the identity of any one particular CES being determined based on a continuation of the pattern and in knowing what portion of the pattern (and thus, what materials) are already arranged. It follows that these certain Ordered distribution energy relay embodiments cannot comply with CSR criteria. Thus, in embodiments wherein the pattern or arrangement of two or more CES or energy relay materials is described as "non-random" or "substantially non-random", what is implied may be, among other things, that the materials do not substantially comply with the general concept or characteristics of CSR as described, and in the context of the present disclosure, are considered an Ordered material distribution.

It is to be appreciated that, like a human signature, a non-random pattern may be considered as a non-random signal that includes noise. Non-random patterns may be substantially the same even when they are not identical due to the inclusion of noise. A plethora of conventional techniques exist in pattern recognition and comparison that may be used to separate noise and non-random signals and correlate the latter. By way of example, U.S. Pat. No. 7,016,516 to Rhoades, which is incorporated by reference herein, describes a method of identifying randomness (noise, smoothness, snowiness, etc.), and correlating non-random signals to determine whether signatures are authentic. Rhodes notes that computation of a signal's randomness is well understood by artisans in this field, and one example technique is to take the derivative of the signal at each sample point, square these values, and then sum over the entire signal. Rhodes further notes that a variety of other well-known techniques can alternatively be used. Conventional pattern recognition filters and algorithms may be used to identify the same non-random patterns. Examples are provided in U.S. Pat. Nos. 5,465,308 and 7,054,850, all of which are incorporated by reference herein. Other techniques of pattern recognition and comparison will not be repeated here, but it is to be appreciated that one of ordinary skill in the art would easily apply existing techniques to determine whether an energy relay comprises a plurality of repeating modules each comprising at least first and second materials being arranged in a substantially non-random pattern, are in fact comprising the same substantially non-random pattern.

Furthermore, in view of the above-mentioned points regarding randomness and noise, it should be appreciated that an arrangement of materials into a substantially non-random pattern may, due to unintentional factors such as mechanical inaccuracy or manufacturing variability, suffer from a distortion of the intended pattern. It would be apparent to one skilled in the art, however, that such distortions to a non-random pattern are largely unavoidable and are intrinsic to the nature of the mechanical arts. Thus, when considering an arrangement of materials, it is within the capabilities of one such skilled in the art to distinguish a distorted portion of a pattern from an undistorted portion, just as one would identify two signatures as belonging to the same person despite their unique differences.

Figure 12A:
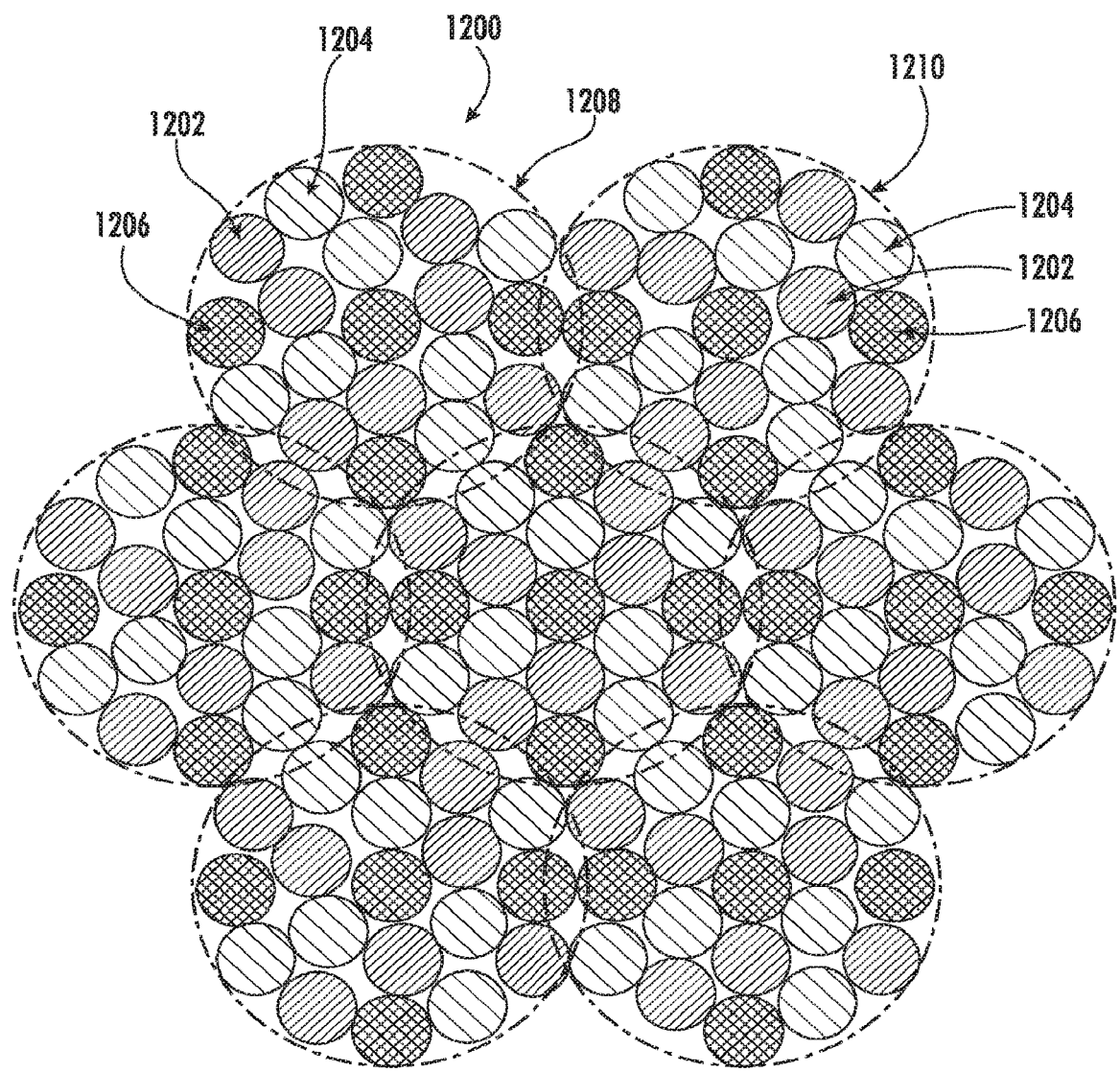
FIG. 12A illustrates a cutaway view in the transverse plane of a portion of a pre-fused energy relay comprising a non-random pattern of three component materials which define multiple modules with similar orientations.

FIG. 12A illustrates a cutaway view in the transverse plane of a portion 1200 of a pre-fused energy relay comprising an ordered distribution of three component materials CES 1202, CES 1204, or CES 1206, which define multiple modules with similar orientations. Particles of these three CES materials are arranged in repeating modules, such as module 1208 and module 1210, which share substantially invariant distributions of said particles. While portion 1200 comprises six modules as illustrated in FIG. 12A, the number of modules in a given ordered energy relay can be any number and may be chosen based on the desired design parameters. Additionally, the size of the modules, the number of particles per module, the size of the individual particles within a module, the distribution pattern of particles within a module, the number of different types of modules, and the inclusion of extra-modular or interstitial materials may all be design parameters to be given consideration and fall within the scope of the present disclosure.

Similarly, the number of different CES's included within each module need not be three as illustrated in FIG. 12A, but may preferably be any number suited to the desired design parameters. Furthermore, the different characteristic properties possessed by each CES may be variable so as to satisfy the desired design parameters, and differences should not be limited only to refractive index. For example, two different CES's may possess substantially the same refractive index, but may differ in their melting point temperatures.

In order to minimize the scattering of energy transported through the portion 1200 of the energy relay illustrated in FIG. 12A, and to promote transverse energy localization, the ordered pattern of the modules that comprise portion 1200 may satisfy the Ordered distribution characteristics described above. In the context of the present disclosure, contiguous particles may be particles that are substantially adjacent to one another in the transverse plane. The particles may be illustrated to be touching one another, or there may be an empty space illustrated between the adjacent particles. One skilled in the art will appreciate that small gaps between adjacent illustrated particles are either inadvertent artistic artifacts or are meant to illustrate the minute mechanical variations which can arise in real-world arrangement of materials. Furthermore, this disclosure also includes arrangements of CES particles in substantially non-random patterns, but contain exceptions due to manufacturing variations or intentional variation by design.

Figure 12B:
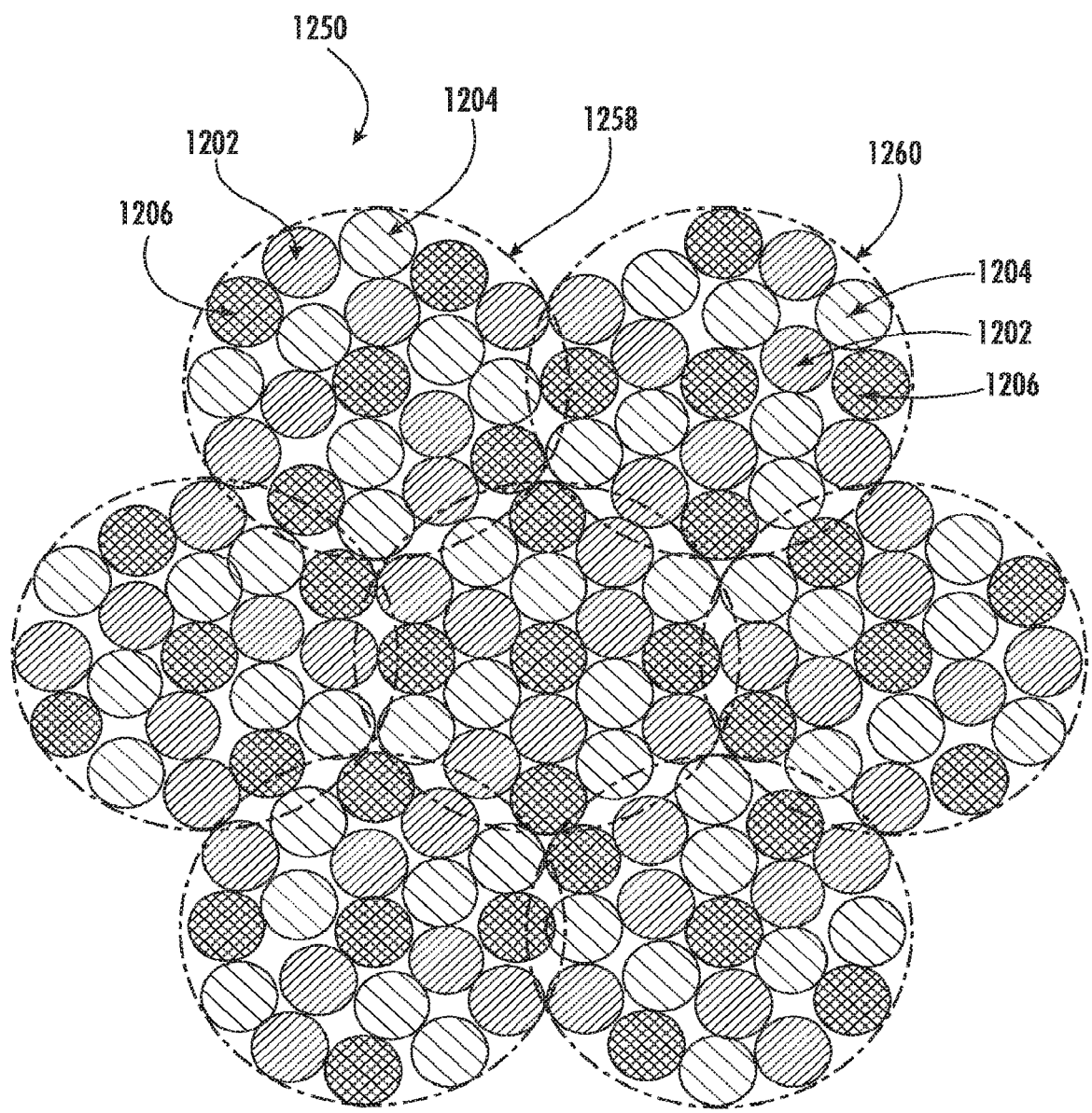
FIG. 12B illustrates a cutaway view in the transverse plane of a portion of a pre-fused energy relay comprising a non-random pattern of three component materials which define multiple modules with varying orientations.

Ordered patterns of CES particles may allow for greater localization of energy, and reduce scattering of energy in a transverse direction through a relay material, and consequently allow for higher efficiency of energy transport through the ordered material relative to other embodiments. FIG. 12B illustrates a cutaway view in the transverse plane of a portion 1250 of a pre-fused energy relay comprising an ordered distribution of particles comprising one of three component materials, CES 1202, CES 1204, or CES 1206, wherein the particles define multiple modules with varying orientations. Modules 1258 and 1260 of portion 1250 comprise an ordered distribution of materials similar to that of modules 1208 and 1210 of FIG. 12A. However, the pattern of materials in module 1260 are rotated relative to that of module 1258. Several other modules of portion 1250 also exhibit a rotated pattern of distribution. It is important to note that despite this rotational arrangement, each module within portion 1250 possesses the Ordered distribution described above, since the actual pattern of particle distribution within each module remains the same regardless of how much rotation is imposed upon it.

Figure 14:
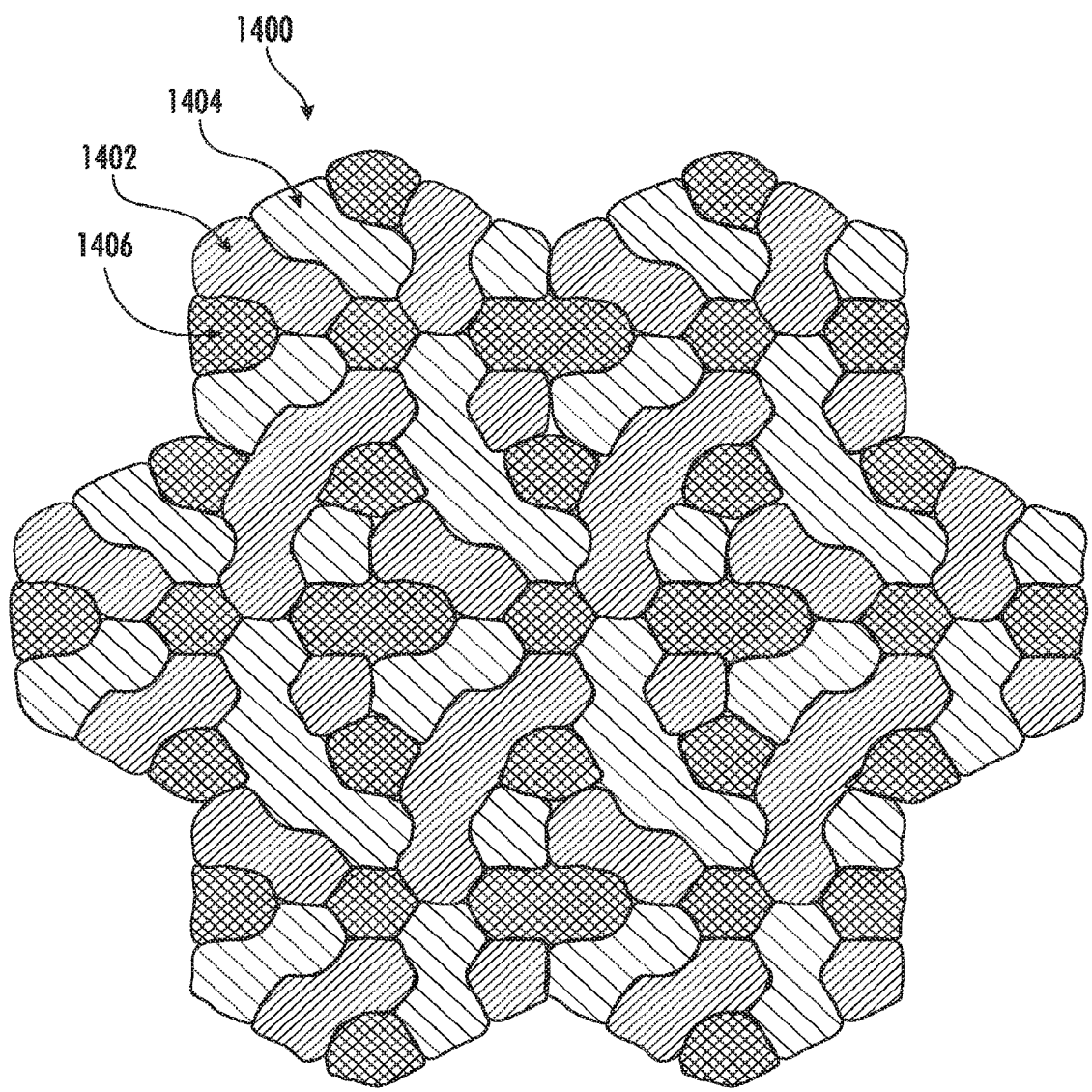
FIG. 14 illustrates a cutaway view in the transverse plane of a portion of a fused energy relay comprising a non-random pattern of particles comprising one of three component materials.

FIG. 14 illustrates a cutaway view in the transverse plane of a portion 1400 of a fused energy relay comprising an ordered distribution of particles comprising one of three component materials, CES 1402, CES 1404, or CES 1406. Portion 1400 may represent a possible fused form of portion 1200 from FIG. 12A. By arranging CES particles in an Ordered distribution, the relay shown in FIG. 14 may realize more efficient transportation of energy in a longitudinal direction through the relay relative to the randomized distribution shown in FIG. 13. By selecting CES particles with a diameter roughly ½ of the wavelength of energy to be transported through the material and arranging them in a pre-fuse Ordered distribution shown in FIG. 12A, the size of the resultant AP's after fusing seen in FIG. 14 may have a transverse dimension between ½ and 2 times the wavelength of intended energy. By substantially limiting transverse AP dimensions to within this range, energy transported in a longitudinal direction through the material may allow for ordered energy localization and reduce scattering and interference effects. In an embodiment, a transverse dimension of AP's in a relay material may preferably be between ¼ and 8 times the wavelength of energy intended to be transported in a longitudinal direction through the APs.

As seen in FIG. 14, and in contrast with FIG. 13, there is notable consistency of size across all APs, which may result from exerting control over how pre-fused CES particles are arranged. Specifically, controlling the pattern of particle arrangement may reduce or eliminate the formation of larger AP's which may lead to energy scattering and interference patterns within the AP, representing an improvement over randomized distributions of CES particles in energy relays.

Figure 15:
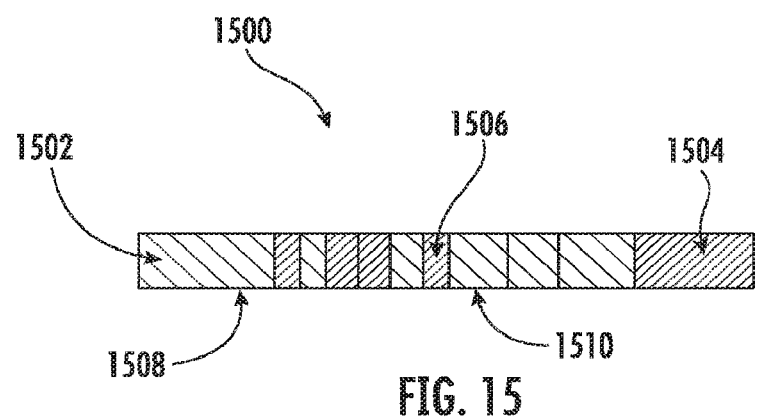
FIG. 15 illustrates a cross-sectional view of a portion of an energy relay comprising a randomized distribution of two different CES materials.

FIG. 15 illustrates a cross-sectional view of a portion 1500 of an energy relay comprising a randomized distribution of two different CES materials, CES 1502 and CES 1504. Portion 1500 is designed to transport energy longitudinally along the vertical axis of the illustration, and comprises a number of AP's distributed along the horizontal axis of the illustration in a transverse direction. AP 1510 may represent an average AP size of all the AP's in portion 1500. As a result of randomizing the distribution of CES particles prior to fusing of portion 1500, the individual AP's that make up portion 1500 may substantially deviate from the average size shown by 1510. For example, AP 1508 is wider than AP 1510 in the transverse direction by a significant amount. Consequently, energy transported through AP's 1510 and 1508 in the longitudinal direction may experience noticeably different localization effects, as well as differing amounts of wave scattering and interference. As a result, upon reaching its relayed destination, any energy transported through portion 1500 may exhibit differing levels of coherence, or varying intensity across the transverse axis relative to its original state when entering portion 1500. Having energy emerge from a relay that is in a significantly different state than when it entered said relay may be undesirable for certain applications such as image light transport.

Additionally, AP 1506 shown in FIG. 15 may be substantially smaller in the transverse direction than AP 1510. As a result, the transverse width of AP 1506 may be too small for energy of a certain desired energy wavelength domain to effectively propagate through, causing degradation of said energy and negatively affecting the performance of portion 1500 in relaying said energy.

Figure 16:
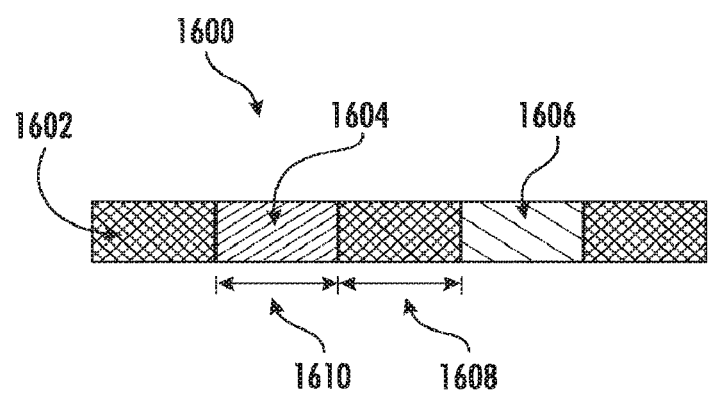
FIG. 16 illustrates a cross-sectional view of a portion of an energy relay comprising a non-random pattern of three different CES materials.

FIG. 16 illustrates a cross-sectional view of a portion 1600 of an energy relay comprising an ordered distribution of three different CES materials, CES 1602, CES 1604, and CES 1606. Portion 1600 is designed to transport energy longitudinally along the vertical axis of the illustration, and comprises a number of AP's distributed along the horizontal axis of the illustration in a transverse direction. AP 1610, comprising CES 1604, and AP 1608, comprising CES 1602, may both have substantially the same size in the transverse direction. All other AP's within portion 1600 may also substantially share a similar AP size in the transverse direction. As a result, energy being transported longitudinally through portion 1600 may experience substantially uniform localization effects across the transverse axis of portion 1600, and suffer reduced scattering and interference effects. By maintaining a consistent AP width in the transverse dimension, energy which enters portion 1600 will be relayed and affected equally regardless of where along the transverse direction it enters portion 1600. This may represent an improvement of energy transport over the randomized distribution demonstrated in FIG. 15 for certain applications such as image light transport.

Figure 17:
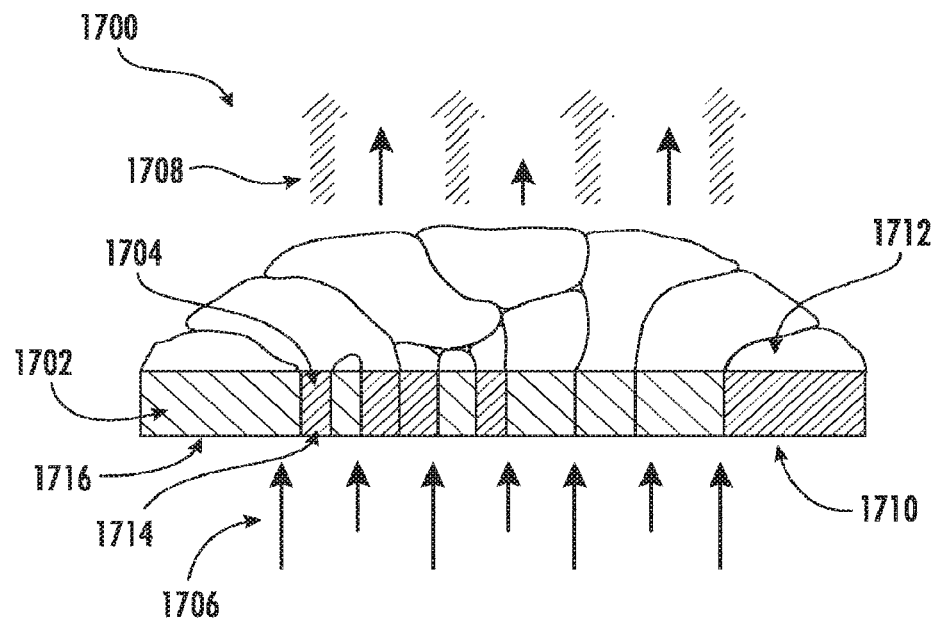
FIG. 17 illustrates a cross-sectional perspective view of a portion of an energy relay comprising a randomized distribution of aggregated particles comprising one of two component materials.

FIG. 17 illustrates a cross-sectional perspective view of a portion 1700 of an energy relay comprising a randomized distribution of aggregated particles comprising one of two component materials, CES 1702 or CES 1704. In FIG. 17, input energy 1706 is provided for transport through portion 1700 in a longitudinal direction through the relay, corresponding with the vertical direction in the illustration as indicated by the arrows representing energy 1706. The energy 1706 is accepted into portion 1700 at side 1710 and emerges from portion 1700 at side 1712 as energy 1708. Energy 1708 is illustrated as having varying sizes and pattern of arrows which are intended to illustrate that energy 1708 has undergone non-uniform transformation as it was transported through portion 1700, and different portions of energy 1708 differ from initial input energy 1706 by varying amounts in magnitude and localization in the transverse directions perpendicular to the longitudinal energy direction 1706.

As illustrated in FIG. 17, there may exist an AP, such as AP 1714, that possesses a transverse size that is too small, or otherwise unsuited, for a desired energy wavelength to effectively propagate from side 1710 through to side 1712. Similarly, an AP such as AP 1716 may exist that is too large, or otherwise unsuited, for a desired energy wavelength to effectively propagate from side 1710 through to side 1712. The combined effect of this variation in energy propagation properties across portion 1700, which may be a result of the randomized distribution of CES particles used to form portion 1700, may limit the efficacy and usefulness of portion 1700 as an energy relay material.

Figure 18:
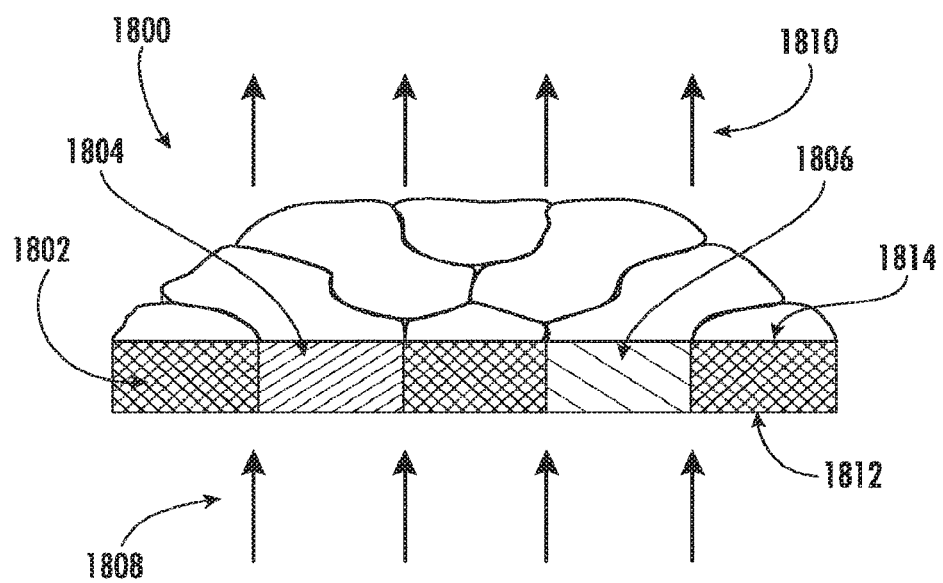
FIG. 18 illustrates a cross-sectional perspective view of a portion of an energy relay comprising a non-random pattern of aggregated particles comprising one of three component materials.

FIG. 18 illustrates a cross-sectional perspective view of a portion 1800 of an energy relay comprising an ordered distribution of aggregated particles comprising one of three component materials, CES 1802, CES 1804, or CES 1806. In FIG. 18, input energy 1808 is provided for transport through portion 1800 in a longitudinal direction through the relay, corresponding with the vertical direction in the illustration as indicated by the arrows representing energy 1808. The energy 1808 is accepted into portion 1800 at side 1812 and is relayed to and emerges from side 1814 as energy 1810. As illustrated in FIG. 18, output energy 1810 may have substantially uniform properties across the transverse direction of portion 1800. Furthermore, input energy 1808 and output energy 1810 may share substantially invariant properties, such as wavelength, intensity, resolution, or any other wave propagation properties. This may be due to the uniform size and distribution of AP's along the transverse direction of portion 1800, allowing energy at each point along the transverse direction to propagate through portion 1800 in a commonly affected manner, which may help limit any variance across emergent energy 1810, and between input energy 1808 and emergent energy 1810.

Tapered Energy Relays

In order to further solve the challenge of generating high resolution from an array of individual energy wave sources containing extended mechanical envelopes, the use of tapered energy relays can be employed to increase the effective size of each energy source. An array of tapered energy relays can be stitched together to form a singular contiguous energy surface, circumventing the limitation of mechanical requirements for those energy sources.

In an embodiment, the one or more energy relay elements may be configured to direct energy along propagation paths which extend between the one or more energy locations and the singular seamless energy surface.

For example, if an energy wave source's active area is 20 mm×10 mm and the mechanical envelope is 40 mm×20 mm, a tapered energy relay may be designed with a magnification of 2:1 to produce a taper that is 20 mm×10 mm (when cut) on the minified end and 40 mm×20 mm (when cut) on the magnified end, providing the ability to align an array of these tapers together seamlessly without altering or violating the mechanical envelope of each energy wave source.

Figure 29:
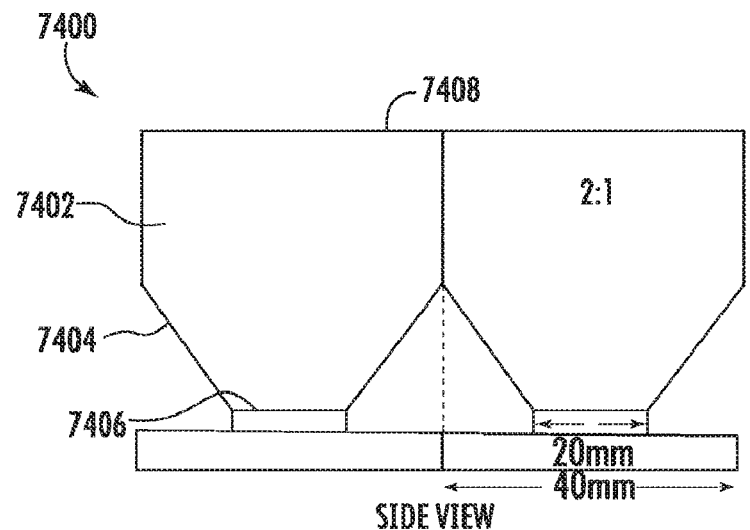
FIG. 29 illustrates a tapered energy relay mosaic arrangement.

FIG. 29 illustrates an orthogonal view of one such tapered energy relay mosaic arrangement 7400, in accordance with one embodiment of the present disclosure. In FIG. 29, the relay device 7400 may include two or more relay elements 7402, each relay element 7402 formed of one or more structures, each relay element 7402 having a first surface 7406, a second surface 7408, a transverse orientation (generally parallel to the surfaces 7406, 7408) and a longitudinal orientation (generally perpendicular to the surfaces 7406, 7408). The surface area of the first surface 7406 may be different than the surface area of the second surface 7408. For relay element 7402, the surface area of the first surface 7406 is less than the surface area of the second surface 7408. In another embodiment, the surface area of the first surface 7406 may be the same or greater than the surface area of the second surface 7408. Energy waves can pass from the first surface 7406 to the second surface 7408, or vice versa.

In FIG. 29, the relay element 7402 of the relay element device 7400 includes a sloped profile portion 7404 between the first surface 7406 and the second surface 7408. In operation, energy waves propagating between the first surface 7406 and the second surface 7408 may have a higher transport efficiency in the longitudinal orientation than in the transverse orientation, and energy waves passing through the relay element 7402 may result in spatial magnification or spatial de-magnification. In other words, energy waves passing through the relay element 7402 of the relay element device 7400 may experience increased magnification or decreased magnification. In an embodiment, energy may be directed through the one or more energy relay elements with zero magnification. In some embodiments, the one or more structures for forming relay element devices may include glass, carbon, optical fiber, optical film, plastic, polymer, or mixtures thereof.

In one embodiment, the energy waves passing through the first surface have a first resolution, while the energy waves passing through the second surface have a second resolution, and the second resolution is no less than about 50% of the first resolution. In another embodiment, the energy waves, while having a uniform profile when presented to the first surface, may pass through the second surface radiating in every direction with an energy density in the forward direction that substantially fills a cone with an opening angle of +/−10 degrees relative to the normal to the second surface, irrespective of location on the second relay surface.

In some embodiments, the first surface may be configured to receive energy from an energy wave source, the energy wave source including a mechanical envelope having a width different than the width of at least one of the first surface and the second surface.

In an embodiment, energy may be transported between first and second surfaces which defines the longitudinal orientation, the first and second surfaces of each of the relays extends generally along a transverse orientation defined by the first and second directions, where the longitudinal orientation is substantially normal to the transverse orientation. In an embodiment, energy waves propagating through the plurality of relays have higher transport efficiency in the longitudinal orientation than in the transverse orientation and are spatially localized in the transverse plane due to randomized refractive index variability in the transverse orientation coupled with minimal refractive index variation in the longitudinal orientation via the principle of Transverse Anderson Localization. In some embodiments where each relay is constructed of multicore fiber, the energy waves propagating within each relay element may travel in the longitudinal orientation determined by the alignment of fibers in this orientation.

Mechanically, these tapered energy relays are cut and polished to a high degree of accuracy before being bonded or fused together in order to align them and ensure that the smallest possible seam gap between the relays. The seamless surface formed by the second surfaces of energy relays is polished after the relays are bonded. In one such embodiment, using an epoxy that is thermally matched to the taper material, it is possible to achieve a maximum seam gap of 50 um. In another embodiment, a manufacturing process that places the taper array under compression and/or heat provides the ability to fuse the elements together. In another embodiment, the use of plastic tapers can be more easily chemically fused or heat-treated to create the bond without additional bonding. For the avoidance of doubt, any methodology may be used to bond the array together, to explicitly include no bond other than gravity and/or force.

In an embodiment, a separation between the edges of any two adjacent second surfaces of the terminal energy relay elements may be less than a minimum perceptible contour as defined by the visual acuity of a human eye having 20/40 vision at a distance from the seamless energy surface that is the lesser of a height of the singular seamless energy surface or a width of the singular seamless energy surface.

A mechanical structure may be preferable in order to hold the multiple components in a fashion that meets a certain tolerance specification. In some embodiments, the first and second surfaces of tapered relay elements can have any polygonal shapes including without limitation circular, elliptical, oval, triangular, square, rectangle, parallelogram, trapezoidal, diamond, pentagon, hexagon, and so forth. In some examples, for non-square tapers, such as rectangular tapers for example, the relay elements may be rotated to have the minimum taper dimension parallel to the largest dimensions of the overall energy source. This approach allows for the optimization of the energy source to exhibit the lowest rejection of rays of light due to the acceptance cone of the magnified relay element as when viewed from center point of the energy source. For example, if the desired energy source size is 100 mm by 60 mm and each tapered energy relay is 20 mm by 10 mm, the relay elements may be aligned and rotated such that an array of 3 by 10 taper energy relay elements may be combined to produce the desired energy source size. Nothing here should suggest that an array with an alternative configuration of an array of 6 by 5 matrix, among other combinations, could not be utilized. The array comprising of a 3×10 layout generally will perform better than the alternative 6×5 layout.

Energy Relay Element Stacks

While the most simplistic formation of an energy source system comprises of an energy source bonded to a single tapered energy relay element, multiple relay elements may be coupled to form a single energy source module with increased quality or flexibility. One such embodiment includes a first tapered energy relay with the minified end attached to the energy source, and a second tapered energy relay connected to the first relay element, with the minified end of the second optical taper in contact with the magnified end of the first relay element, generating a total magnification equal to the product of the two individual taper magnifications. This is an example of an energy relay element stack comprising of a sequence of two or more energy relay elements, with each energy relay element comprising a first side and a second side, the stack relaying energy from the first surface of the first element to the second surface of the last element in the sequence, also named the terminal surface. Each energy relay element may be configured to direct energy therethrough.

In an embodiment, an energy directing device comprises one or more energy locations and one or more energy relay element stacks. Each energy relay element stack comprises one or more energy relay elements, with each energy relay element comprising a first surface and a second surface. Each energy relay element may be configured to direct energy therethrough. In an embodiment, the second surfaces of terminal energy relay elements of each energy relay element stack may be arranged to form a singular seamless display surface. In an embodiment, the one or more energy relay element stacks may be configured to direct energy along energy propagation paths which extend between the one or more energy locations and the singular seamless display surfaces.

Figure 30:
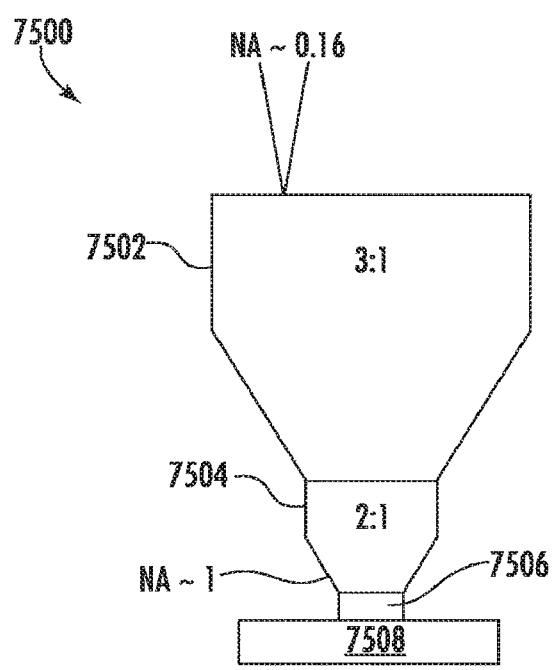
FIG. 30 illustrates a side view of an energy relay element stack comprising of two compound optical relay tapers in series.

FIG. 30 illustrates a side view of an energy relay element stack 7500 consisting of two compound optical relay tapers 7502, 7504 in series, both tapers with minified ends facing an energy source surface 7506, in accordance with an embodiment of the present disclosure. In FIG. 30, the input numerical aperture (NA) is 1.0 for the input of taper 7504, but only about 0.16 for the output of taper 7502. Notice that the output numerical aperture gets divided by the total magnification of 6, which is the product of 2 for taper 7504, and 3 for taper 7502. One advantage of this approach is the ability to customize the first energy wave relay element to account for various dimensions of energy source without alteration of the second energy wave relay element. It additionally provides the flexibility to alter the size of the output energy surface without changing the design of the energy source or the first relay element. Also shown in FIG. 30 is the energy source 7506 and the mechanical envelope 7508 containing the energy source drive electronics.

In an embodiment, the first surface may be configured to receive energy waves from an energy source unit (e.g., 7506), the energy source unit including a mechanical envelope having a width different than the width of at least one of the first surface and the second surface. In one embodiment, the energy waves passing through the first surface may have a first resolution, while the energy waves passing through the second surface may have a second resolution, such that the second resolution is no less than about 50% of the first resolution. In another embodiment, the energy waves, while having a uniform profile when presented to the first surface, may pass through the second surface radiating in every direction with an energy density in the forward direction that substantially fills a cone with an opening angle of +/−10 degrees relative to the normal to the second surface, irrespective of location on the second relay surface.

In one embodiment, the plurality of energy relay elements in the stacked configuration may include a plurality of faceplates (relays with unity magnification). In some embodiments, the plurality of faceplates may have different lengths or are loose coherent optical relays. In other embodiments, the plurality of elements may have sloped profile portions, where the sloped profile portions may be angled, linear, curved, tapered, faceted or aligned at a non-perpendicular angle relative to a normal axis of the relay element. In yet another embodiment, energy waves propagating through the plurality of relay elements have higher transport efficiency in the longitudinal orientation than in the transverse orientation and are spatially localized in the transverse orientation due to randomized refractive index variability in the transverse orientation coupled with minimal refractive index variation in the longitudinal orientation. In embodiments where each energy relay is constructed of multicore fiber, the energy waves propagating within each relay element may travel in the longitudinal orientation determined by the alignment of fibers in this orientation.

Optical Image Relay and Taper Elements

Extremely dense fiber bundles can be manufactured with a plethora of materials to enable light to be relayed with pixel coherency and high transmission. Optical fibers provide the guidance of light along transparent fibers of glass, plastic, or a similar medium. This phenomenon is controlled by a concept called total internal reflection. A ray of light will be totally internally reflected between two transparent optical materials with a different index of refraction when the ray is contained within the critical angle of the material and the ray is incident from the direction of the more dense material.

Figure 31:
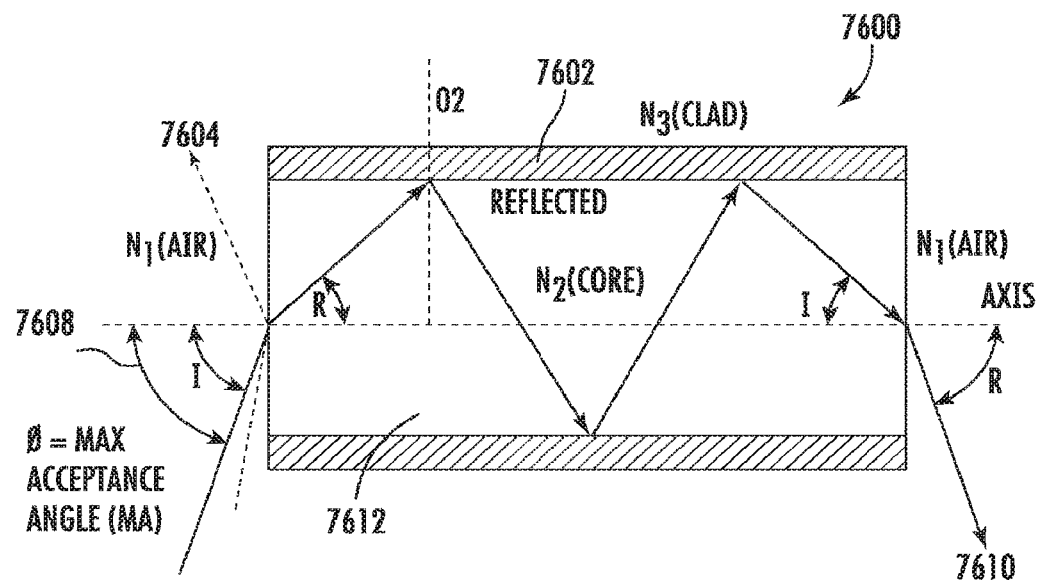
FIG. 31 illustrates an orthogonal view of the fundamental principles of internal reflection.

FIG. 31 illustrates an orthogonal view of fundamental principles of internal reflection 7600 detailing a maximum acceptance angle Ø 7608 (or NA of the material), core 7612 and clad 7602 materials with differing refractive indices, and reflected 7604 and refracted 7610 rays. In general, the transmission of light decreases by less than 0.001 percent per reflection and a fiber that is about 50 microns in diameter may have 3,000 reflections per foot, which is helpful to understand how efficient that light transmission may be as compared to other compound optical methodologies.

One can calculate the relationship between the angle of incidence (I) and the angle of refraction (R) with Snell's law:

$$\frac{\sin\theta_I}{\sin\theta_R} = \frac{n_2}{n_1},$$

where $n_1$ is the index of refraction of air and $n_2$ as the index of refraction of the core material 7612.

One skilled at the art of fiber optics will understand the additional optical principles associated with light gathering power, maximum angle of acceptance, and other required calculations to understand how light travels through the optical fiber materials. It is important to understand this concept, as the optical fiber materials should be considered a relay of light rather than a methodology to focus light as will be described within the following embodiments.

Understanding the angular distribution of light that exits the optical fiber is important to this disclosure, and may not be the same as would be expected based upon the incident angle. Because the exit azimuthal angle of the ray 7610 tends to vary rapidly with the maximum acceptance angle 7608, the length and diameter of the fiber, as well as the other parameters of the materials, the emerging rays tend to exit the fiber as a conical shape as defined by the incident and refracted angles.

Figure 32:
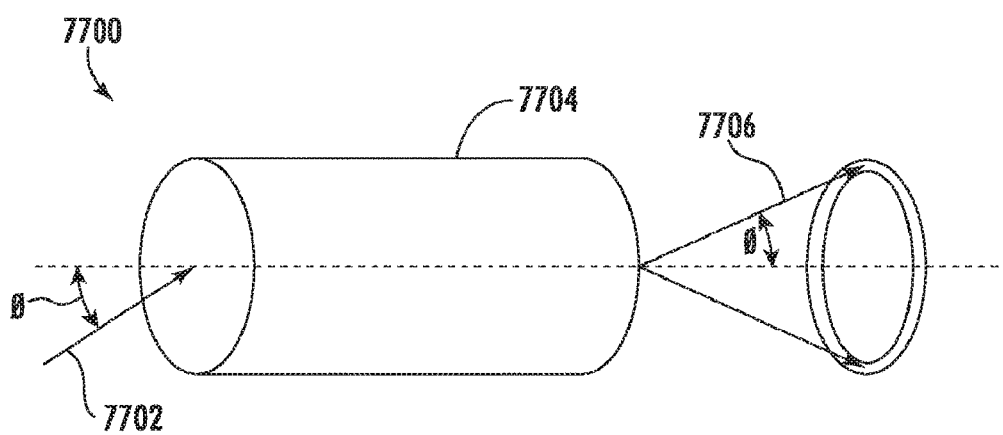
FIG. 32 illustrates an orthogonal view of a light ray entering an optical fiber, and the resulting conical light distribution at the exit of the relay.

FIG. 32 demonstrates how a ray of light 7702 entering an optical fiber 7704 may exit in a conical shape distribution of light 7706 with a specific azimuthal angle Ø. This effect may be observed by shining a laser pointer through a fiber and view the output ray at various distances and angles on a surface. The conical shape of exit with a distribution of light across the entire conical region (e.g., not only the radius of the conical shape) which will be an important concept moving forward with the designs proposed.

The main source for transmission loss in fiber materials are cladding, length of material, and loss of light for rays outside of the acceptance angle. The cladding is the material that surrounds each individual fiber within the larger bundle to insulate the core and help mitigate rays of light from traveling between individual fibers. In addition to this, additional opaque materials may be used to absorb light outside of acceptance angle called extra mural absorption (EMA). Both materials can help improve viewed image quality in terms of contrast, scatter and a number of other factors, but may reduce the overall light transmission from entry to exit. For simplicity, the percent of core to clad can be used to understand the approximate transmission potential of the fiber, as this may be one of the reasons for the loss of light. In most materials, the core to clad ratio may be in the range of approximately about 50% to about 80%, although other types of materials may be available and will be explored in the below discussion.

Each fiber may be capable of resolving approximately 0.5 photographic line pairs per fiber diameter, thus when relaying pixels, it may be important to have more than a single fiber per pixel. In some embodiments, a dozen or so per pixel may be utilized, or three or more fibers may be acceptable, as the average resolution between each of the fibers helps mitigate the associate MTF loss when leveraging these materials.

In one embodiment, optical fiber may be implemented in the form of a fiber optic faceplate. A faceplate is a collection of single or multi, or multi-multi fibers, fused together to form a vacuum-tight glass plate. This plate can be considered a theoretically zero-thickness window as the image presented to one side of the faceplate may be transported to the external surface with high efficiency. Traditionally, these faceplates may be constructed with individual fibers with a pitch of about 6 microns or larger, although higher density may be achieved albeit at the effectiveness of the cladding material which may ultimately reduce contrast and image quality.

In some embodiments, an optical fiber bundle may be tapered resulting in a coherent mapping of pixels with different sizes and commensurate magnification of each surface. For example, the magnified end may refer to the side of the optical fiber element with the larger fiber pitch and higher magnification, and the minified end may refer to the side of the optical fiber element with the smaller fiber pitch and lower magnification. The process of producing various shapes may involve heating and fabrication of the desired magnification, which may physically alter the original pitch of the optical fibers from their original size to a smaller pitch thus changing the angles of acceptance, depending on location on the taper and NA. Another factor is that the fabrication process can skew the perpendicularity of fibers to the flat surfaces. One of the challenges with a taper design, among others, is that the effective NA of each end may change approximately proportional to the percentage of magnification. For example, a taper with a 2:1 ratio may have a minified end with a diameter of 10 mm and a magnified end with a diameter of 20 mm. If the original material had an NA of 0.5 with a pitch of 10 microns, the minified end will have an approximately effective NA of 1.0 and pitch of 5 microns. The resulting acceptance and exit angles may change proportionally as well. There is far more complex analysis that can be performed to understand the exacting results from this process and anyone skilled in the art will be able to perform these calculations. For the purposes of this discussion, these generalizations are sufficient to understand the imaging implications as well as overall systems and methods.

Use of Flexible Energy Sources and Curved Energy Relay Surfaces

It may be possible to manufacture certain energy source technologies or energy projection technologies with curved surfaces. For example, in one embodiment, for a source of energy, a curved OLED display panel may be used. In another embodiment, for a source of energy, a focus-free laser projection system may be utilized. In yet another embodiment, a projection system with a sufficiently wide depth of field to maintain focus across the projected surface may be employed. For the avoidance of doubt, these examples are provided for exemplary purposes and in no way limit the scope of technological implementations for this description of technologies.

Given the ability for optical technologies to produce a steered cone of light based upon the chief ray angle (CRA) of the optical configuration, by leveraging a curved energy surface, or a curved surface that may retain a fully focused projected image with known input angles of light and respective output modified angles may provide a more idealized viewed angle of light.

In one such embodiment, the energy surface side of the optical relay element may be curved in a cylindrical, spherical, planar, or non-planar polished configuration (herein referred to as "geometry" or "geometric") on a per module basis, where the energy source originates from one more source modules. Each effective light-emitting energy source has its own respective viewing angle that is altered through the process of deformation. Leveraging this curved energy source or similar panel technology allows for panel technology that may be less susceptible to deformation and a reconfiguration of the CRA or optimal viewing angle of each effective pixel.

Figure 33:
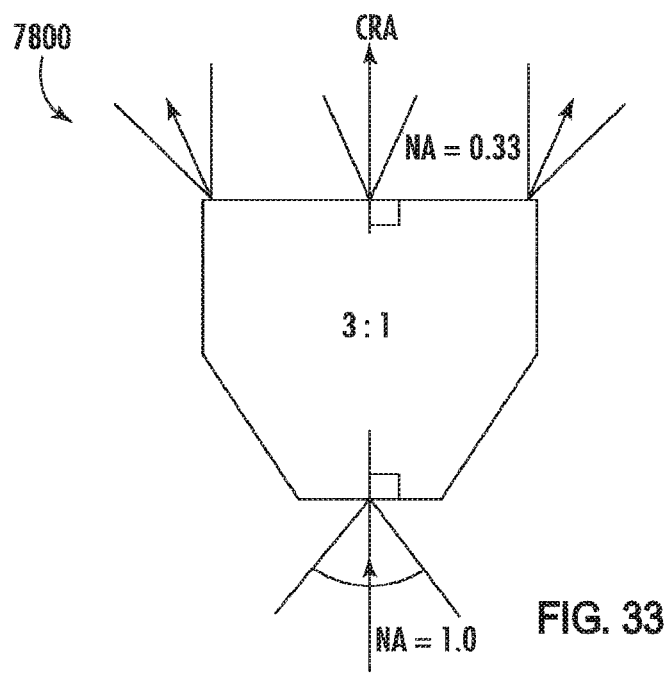
FIG. 33 illustrates an orthogonal view of an optical taper relay configuration with a 3:1 magnification factor and the resulting viewed angle of light of an attached energy source, in accordance with one embodiment of the present disclosure.

FIG. 33 illustrates an orthogonal view of an optical relay taper configuration 7800 with a 3:1 magnification factor and the resulting viewed angle of light of an attached energy source, in accordance with one embodiment of the present disclosure. The optical relay taper has an input NA of 1.0 with a 3:1 magnification factor resulting in an effective NA for output rays of approximately 0.33 (there are many other factors involved here, this is for simplified reference only), with planar and perpendicular surfaces on either end of the tapered energy relay, and an energy source attached to the minified end. Leveraging this approach alone, the angle of view of the energy surface may be approximately ⅓ of that of the input angle. For the avoidance of doubt, a similar configuration with an effective magnification of 1:1 (leveraging an optical faceplate or otherwise) may additionally be leveraged, or any other optical relay type or configuration.

Figure 34:
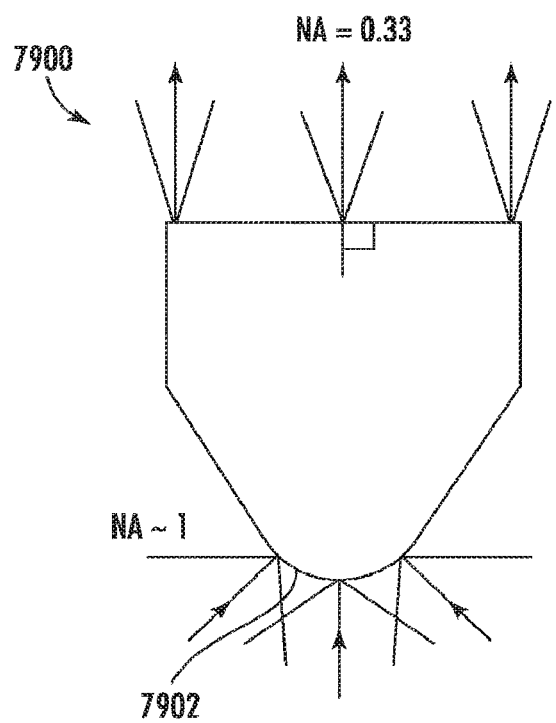
FIG. 34 illustrates an orthogonal view of the optical taper relay of FIG. 33, but with a curved surface on the energy source side of the optical taper relay resulting in the increased overall viewing angle of the energy source, in accordance with one embodiment of the present disclosure.

FIG. 34 illustrates the same tapered energy relay module 7900 as that of FIG. 33 but now with a surface on an energy source side having a curved geometric configuration 7902 while a surface opposite an energy source side 7903 having a planar surface and perpendicular to an optical axis of the module 7900. With this approach, the input angles (e.g., see arrows near 7902) may be biased based upon this geometry, and the output angles (e.g., see arrows near 7903) may be tuned to be more independent of location on the surface, different than that of FIG. 33, given the curved surface 7902 as exemplified in FIG. 34, although the viewable exit cone of each effective light emission source on surface 7903 may be less than the viewable exit cone of the energy source input on surface 7902. This may be advantageous when considering a specific energy surface that optimizes the viewed angles of light for wider or more compressed density of available rays of light.

In another embodiment, variation in output angle may be achieved by making the input energy surface 7902 convex in shape. If such a change were made, the output cones of light near the edge of the energy surface 7903 would turn in toward the center.

In some embodiments, the relay element device may include a curved energy surface. In one example, both the surfaces of the relay element device may be planar. Alternatively, in other examples, one surface may be planar and the other surface may be non-planar, or vice versa. Finally, in another example, both the surfaces of the relay element device may be non-planar. In other embodiments, a non-planar surface may be a concave surface or a convex surface, among other non-planar configurations. For example, both surfaces of the relay element may be concave. In the alternative, both surfaces may be convex. In another example, one surface may be concave and the other may be convex. It will be understood by one skilled in the art that multiple configurations of planar, non-planar, convex and concave surfaces are contemplated and disclosed herein.

Figure 35:
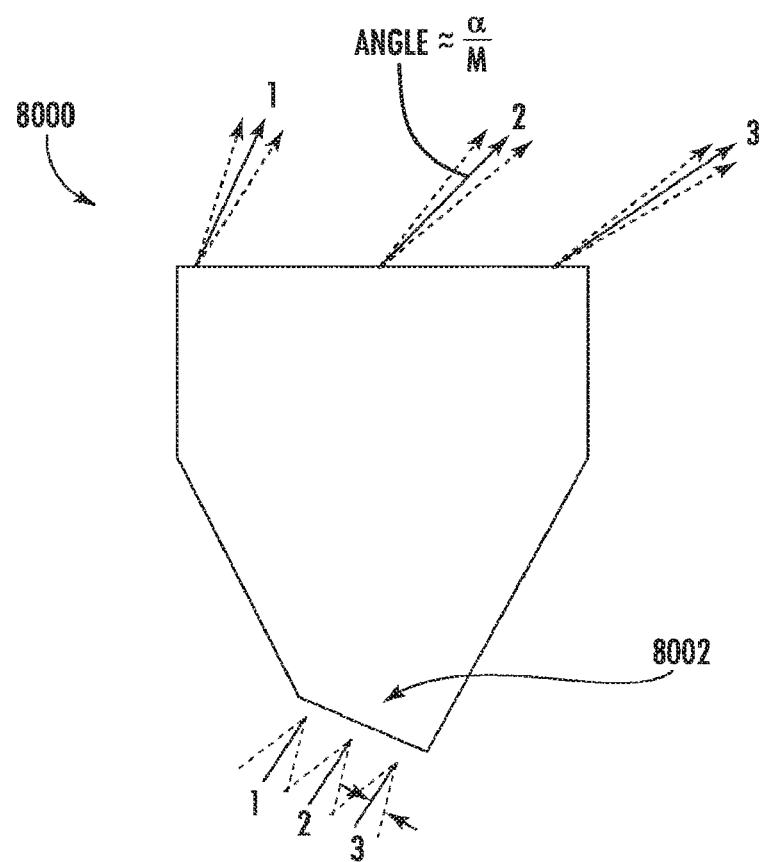
FIG. 35 illustrates an orthogonal view of the optical taper relay of FIG. 33, but with non-perpendicular but planar surface on the energy source side, in accordance with one embodiment of the present disclosure.

FIG. 35 illustrates an orthogonal view of an optical relay taper 8000 with a non-perpendicular but planar surface 8002 on the energy source side, in accordance with another embodiment of the present disclosure. To articulate the significant customizable variation in the energy source side geometries, FIG. 35 illustrates the result of simply creating a non-perpendicular but planar geometry for the energy source side for comparison to FIG. 34 and to further demonstrate the ability to directly control the input acceptance cone angle and the output viewable emission cone angles of light 1, 2, 3 that are possible with any variation in surface characteristics.

Depending on the application, it may also be possible to design an energy relay configuration with the energy source side of the relay remaining perpendicular to the optical axis that defines the direction of light propagation within the relay, and the output surface of the relay being non-perpendicular to the optical axis. Other configurations may have both the input energy source side and the energy output side exhibiting various non-perpendicular geometric configurations. With this methodology, it may be possible to further increase control over the input and output energy source viewed angles of light.

In some embodiments, tapers may also be non-perpendicular to the optical axis of the relay to optimize a particular view angle. In one such embodiment, a single taper such as the one shown in FIG. 33 may be cut into quadrants by cuts parallel with the optical axis, with the large end and small end of the tapers cut into four equal portions. These four quadrants and then re-assembled with each taper quadrant rotated about the individual optical center axis by 180 degrees to have the minified end of the taper facing away from the center of the re-assembled quadrants thus optimizing the field of view. In other embodiments, non-perpendicular tapers may also be manufactured directly as well to provide increased clearance between energy sources on the minified end without increasing the size or scale of the physical magnified end. These and other tapered configurations are disclosed herein.

Figure 36:
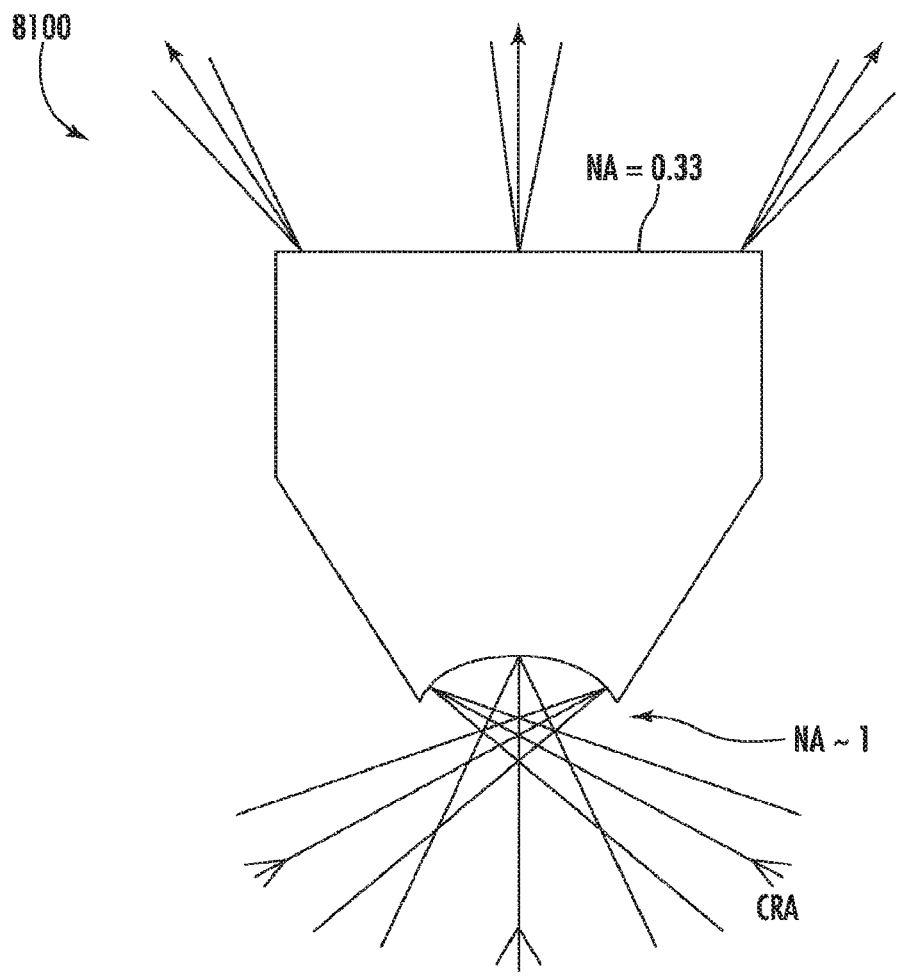
FIG. 36 illustrates an orthogonal view of an embodiment of the optical relay and illumination cones of FIG. 33 with a concave surface on the side of the energy source.

FIG. 36 illustrates an orthogonal view of the optical relay and light illumination cones of FIG. 33 with a concave surface on the side of the energy source. In this case, the cones of output light are significantly more diverged near the edges of the output energy surface plane than if the energy source side were flat, in comparison with FIG. 33.

Figure 37:
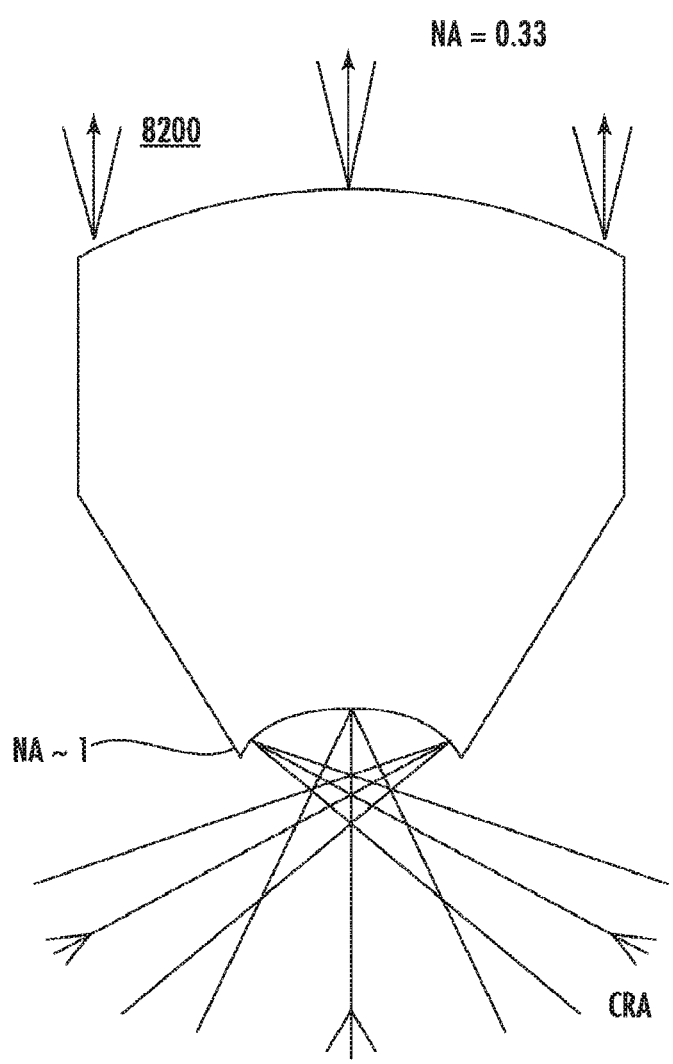
FIG. 37 illustrates an orthogonal view of an embodiment of the optical taper relay and light illumination cones of FIG. 36 with the same concave surface on the side of the energy source, but with a convex output energy surface geometry, in accordance with one embodiment of the present disclosure.

FIG. 37 illustrates an orthogonal view of the optical taper relay 8200 and light illumination cones of FIG. 36 with the same concave surface on the side of the energy source. In this example, the output energy surface 8202 has a convex geometry. Compared to FIG. 36, the cones of output light on the concave output surface 8202 are more collimated across the energy source surface due to the input acceptances cones and the exit cone of light produced from this geometric configuration. For the avoidance of doubt, the provided examples are illustrative only and not intended to dictate explicit surface characteristics, since any geometric configuration for the input energy source side and the output energy surface may be employed depending on the desired angle of view and density of light for the output energy surface, and the angle of light produced from the energy source itself.

In some embodiments, multiple relay elements may be configured in series. In one embodiment, any two relay elements in series may additionally be coupled together with intentionally distorted parameters such that the inverse distortions from one element in relation to another help optically mitigate any such artifacts. In another embodiment, a first optical taper exhibits optical barrel distortions, and a second optical taper may be manufactured to exhibit the inverse of this artifact, to produce optical pin cushion distortions, such than when aggregated together, the resultant information either partially or completely cancels any such optical distortions introduced by any one of the two elements. This may additionally be applicable to any two or more elements such that compound corrections may be applied in series.

In some embodiments, it may be possible to manufacturer a single energy source board, electronics, and/or the like to produce an array of energy sources and the like in a small and/or lightweight form factor. With this arrangement, it may be feasible to further incorporate an optical relay mosaic such that the ends of the optical relays align to the energy source active areas with an extremely small form factor by comparison to individual components and electronics. Using this technique, it may be feasible to accommodate small form factor devices like monitors, smart phones and the like.

Figure 38:
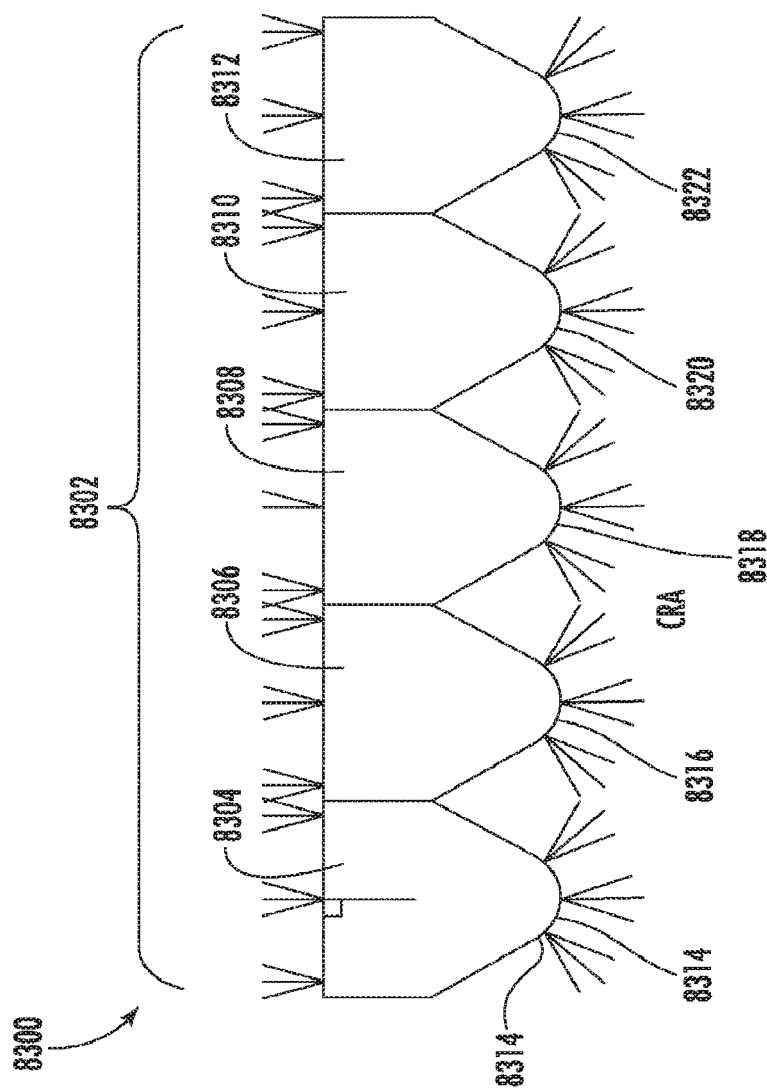
FIG. 38 illustrates an orthogonal view of multiple optical taper modules coupled together with curved energy source side surfaces to form an energy source viewable image from a perpendicular energy source surface, in accordance with one embodiment of the present disclosure.

FIG. 38 illustrates an orthogonal view of an assembly 8300 of multiple optical taper relay modules 8304, 8306, 8308, 8310, 8312 coupled together with curved energy source side surfaces 8314, 8316, 8318, 8320, 8322, respectively, to form an optimal viewable image 8302 from a plurality of perpendicular output energy surfaces of each taper, in accordance with one embodiment of the present disclosure. In this instance, the taper relay modules 8304, 8306, 8308, 8310, 8312 are formed in parallel. Although only a single row of taper relay modules is shown, in some embodiments, tapers with a stacked configuration may also be coupled together in parallel and in a row to form a contiguous, seamless viewable image 8302.

In FIG. 38, each taper relay module may operate independently or be designed based upon an array of optical relays. As shown in this figure, five modules with optical taper relays 8304, 8306, 8308, 8310, 8312 are aligned together producing a larger optical taper output energy surface 8302. In this configuration, the output energy surface 8302 may be perpendicular to the optical axis of each relay, and each of the five energy source sides 8314, 8316, 8318, 8320, 8322 may be deformed in a circular contour about a center axis that may lie in front of the output energy surface 8302, or behind this surface, allowing the entire array to function as a single output energy surface rather than as individual modules. It may additionally be possible to optimize this assembly structure 8300 further by computing the output viewed angle of light and determining the ideal surface characteristics required for the energy source side geometry. FIG. 38 illustrates one such embodiment where multiple modules are coupled together and the energy source side curvature accounts for the larger output energy surface viewed angles of light. Although five relay modules 8304, 8306, 8308, 8310, 8312 are shown, it will be appreciated by one skilled in the art that more or fewer relay modules may be coupled together depending on the application, and these may be coupled together in two dimensions to form an arbitrarily large output energy surface 8302.

In one embodiment, the system of FIG. 38 includes a plurality of relay elements 8304, 8306, 8308, 8310, 8312 arranged across first and second directions (e.g., across a row or in stacked configuration), where each of the plurality of relay elements extends along a longitudinal orientation between first and second surfaces of the respective relay element. In some embodiments, the first and second surfaces of each of the plurality of relay elements extends generally along a transverse orientation defined by the first and second directions, wherein the longitudinal orientation is substantially normal to the transverse orientation. In other embodiments, randomized refractive index variability in the transverse orientation coupled with minimal refractive index variation in the longitudinal orientation results in energy waves having substantially higher transport efficiency along the longitudinal orientation, and spatial localization along the transverse orientation.

In one embodiment, the plurality of relay elements may be arranged across the first direction or the second direction to form a single tiled surface along the first direction or the second direction, respectively. In some embodiments, the plurality of relay elements are arranged in a matrix having at least a 2×2 configuration, or in other matrices including without limitation a 3×3 configuration, a 4×4 configuration, a 3×10 configuration, and other configurations as can be appreciated by one skilled in the art. In other embodiments, seams between the single tiled surface may be imperceptible at a viewing distance of twice a minimum dimension of the single tiled surface.

In some embodiments, each of the plurality of relay elements (e.g. 8304, 8306, 8308, 8310, 8312) have randomized refractive index variability in the transverse orientation coupled with minimal refractive index variation in the longitudinal orientation, resulting in energy waves having substantially higher transport efficiency along the longitudinal orientation, and spatial localization along the transverse orientation. In some embodiments where the relay is constructed of multicore fiber, the energy waves propagating within each relay element may travel in the longitudinal orientation determined by the alignment of fibers in this orientation.

In other embodiments, each of the plurality of relay elements (e.g. 8304, 8306, 8308, 8310, 8312) is configured to transport energy along the longitudinal orientation, and wherein the energy waves propagating through the plurality of relay elements have higher transport efficiency in the longitudinal orientation than in the transverse orientation due to the randomized refractive index variability such that the energy is localized in the transverse orientation. In some embodiments, the energy waves propagating between the relay elements may travel substantially parallel to the longitudinal orientation due to the substantially higher transport efficiency in the longitudinal orientation than in the transverse orientation. In other embodiments, randomized refractive index variability in the transverse orientation coupled with minimal refractive index variation in the longitudinal orientation results in energy waves having substantially higher transport efficiency along the longitudinal orientation, and spatial localization along the transverse orientation.

Figure 39:
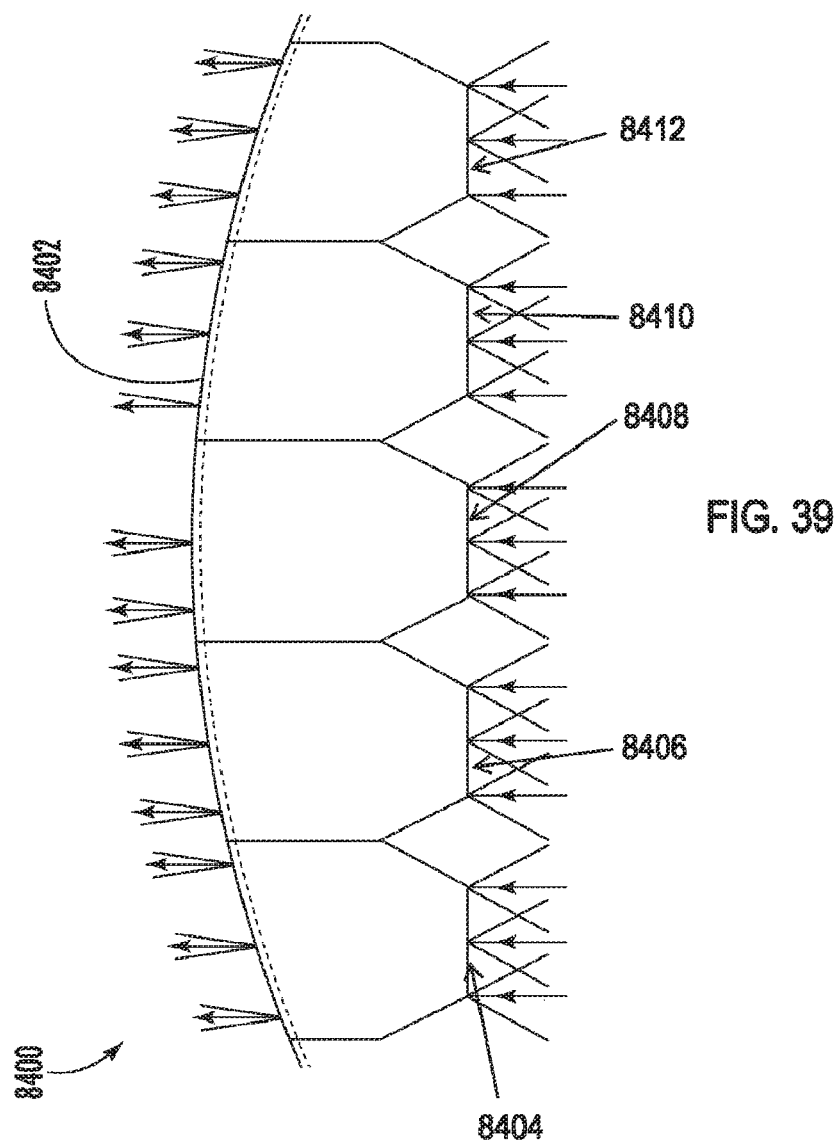
FIG. 39 illustrates an orthogonal view of multiple optical taper modules coupled together with perpendicular energy source side geometries and a convex energy source surface radial about a center axis, in accordance with one embodiment of the present disclosure.

FIG. 39 illustrates an orthogonal view of an arrangement 8400 of multiple optical taper relay modules coupled together with perpendicular energy source side geometries 8404, 8406, 8408, 8410, and 8412, and a convex energy source surface 8402 that is radial about a center axis, in accordance with one embodiment of the present disclosure. FIG. 39 illustrates a modification of the configuration shown in FIG. 38, with perpendicular energy source side geometries and a convex output energy surface that is radial about a center axis.

Figure 40:
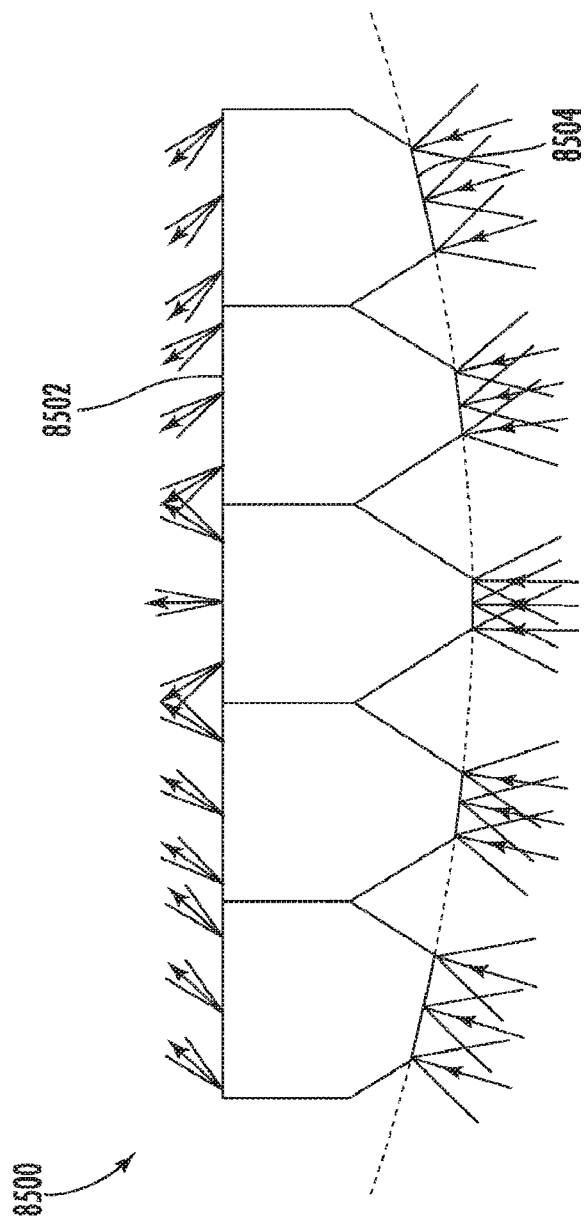
FIG. 40 illustrates an orthogonal view of multiple optical taper relay modules coupled together with perpendicular energy source side geometries and a convex energy source side surface radial about a center axis, in accordance with one embodiment of the present disclosure.

FIG. 40 illustrates an orthogonal view of an arrangement 8500 of multiple optical relay modules coupled together with perpendicular output energy surface 8502 and a convex energy source side surface 8504 radial about a center axis, in accordance with another embodiment of the present disclosure.

In some embodiments, by configuring the source side of the array of energy relays in a cylindrically curved shape about a center radius, and having a flat energy output surface, the input energy source acceptance angle and the output energy source emission angles may be decoupled, and it may be possible to better align each energy source module to the energy relay acceptance cone, which may itself be limited due to constraints on parameters such as energy taper relay magnification, NA, and other factors.

Figure 41:
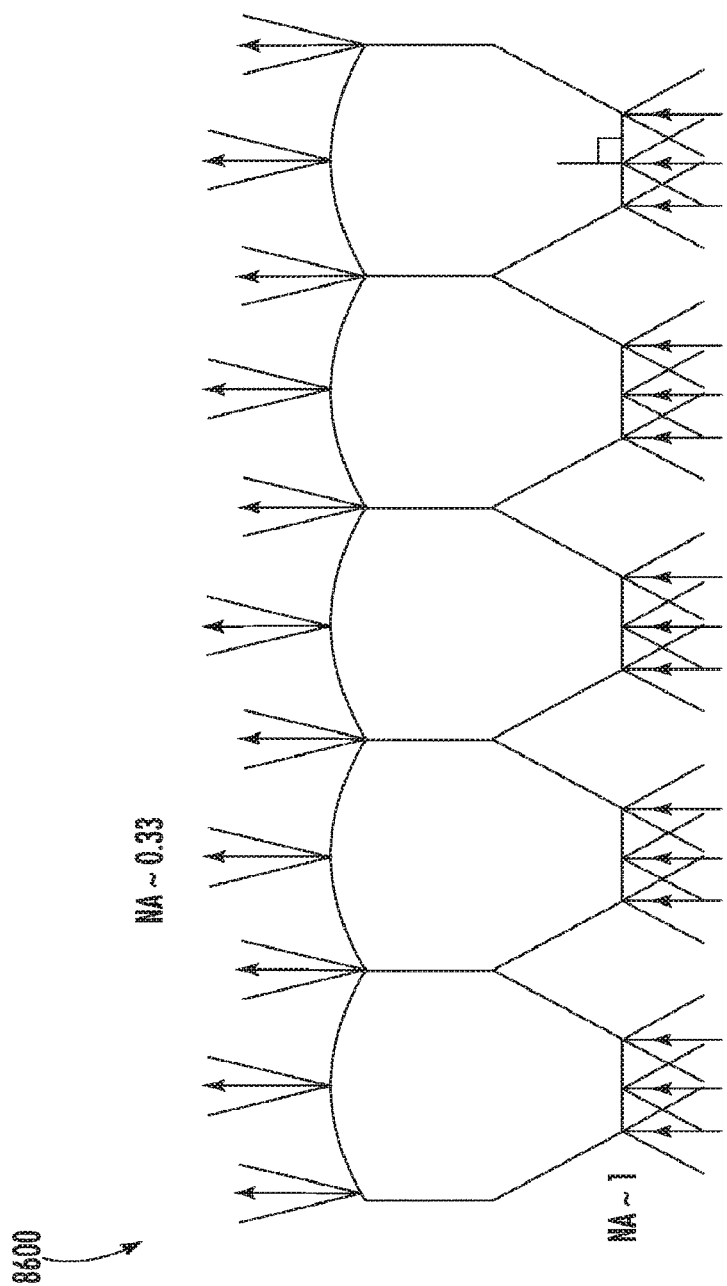
FIG. 41 illustrates an orthogonal view of multiple optical taper relay modules with each energy source independently configured such that the viewable output rays of light are more uniform as viewed at the energy source, in accordance with one embodiment of the present disclosure.

FIG. 41 illustrates an orthogonal view of an arrangement 8600 of multiple energy relay modules with each energy output surface independently configured such that the viewable output rays of light, in accordance with one embodiment of the present disclosure. FIG. 41 illustrates the configuration similar to that of FIG. 40, but with each energy relay output surface independently configured such that the viewable output rays of light are emitted from the combined output energy surface with a more uniform angle with respect to the optical axis (or less depending on the exact geometries employed).

Figure 42:
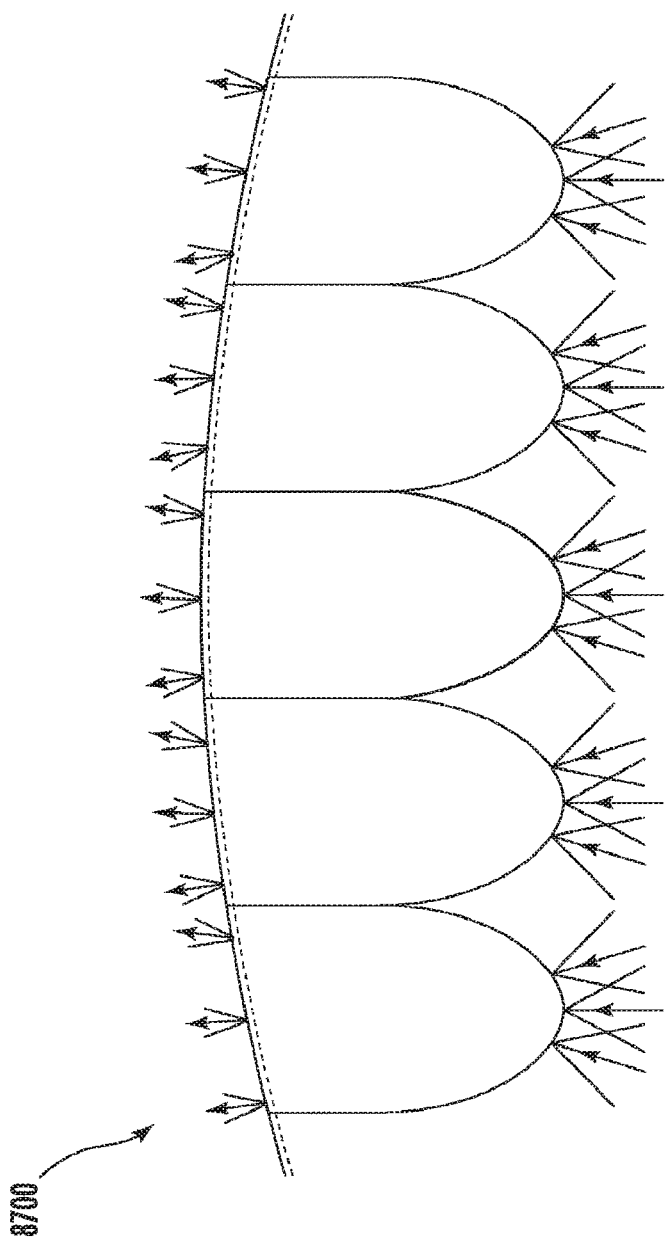
FIG. 42 illustrates an orthogonal view of multiple optical taper relay modules where both the energy source side and the energy source are configured with various geometries to provide control over the input and output rays of light, in accordance with one embodiment of the present disclosure.

FIG. 42 illustrates an orthogonal view of an arrangement 8700 of multiple optical relay modules where both the emissive energy source side and the energy relay output surface are configured with various geometries producing explicit control over the input and output rays of light, in accordance with one embodiment of the present disclosure. To this end, FIG. 42 illustrates a configuration with five modules where both the emissive energy source side and the relay output surface are configured with curved geometries allowing greater control over the input and output rays of light.

Figure 43:
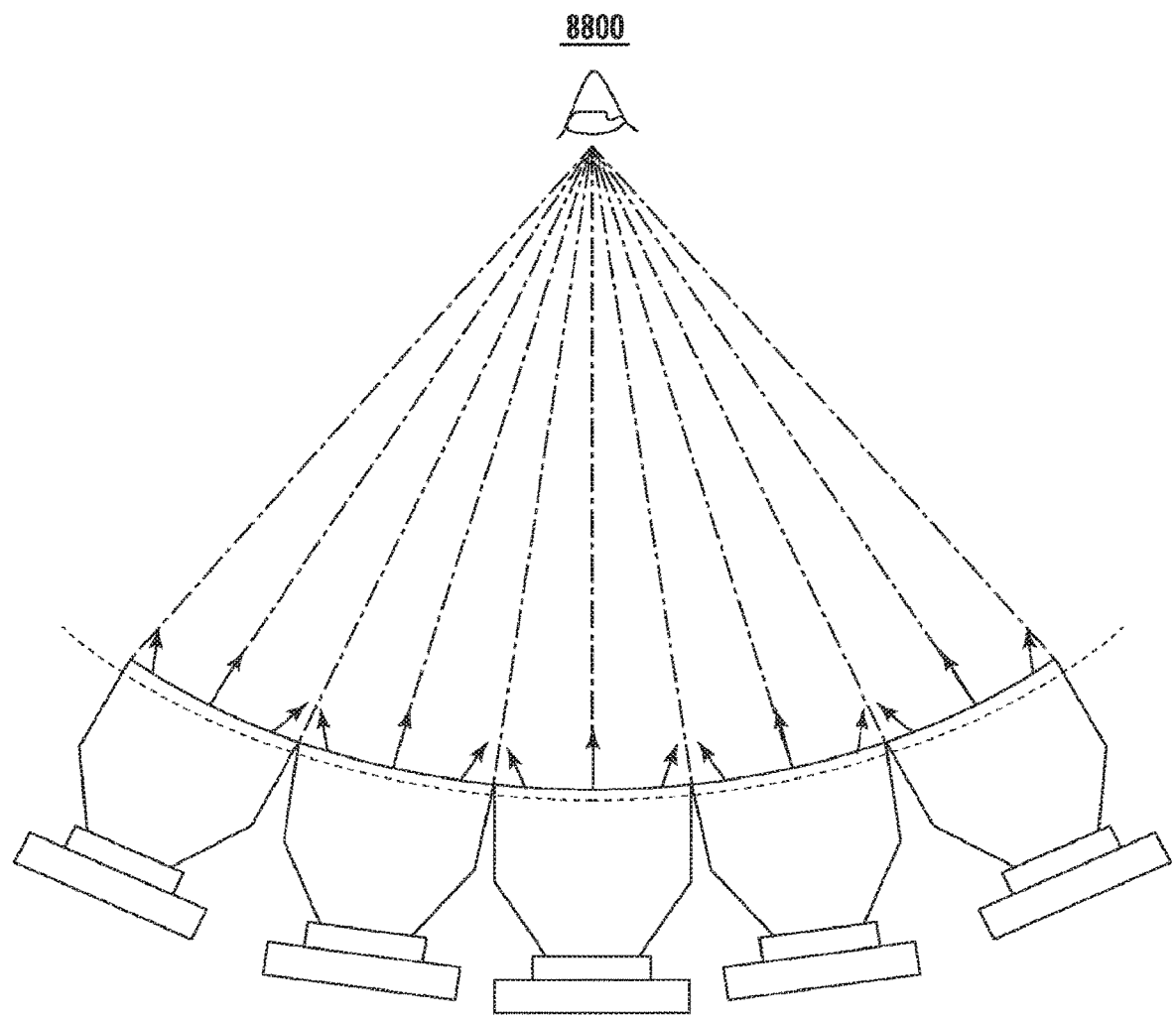
FIG. 43 illustrates an orthogonal view of an arrangement of multiple optical taper relay modules whose individual output energy surfaces have been ground to form a seamless concave cylindrical energy source which surrounds the viewer, with the source ends of the relays flat and each bonded to an energy source.

FIG. 43 illustrates an orthogonal view of an arrangement 8800 of multiple optical relay modules whose individual output energy surfaces have been ground to form a seamless concave cylindrical energy source surface which surrounds the viewer, with the source ends of the relays flat and each bonded to an energy source.

In the embodiment shown in FIG. 43, and similarly in the embodiments shown in FIGS. 81, 82, 83, 84 and 85, a system may include a plurality of energy relays arranged across first and second directions, where in each of the relays, energy is transported between first and second surfaces which defines the longitudinal orientation, the first and second surfaces of each of the relays extends generally along a transverse orientation defined by the first and second directions, where the longitudinal orientation is substantially normal to the transverse orientation. Also in this embodiment, energy waves propagating through the plurality of relays have higher transport efficiency in the longitudinal orientation than in the transverse orientation due to high refractive index variability in the transverse orientation coupled with minimal refractive index variation in the longitudinal orientation. In some embodiments where each relay is constructed of multicore fiber, the energy waves propagating within each relay element may travel in the longitudinal orientation determined by the alignment of fibers in this orientation.

In one embodiment, similar to that discussed above, the first and second surfaces of each of the plurality of relay elements, in general, can curve along the transverse orientation and the plurality of relay elements can be integrally formed across the first and second directions. The plurality of relays can be assembled across the first and second directions, arranged in a matrix having at least a 2×2 configuration, and include glass, optical fiber, optical film, plastic, polymer, or mixtures thereof. In some embodiments, a system of a plurality of relays may be arranged across the first direction or the second direction to form a single tiled surface along the first direction or the second direction, respectively. Like above, the plurality of relay elements can be arranged in other matrices including without limitation a 3×3 configuration, a 4×4 configuration, a 3×10 configuration, and other configurations as can be appreciated by one skilled in the art. In other embodiments, seams between the single tiled surface may be imperceptible at a viewing distance of twice a minimum dimension of the single tiled surface.

For a mosaic of energy relays, the following embodiments may be included: both the first and second surfaces may be planar, one of the first and second surfaces may be planar and the other non-planar, or both the first and second surfaces may be non-planar. In some embodiments, both the first and second surfaces may be concave, one of the first and second surfaces may be concave and the other convex, or both the first and second surfaces may be convex. In other embodiments, at least one of the first and second surfaces may be planar, non-planar, concave or convex. Surfaces that are planar may be perpendicular to the longitudinal direction of energy transport, or non-perpendicular to this optical axis.

In some embodiments, the plurality of relays can cause spatial magnification or spatial de-magnification of energy sources, including but not limited to electromagnetic waves, light waves, acoustical waves, among other types of energy waves. In other embodiments, the plurality of relays may also include a plurality of energy relays (e.g., such as faceplates for energy source), with the plurality of energy relays having different widths, lengths, among other dimensions. In some embodiments, the plurality of energy relays may also include loose coherent optical relays or fibers.

Multi-Energy Domain Transmission

During any stage of the manufacturing process of an energy relay material, it is possible to introduce a processing step to effectively allow the relay material to then transport energy belonging to two or more substantially different energy domains. This may involve adding secondary patterning, secondary structures, or other material or design modifications, to a relay material.

In an embodiment, an energy domain may refer to the range of wavelengths of electromagnetic energy that may be effectively propagated through a material. Thus different energy domains may refer to different ranges of wavelengths of electromagnetic energy. Various established electromagnetic energy domains and energy sub-domains are well known to those skilled in the art. Additionally, in an embodiment, energy domain may refer to a type of energy, such as electromagnetic energy, acoustic energy, tactile or vibrational energy, etc., which propagate via different physical phenomena. The scope of the present disclosure should not be seen as limited to only one type of energy, nor to a single energy wavelength or magnitude, or a single range of wavelengths or magnitudes.

Figure 23A:
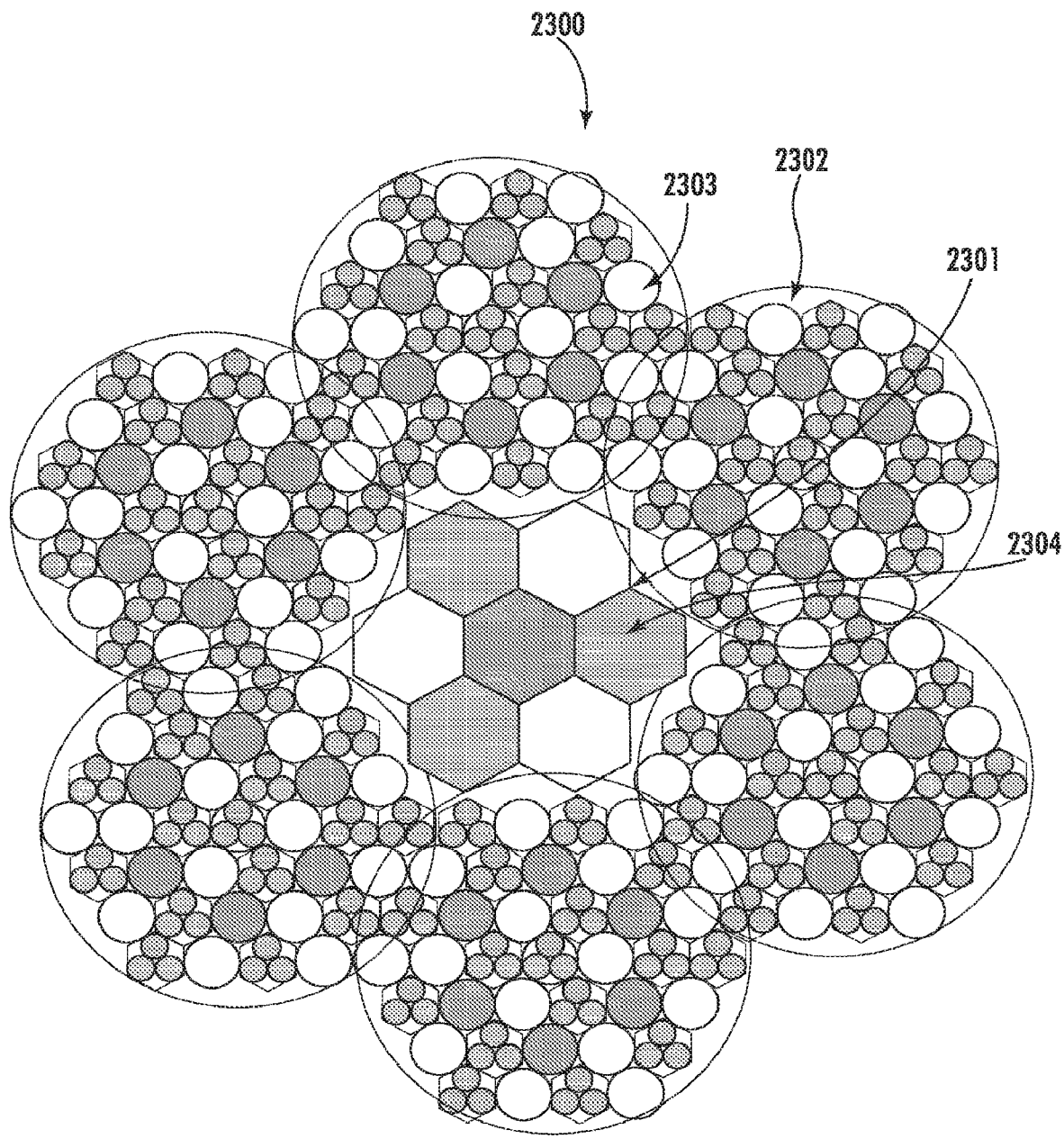
FIG. 23A illustrates a cutaway view on the transverse plane of an ordered energy relay capable of transporting energy of multiple energy domains.

FIG. 23A illustrates a cutaway view on the transverse plane of an ordered energy relay 2300 capable of transporting energy of multiple energy domains. In FIG. 23A, energy relay 2300 comprises two distinct types of energy transport material: material 2301 and material 2302. Materials 2301 and 2302 may be designed such that material 2301 comprises particles, such as particles 2304, of a certain size configured to localize energy falling within a first energy domain, and material 2302 comprises particles, such as particles 2303, of a certain size configured to localize energy falling within a second energy domain, different from the first energy domain. In an embodiment, the relay material 2301 transmits mechanical energy in the form of ultrasound waves, and relay material 2302 transmits electromagnetic energy in the form of visible electromagnetic energy. In other embodiments, it is possible that there exists any number of energy relay materials which act to transport energy. In other embodiments, the one or more energy transport materials are made of a random distribution of component engineered structures (CES), and thus exhibit Transverse Anderson Localization of energy. In different embodiments, like the one shown in FIG. 23A, one or more relays is constructed with CES arranged in an Ordered distribution, and thus exhibits Ordered Energy Localization, as described earlier in this disclosure. It should be appreciated that multiple energy domain relays may be constructed so that each relay material may exhibit either Anderson Localization or Ordered Energy Localization. Furthermore, in other embodiments, it is possible to have relays with both transport mechanisms. In one embodiment, there is one type reserved for each energy domain, or each energy transport direction for a given energy domain.

In an embodiment, materials 2301 and 2302 may be designed such that energy falling within a first energy domain will pass through material 2301 and reflect off of material 2302, and energy falling within a second energy domain, different than the first energy domain, will pass through material 2302 and reflect off of material 2301.

Materials 2301 and 2302 may, in certain embodiments, be the same material but possess substantially different sizes in order to achieve the desired energy domain selection. If, in the manufacturing process, the size of a given energy relay material is to be reduced, after reduction a larger sized material may be introduced into the energy relay, which may then undergo all subsequent processing steps and result in a relay with selectivity for energy propagation in two or more different energy domains.

The multiple energy domain relay shown in FIG. 23A can be leveraged to construct an energy surface which comprises energy locations to be closely interleaved, preserving the spatial resolution of each type of energy that may be transported by the relay. For example, in an embodiment where material 2301 transports ultrasound energy, and material 2302 transports electromagnetic energy in the form of an image, the image may be transported through the relay with a resolution that is only slightly reduced by the presence of material 2301, as long as material 2301 is dimensioned appropriately, and used at irregular and/or sparse intervals.

Figure 23B:
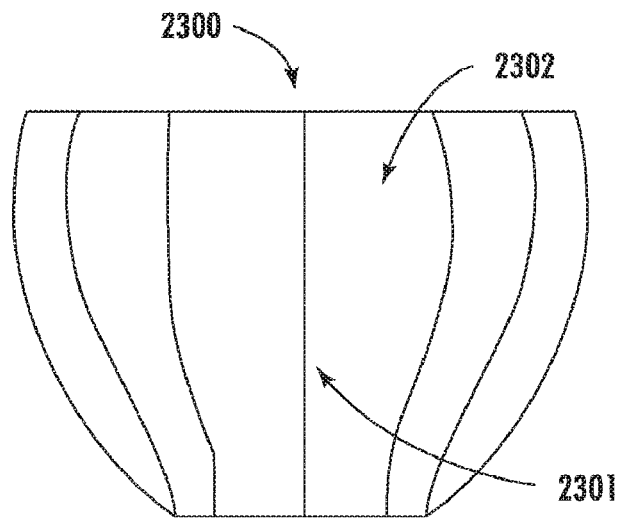
FIG. 23B illustrates a cutaway view in the longitudinal plane of an ordered energy relay capable of transporting energy of multiple energy domains.

FIG. 23B illustrates a cutaway view in the longitudinal plane of an ordered energy relay 2300 capable of transporting energy of multiple energy domains. The white regions in FIG. 23B illustrate material 2302 from FIG. 23A, and the black lines illustrate material 2301 from FIG. 23A. FIG. 23B demonstrates what a relay material with selectivity for multiple energy domains may appear like in a cross-sectional view along the longitudinal (or propagation) direction. In an embodiment, regions of 2302 may be high-density particles with selectivity for the propagation of light, while regions of 2301 may be larger particles with selectivity for the propagation of ultrasonic frequencies. One skilled in the art can appreciate the advantages having multiple energy domains of energy propagation within a single relay material may provide.

Figure 24:
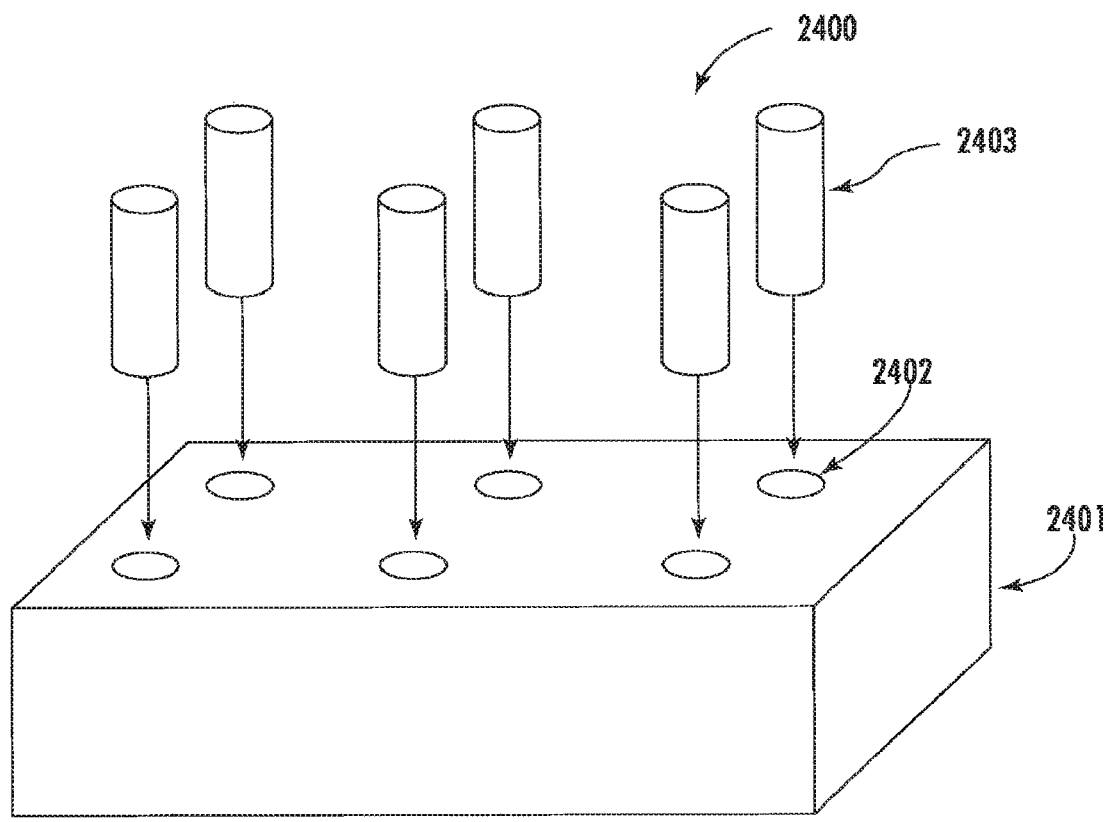
FIG. 24 illustrates a system for manufacturing an energy relay material capable of propagating energy of two different energy domains.

FIG. 24 illustrates a system 2400 for manufacturing an energy relay material capable of propagating energy of two different energy domains. In FIG. 24, a block 2401 of energy relay material is provided. In an embodiment, the block 2401 of energy relay material may be configured to transport energy belonging to a first energy domain along a longitudinal plane of the block. One or more mechanical openings, such as 2402, may be formed such that a second pattern is introduced into the material. These regions may be drilled, carved, melted, formed, fused, etched, laser cut, chemically formed, or otherwise produced in a regular or non-regular pattern appropriate for the desired energy domain. In an embodiment, the mechanical openings 2402 may be left empty. For example, in an embodiment, a relay material may comprise holes which form waveguides for the propagation of sound waves.

In an embodiment, a second material, such as material 2403, may be added to fill the mechanical openings 2402. Material 2403 may possess properties that allow the propagation of energy of a different energy domain than that of block 2401. Thus, once material 2403 is integrated to block 2401, the resultant relay will effectively propagate energy of two different energy domains. For example, block 2401 may be configured to propagate localized electromagnetic energy for the transport of high-resolution images, while the plugs 2403 may be removed from the holes 2402, and replaced with an energy relay which is designed for the transport of ultrasonic sound waves. The resulting energy relay material may allow for higher transport efficiency in the longitudinal plane than in the transverse plane, for the two energy domains.

In an embodiment, a relay element in the form of a faceplate or block designed for visible light has a series of micro perforations cut through the surface of the faceplate in order to introduce flexible acoustic mechanical waveguide tubes into the energy relay material.

Figure 25:
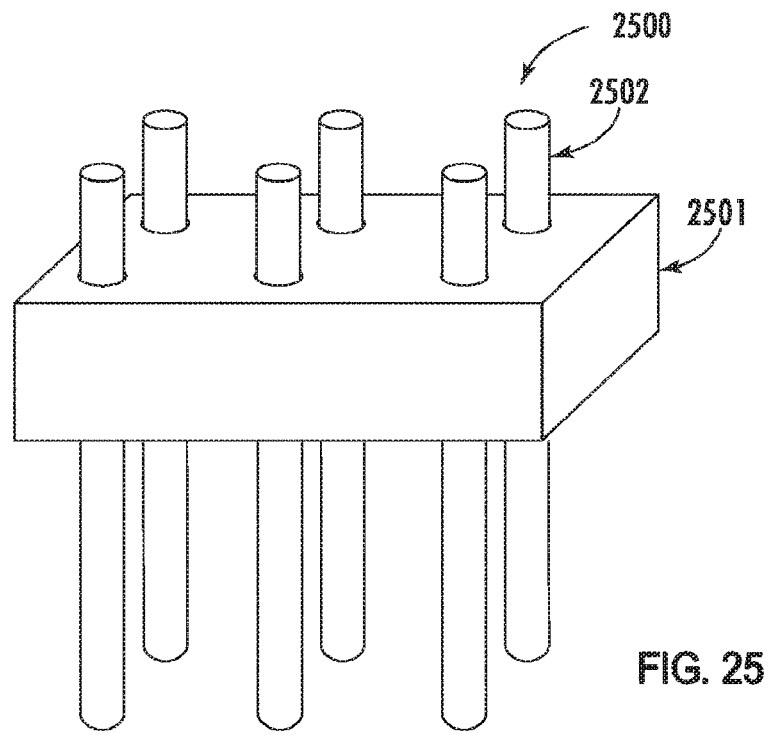
FIG. 25 illustrates a perspective view of an energy relay element capable of relaying energy of two different energy domains.

FIG. 25 illustrates a perspective view of an energy relay element 2500 capable of relaying energy of two different energy domains. Relay 2500 may comprise a first material 2501 and a second material 2502. Materials 2501 and 2502 may be substantially the same material, but differ in a dimensional size or shape. Alternately, materials 2501 and 2502 may be different materials with varying energy propagation properties. Both materials 2501 and 2502 may comprise a plurality of ordered or disordered substituent energy relay particles, or may be monolithic materials.

Figure 26:
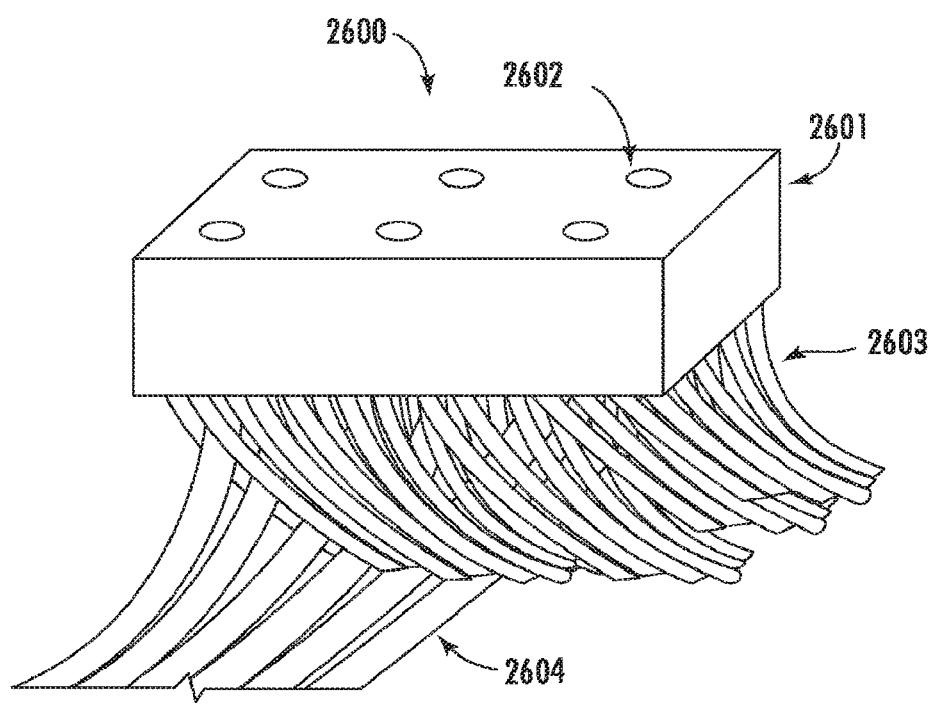
FIG. 26 illustrates a perspective view of an energy relay element capable of relaying energy of two different energy domains which includes flexible energy waveguides.

FIG. 26 illustrates a perspective view of an energy relay element 2600 capable of relaying energy of two different energy domains which includes flexible energy waveguides. A first material 2601 may have introduced throughout it a second material 2602 in the configuration shown in FIG. 26 to effectively transport energy of two different energy domains through the material. Additionally, flexible waveguides 2603 may be added to the bottom of element 2600 in order to transport energy of a first energy domain to a side of element 2600 to be transported therethrough. Likewise, flexible waveguides 2604 may be added to the bottom of element 2600 in order to transport energy of a second energy domain to a side of 2600 to transported therethrough. Flexible waveguides 2603 and 2604 may be designed to effectively transport energy belonging to different energy domains, and in an embodiment, waveguide 2603 may be designed to transport energy of the same energy domain as that of material 2601, and waveguide 2604 may be designed to transport energy of the same energy domain as that of material 2602.

In an embodiment, the flexible waveguides 2603 and 2604 may be attached at a second end to an energy projecting or receiving device (not shown). Flexible waveguides 2603 and 2604, due to their flexibility, may allow for the surfaces of relay element 2600 for receiving and projecting energy to be in substantially different locations in 2D or 3D space. Flexible waveguides may be combined for multiple energy domains to allow for seamless intermixing between two or more energy devices.

Figure 27B:
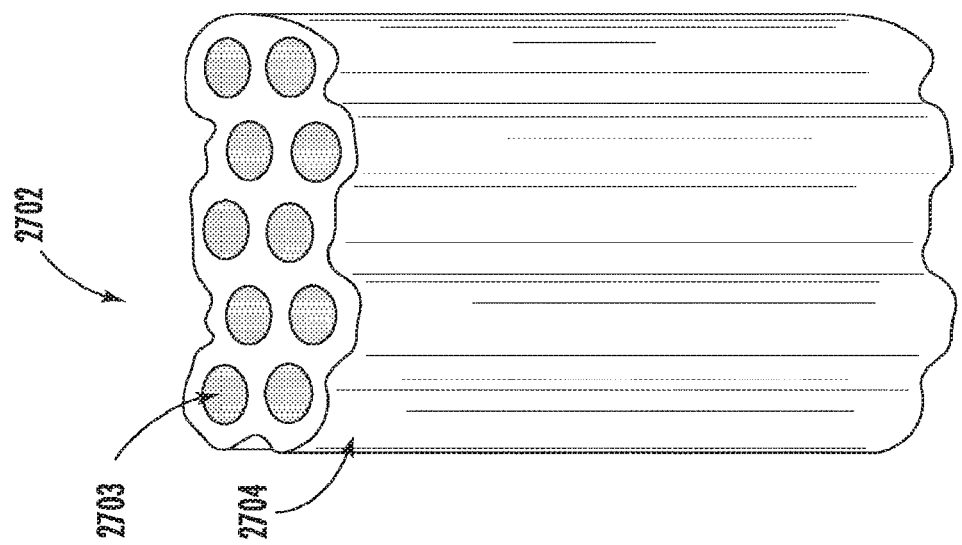
FIG. 27B illustrates a multi-energy domain waveguide comprising different materials after fusing.
Figure 27A:
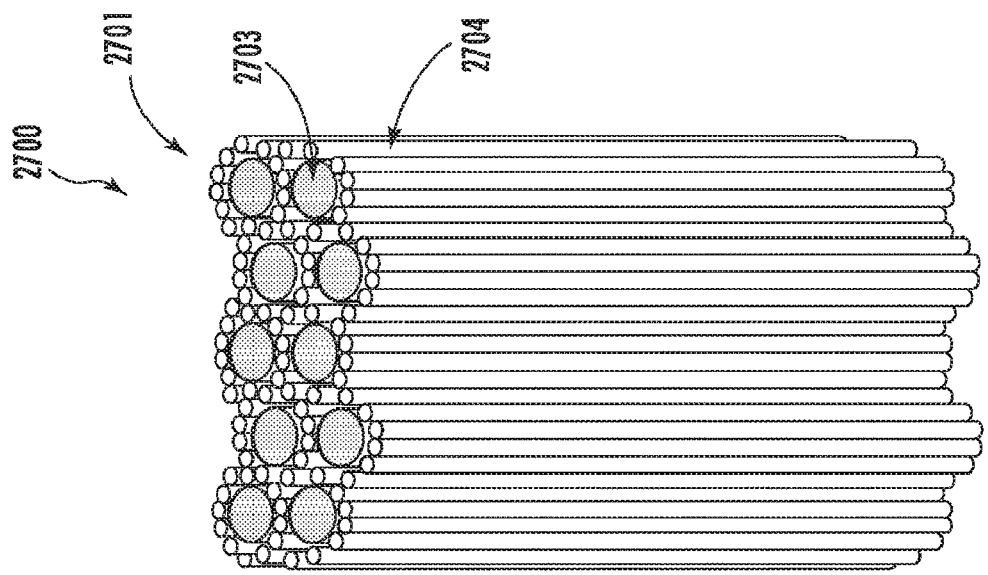
FIG. 27A illustrates a multi-energy domain waveguide comprising different materials before fusing.

FIG. 27 illustrates method for forming a multi-energy domain relay 2700 comprising different materials 2703 and 2704 before and after fusing. In FIG. 27B, individual rods of the two relay materials 2703 and 2704 are provided and arranged in the configuration shown at 2701. The configuration of materials 2703 and 2704 may be configured to transport energy belonging to first and second energy domains along a longitudinal plane of the materials. In an embodiment, materials 2703 and 2704 are designed to transport energy belonging to different energy domains. The materials in configuration 2701 are then fused together to form a single, seamless energy relay shown at 2702. In an embodiment, fusing the configuration 2701 together may comprise any of the following steps performed in any order: applying heat to the configuration, applying compressive force to the configuration, applying cooling to the configuration, and performing a chemical reaction to the arrangement, with or without a catalyst present. The relay 2702 may be capable of relaying the energy belonging to the energy domains specific to materials 2703 and 2704. In an embodiment, either of materials 2703 or 2704 may be selected to be air, depending upon the desired energy propagation characteristics of the fused relay 2702. For example, one of the desired energy domains for propagation through relay 2702 may be sound, leading to air being selected as a possible energy relay material. In an embodiment, the energy relay materials may be flexible materials prior to fusing, or may have a flexibility induced in them as a result of the fusing process. In an embodiment, the energy relay materials 2703 and 2704 may comprise one or more component engineered structures as discussed elsewhere in the present disclosure. In an embodiment, the method illustrated in FIG. 27 may be performed using a constrained space, which may be provided by a mold, whereby the materials 2703 and 2704 are arranged in the configuration 2701 and then accommodated in the constrained space while the fusing process step(s) is performed.

Figure 28:
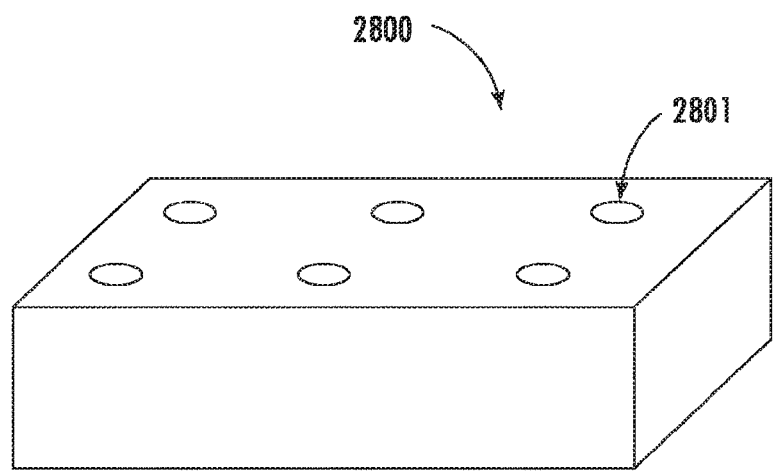
FIG. 28 illustrates a perspective view of an energy relay comprising a plurality of perforations.

FIG. 28 illustrates a perspective view of an energy relay 2800 comprising a plurality of perforations. In relay 2800, micro-perforations, or other forms of holes such as hole 2801 may be produced in an energy relay. This may provide the ability for energy to be relays in a first energy domain, while allowing sound, mechanical energy, liquids, or any other desired structures to pass freely through the energy relay simultaneously with the first energy domain.

While the examples discussed herein comprise relays designed to transport energy of two different energy domains for simplicity, one skilled in the art should appreciate that the exact number of different energy domains need not be two, and the principles disclosed herein may be used to design materials for transporting energy of any desired number of different energy domains. Thus, the scope of the present disclosure should not be seen as limited to materials designed for only two different energy domains of transport.

Energy Combining Elements

Figure 20:
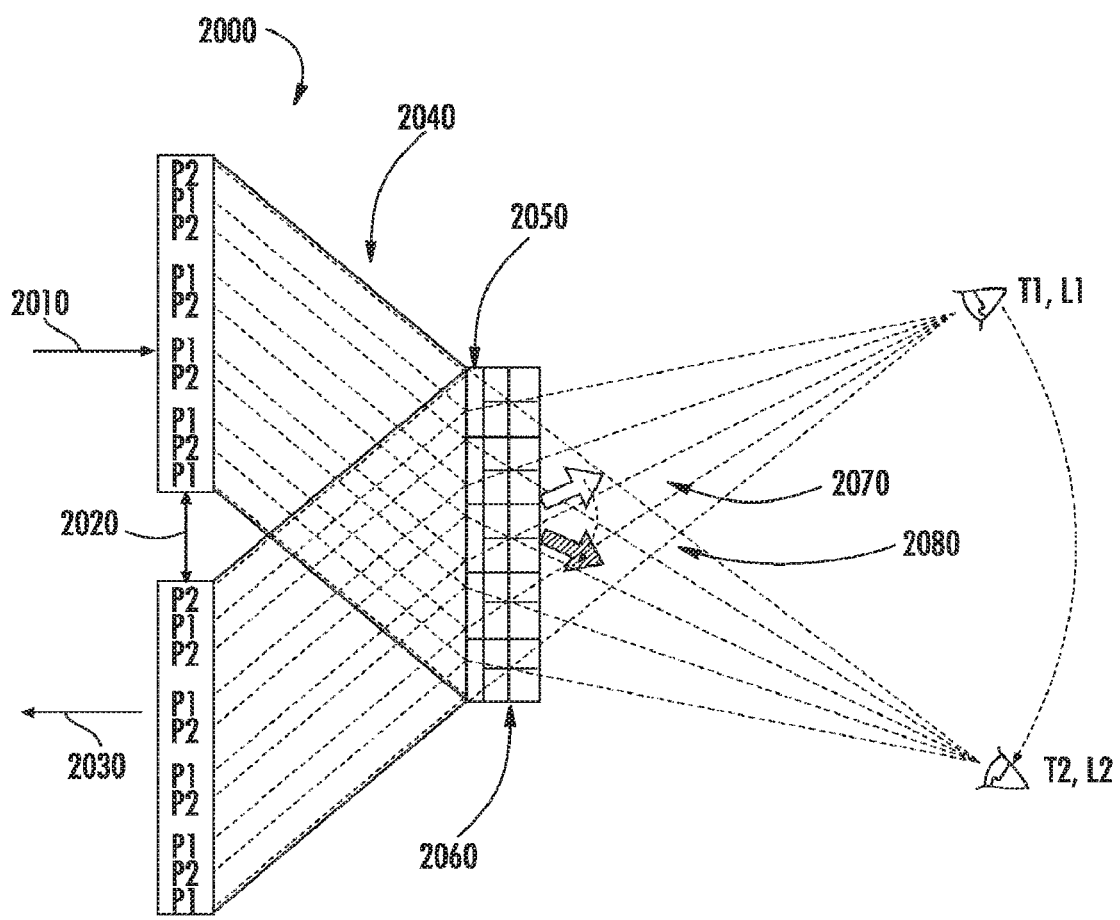
FIG. 20 illustrates an orthogonal view of an implementation of an energy waveguide system, in accordance with one embodiment of the present disclosure.

The relay 1900 shown in FIG. 26 can be considered a relay combining element which can be configured to be a dual-energy source if both the relay material 2603 and 2604 are each coupled to energy sources of the corresponding energy domain and wavelength. Energy projecting systems can leverage relays that are constructed with interleaved energy locations, such as the one shown in FIG. 26 as well as the relay 2300 shown in FIG. 23A, to transport energy from two different energy sources, and merge this energy onto a single surface with a spatial resolution that will be guided by the dimensions of each energy domain region and the arrangement of the two different types of relay domain regions. In an embodiment, an energy combining element allowing two or more energy propagation paths to be interleaved. an example of which is shown in FIG. 20 In addition, since energy relays are bidirectional, it is possible to absorb two different types of energy from one surface, or simultaneously source and sense energy from a single surface.

Figure 19A:
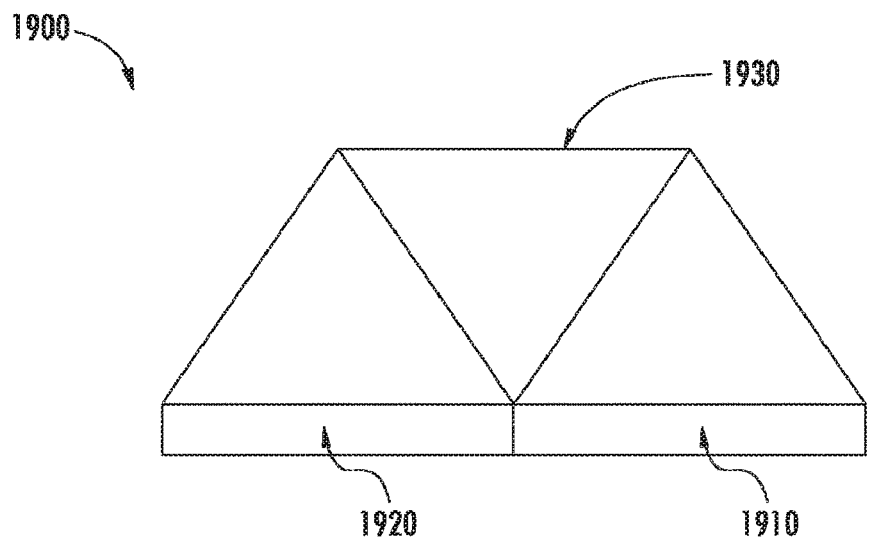
FIG. 19A illustrates an energy relay combining device, in accordance with one embodiment of the present disclosure.

FIG. 19A illustrates an energy relay combining element 1900 that comprises a first surface and two interwoven second surfaces 1930 wherein the second surface 1930 having both an energy emitting device 1910 and an energy sensing device 1920. A further embodiment of FIG. 19A includes an energy relay combining element 1900 having two or more sub-structure components 1910, 1920 for at least one of two or more second relay surfaces 1930, that exhibits different engineered properties between the sub-structure components of the two or more second relay surfaces 1930, including sub-structure diameter, wherein the sub-structure diameter for each of the one or more second surfaces 1930 is substantially similar to the wavelength for a determined energy device and energy frequency domain.

Figure 19B:
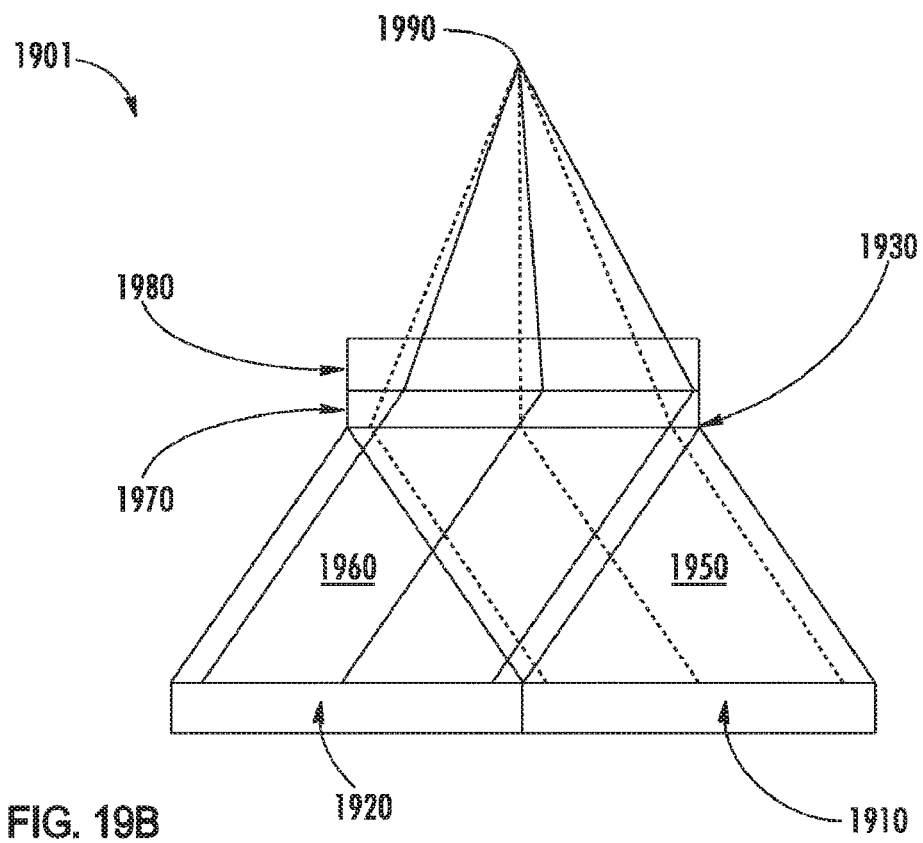
FIG. 19B illustrates a further embodiment of FIG. 19A, in accordance with one embodiment of the present disclosure.

FIG. 19B illustrates a further embodiment of FIG. 19A wherein the energy relay combining element 1901 includes one or more element types 1910, 1920, within one or more waveguide element surfaces 1930 and properties, where each of the element types 1910, 1920 are designed to alter the propagation path 1950, 1960 of a wavelength within the commensurate energy frequency domain. In one embodiment, the energy relay combining element 1950 may include an electromagnetic energy emitting device 1910 and a mechanical energy emitting device 1920, each device 1910, 1920 configured to alter an electromagnetic energy relay path 1950 and a mechanical energy relay path 1960, respectively.

In another embodiment, the wavelengths of any second energy frequency domain may be substantially unaffected by the first energy frequency domain. The combination of multiple energy devices on the two or more second surfaces of the energy relay and the one or more element types within the one or more waveguide elements provides the ability to substantially propagate one or more energy domains through the energy devices, the energy relays, and the energy waveguides substantially independently as required for a specified application.

In one embodiment, the energy relay combining element 1901 may further include an electromagnetic energy waveguide 1970 and a mechanical energy waveguide 1980 assembled in a stacked configuration and coupled to a simultaneously integrated seamless energy surface 1930 similar to that described above. In operation, the energy relay combining element 1901 is able to propagate energy paths such that all the energy is able to converge about a same location 1990.

In some embodiments, this waveguide 1901 may be a single relay element with a bidirectional energy surface, one interlaced segment to propagate energy, and a second interlaced segment to receive energy at the energy surface. In this fashion, this may be repeated for every energy relay module in the system to produce a bidirectional energy surface.

Seamless Energy Directing Devices

Figure 58:
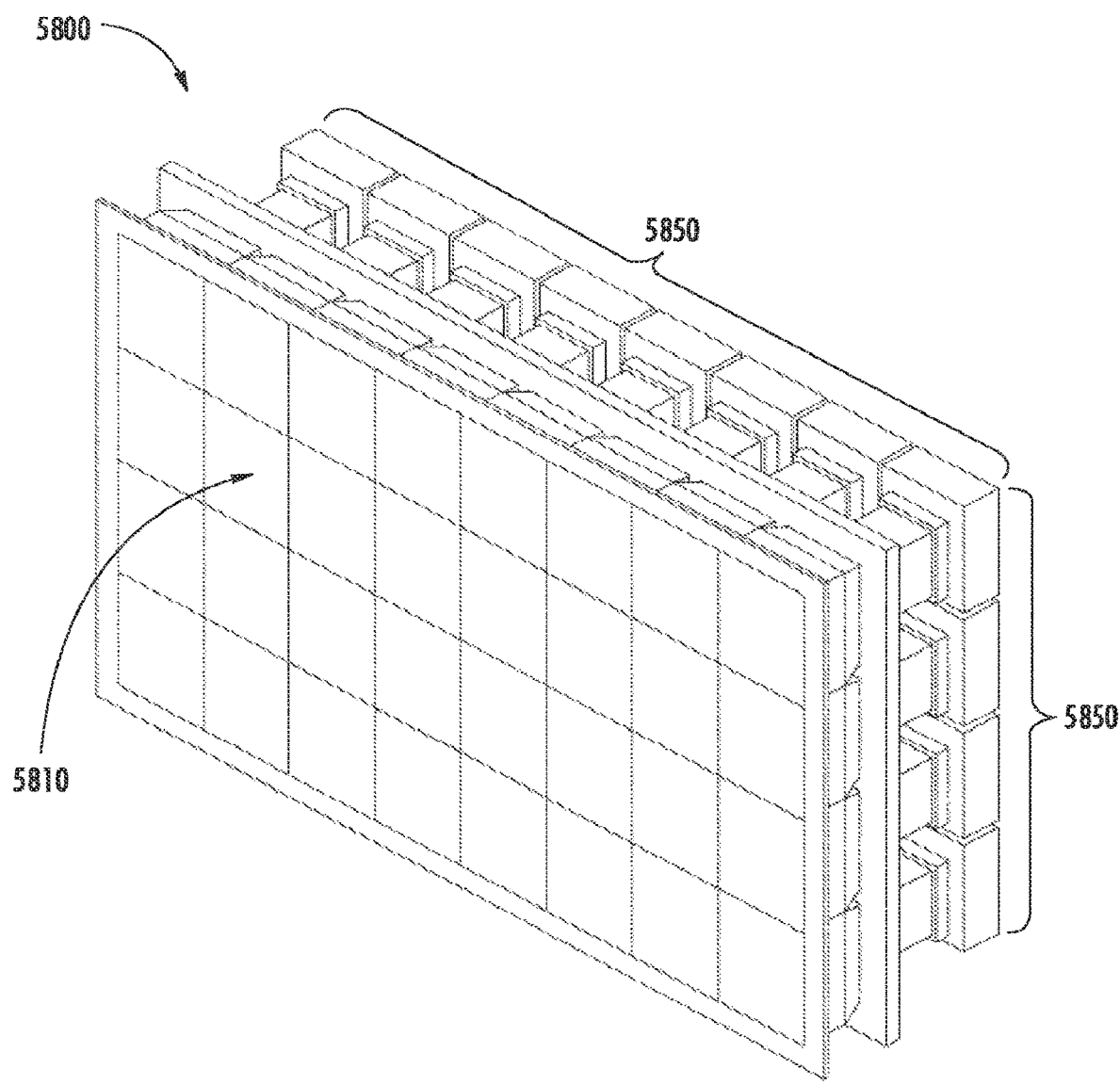
FIG. 58 illustrates a perspective view of an embodiment of an energy directing device where energy relay element stacks are arranged in an 8×4 array to form a singular seamless energy directing surface.

FIG. 58 illustrates a perspective view of an embodiment 5800 of an energy directing device where energy relay element stacks are arranged in an 8×4 array to form a singular seamless energy directing surface 5810 with the shortest dimension of the terminal surface of each tapered energy relay element stack parallel to the longest dimension of the energy surface 5810. The energy originates from 32 separate energy sources 5850; each bonded or otherwise attached to the first element of the energy relay element stacks.

In an embodiment, the energy surface 5810 may be arranged to form a display wall.

In an embodiment, a separation between the edges of any two adjacent second surfaces of the terminal energy relay elements may be less than a minimum perceptible contour as defined by the visual acuity of a human eye having better than 20/100 vision at a distance, greater than the lesser of a height of the singular seamless display surface or a width of the singular seamless display surface, from the singular seamless display surface.

Figure 59:
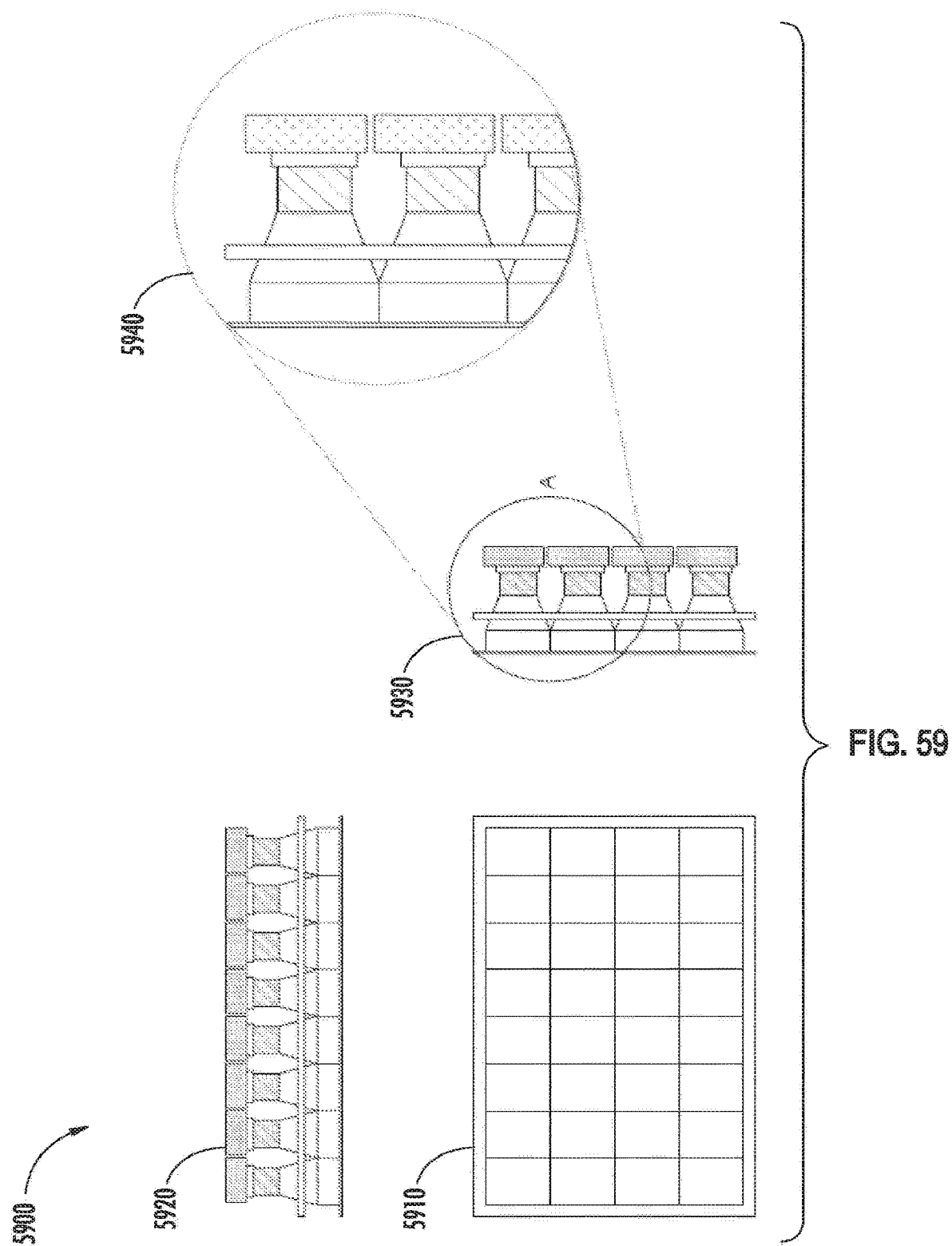
FIG. 59 contains several views of an energy directing device.

FIG. 59 contains the following views of embodiment 59400: a front view 5910, a top view 5910, a side view 5930, and a close-up side view 5940.

Figure 60:
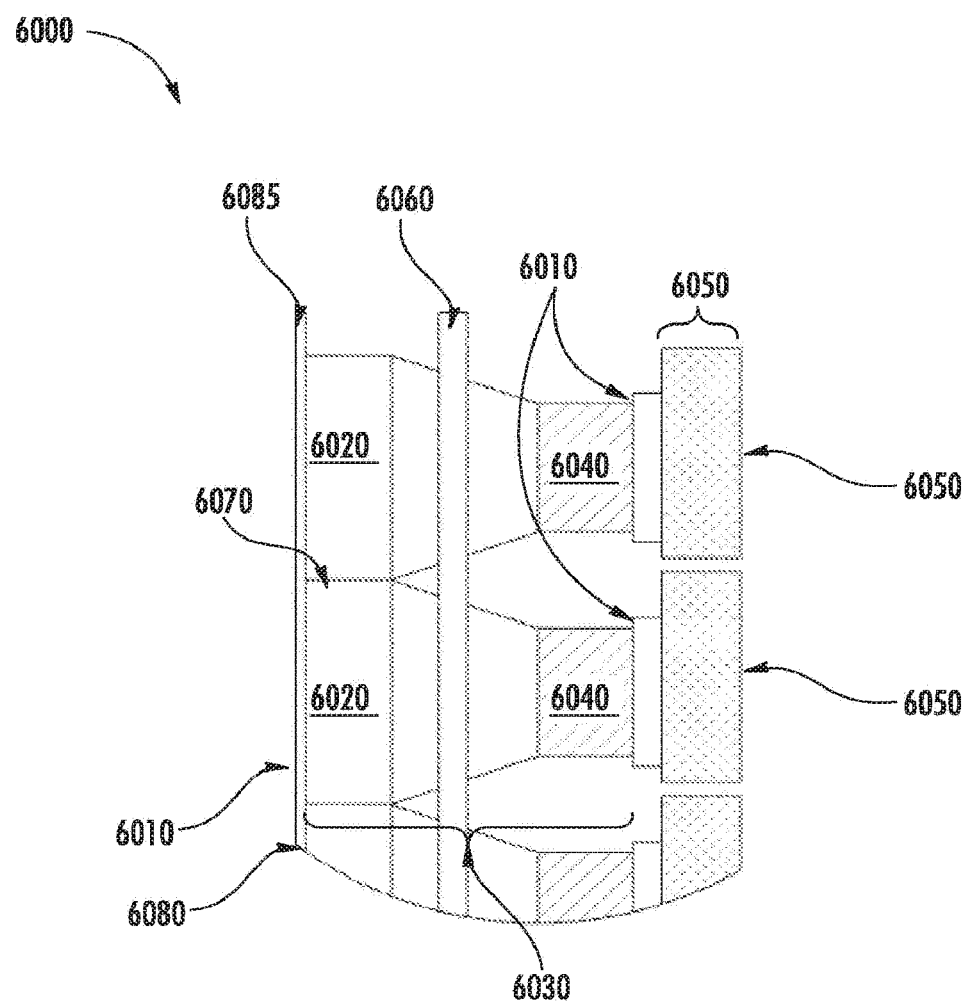
FIG. 60 contains a close-up view of the side view from FIG. 17 of the energy directing device.

FIG. 60 is the close-up view of the side view 5940 of the energy directing device 1600, consisting of a repeating structure comprised of energy relay element stacks 6030 arranged along a transverse orientation defined by first and second directions, used to propagate energy waves from the plurality of energy units 6050 to a single common seamless energy surface 6080 formed by the second surface of the energy relay element stacks. Each energy unit 6050 is composed of an energy source 6010 as well as the mechanical enclosure 6050 which houses the drive electronics. Each relay stack is composed of a faceplate 6040 with no magnification directly bonded to an energy source 6010 on one side, and a tapered energy relay on the other side, where the taper spatially magnifies the energy wave from the faceplate while propagating the energy to the seamless energy surface 6080. In one embodiment, the magnification of the tapered energy relay is 2:1. In one embodiment, tapered energy relays 6020 are held in place by a common base structure 6060, and each of these tapers are bonded to a faceplate 601640, which in turn is bonded to the energy unit 6050. Neighboring tapers 6020 are bonded or fused together at seam 6070 in order to ensure that the smallest possible seam gap is realized. All the tapered energy relays in the full 8×4 array are arranged in a seamless mosaic such that the second surface for each tapered energy relay forms a single contiguous energy surface 6080, which is polished during assembly to ensure flatness. In one embodiment, surface 6010 is polished to within 10 waves of flatness. Face plate 6085 has dimensions slightly larger than the dimensions of the surface 601680, and is placed in direct contact with surface 6080 in order to extend the field of view of the tapered energy surface 6080. The second surface of the faceplate forms the output energy surface 6010 for the energy directing device 6000.

In this embodiment of 6000, energy is propagated from each energy source 6010, through the relay stack 6030, and then substantially normal to the faceplate, defining the longitudinal direction, the first and second surfaces of each of the relay stacks extends generally along a transverse orientation defined by the first and second directions, where the longitudinal orientation is substantially normal to the transverse orientation. In one embodiment, energy waves propagating through at least one of the relay elements faceplate 6040, taper 6020, and faceplate 6085, have higher transport efficiency in the longitudinal orientation than in the transverse orientation and are localized in the transverse orientation due to randomized refractive index variability in the transverse orientation coupled with minimal refractive index variation in the longitudinal orientation. In some embodiments at least one of the relay elements faceplate 6040, taper 6020, and faceplate 6085 may be constructed of multicore fiber, with energy waves propagating within each relay element traveling in the longitudinal orientation determined by the alignment of fibers in this orientation.

In one embodiment, the energy waves passing through the first surface of 6040 have a first spatial resolution, while the energy waves passing through the second surface of tapered energy relay 6020 and through the face plate have a second resolution, and the second resolution is no less than about 50% of the first resolution. In another embodiment, the energy waves, while having a uniform profile at the first surface of the faceplate 6040, may pass through the seamless energy surfaces 6080 and 6010 radiating in every direction with an energy density in the forward direction that substantially fills a cone with an opening angle of +/−10 degrees relative to the normal to the seamless energy surface 6010, irrespective of location on this surface 6010.

In an embodiment, an energy directing device comprises one or more energy sources and one or more energy relay element stacks.

In an embodiment, each energy relay element of an energy directing device may comprise at least one of:
one or more optical elements exhibiting transverse Anderson Localization;
a plurality of optical fibers;
loose coherent optical fibers;
image combiners;
one or more gradient index optical elements;
one or more beam splitters;
one or more prisms;
one or more polarized optical elements;
one or more multiple size or length optical elements for mechanical offset;
one or more waveguides;
one or more diffractive, refractive, reflective, holographic, lithographic, or transmissive elements; and
one or more retroreflectors.

In an embodiment, a quantity of the one or more energy relay elements and a quantity of the one or more energy locations may define a mechanical dimension of the energy directing device. The quantity of optical relay elements incorporated into the system is unlimited and only constrained by mechanical considerations and the resultant seamless energy surface includes a plurality of lower resolution energy sources producing an infinite resolution energy surface only limited by the resolving power and image quality of the components included within the display device.

A mechanical structure may be preferable in order to hold the multiple relay components in a fashion that meets a certain tolerance specification. Mechanically, the energy relays that comprise a second surface that forms the seamless energy surface are cut and polished to a high degree of accuracy before being bonded or fused together in order to align them and ensure that the smallest possible seam gap between the energy relays is possible. The seamless surface 6080 is polished after the relays 6020 are bonded together. In one such embodiment, using an epoxy that is thermally matched to the tapered energy relay material, it is possible to achieve a maximum seam gap of 50 um. In another embodiment, a manufacturing process that places the taper array under compression and/or heat provides the ability to fuse the elements together. In another embodiment, the use of plastic tapers can be more easily chemically fused or heat-treated to create the bond without additional bonding. For the avoidance of doubt, any methodology may be used to bond the array together, to explicitly include no bond other than gravity and/or force.

The energy surface may be polished individually and/or as a singular energy surface and may be any surface shape, including planar, spherical, cylindrical, conical, faceted, tiled, regular, non-regular, convex, concave, slanted, or any other geometric shape for a specified application. The optical elements may be mechanically mounted such that the optical axes are parallel, non-parallel and/or arranged with energy surface normal oriented in a specified way.

The ability to create various shapes outside of the active display area provides the ability to couple multiple optical elements in series to the same base structure through clamping structures, bonding processes, or any other mechanical means desired to hold one or more relay elements in place. The various shapes may be formed out of optical materials or bonded with additional appropriate materials. The mechanical structure leveraged to hold the resultant shape may be of the same form to fit over top of said structure. In one embodiment, an energy relay is designed with a square shape with a side that is equal to 10% of the total length of the energy relay, but 25% greater than the active area of the energy source in width and height. This energy relay is clamped with the matched mechanical structure and may leverage refractive index matching oil, refractive index matched epoxy, or the like. In the case of electromagnetic energy sources, the process to place any two optical elements in series may include mechanical or active alignment wherein visual feedback is provided to ensure that the appropriate tolerance of image alignment is performed. Typically, a display is mounted to the rear surface of the optical element prior to alignment, but this may or may not be desired depending on application.

In an embodiment, the second sides of terminal energy relay elements of each energy relay element stack may be arranged to form a singular seamless energy surface.

In an embodiment, the singular seamless energy surface formed by a mosaic of energy relay element stacks may be extended by placing a faceplate layer in direct contact with the surface, using a bonding agent, index matching oil, pressure, or gravity to adhere it to the energy surface. In one embodiment, the faceplate layer may be composed of a single piece of energy relay material, while in others it is composed of two or more pieces of energy relay material bonded or fused together. In one embodiment, the extension of a faceplate may increase the angle of emission of the energy waves relative to the normal to the seamless energy surface.

In an embodiment, the one or more energy relay element stacks may be configured to direct energy along propagation paths which extend between the one or more energy locations and the singular seamless energy surfaces.

In an embodiment, a separation between the edges of any two adjacent second surfaces of the terminal energy relay elements may be less than a minimum perceptible contour as defined by the visual acuity of a human eye having than 20/40 vision at a distance the lesser of a height of the singular seamless energy surface or a width of the singular seamless energy surface, from the singular seamless energy surface.

In an embodiment, the energy relay elements of each energy relay element stack are arranged in an end-to-end configuration. In an embodiment, energy may be directed through the one or more energy relay element stacks with zero magnification, non-zero magnification, or non-zero minification. In an embodiment, any of the energy relay elements of the one or more energy relay element stacks may comprise an element exhibiting Transverse Anderson Localization, an optical fiber, a beam splitter, an image combiner, an element configured to alter an angular direction of energy passing therethrough, etc.

In an embodiment, energy directed along energy propagation paths may be electromagnetic energy defined by a wavelength, the wavelength belonging to a regime of the electromagnetic spectrum such as visible light, ultraviolet, infrared, x-ray, etc. In an embodiment, energy directed along energy propagation paths may be mechanical energy such as acoustic sound, tactile pressure, etc. A volumetric sound environment is a technology that effectively aspires to achieve holographic sound or similar technology. A dimensional tactile device produces an array of transducers, air emitters, or the like to generate a sensation of touching objects floating in midair that may be directly coupled to the visuals displayed in a light field display. Any other technologies that support interactive or immersive media may additionally be explored in conjunction with this holographic display. For the use of the energy directing device as a display surface, the electronics may be mounted directly to the pins of the individual displays, attached to the electronics with a socket such as a zero-insertion force (ZIF) connector, or by using an interposer and/or the like, to provide simplified installation and maintenance of the system. In one embodiment, display electronic components including display boards, FPGAs, ASICs, IO devices or similarly desired components preferable for the use of said display, may be mounted or tethered on flex or flexi-rigid cables in order to produce an offset between the display mounting plane and the location of the physical electronic package. Additional mechanical structures are provided to mount the electronics as desired for the device. This provides the ability to increase density of the optical elements, thereby reducing the optical magnification for any tapered optical relays and decreasing overall display size and/or weight.

Cooling structures may be designed to maintain system performance within a specified temperature range, wherein all mechanical structures may include additional copper or other similar material tubing to provide a liquid cooling system with a solid state liquid cooling system providing sufficient pressure on a thermostat regulator. Additional embodiments may include Peltier units or heat syncs and/or the like to maintain consistent system performance for the electronics, displays and/or any other components sensitive to temperature changes during operation or that may produce excess heat.

Energy Directing Systems and Multiple Energy Domains

An energy-projection system may be formed using an energy relay combining element 1901, allowing the projection of more than one type of energy simultaneously, or the projection of one type of energy and simultaneous sensing of the same or a different type of energy. For example, in an embodiment, using an energy relay combining element, the energy directing module 1901 can be configured to simultaneously project a light field in front of the display surface and capture a light field from the front of the display surface. In this embodiment, the energy relay device 1950 connects a first set of locations at the seamless energy surface 1930 positioned under the waveguide elements 1970, 1980 to an energy device 1910. In an example, energy device 1910 is an emissive display having an array of source pixels. The energy relay device 1960 connects a second set of locations at the seamless energy surface 1930 positioned under waveguide elements 1970, 1980 to an energy device 1920. In an example, the energy device 1920 is an imaging sensor having an array of sensor pixels. The energy directing module 1901 may be configured such that the locations at the seamless energy surface 1930 are tightly interleaved, as shown in FIG. 26. In another embodiment, all the sensor pixels 1920 that are under a particular waveguide element 1970 or 1980 are all emissive display locations, all imaging sensor locations, or some combination of locations. In other embodiments, the seamless energy surface comprises source locations under waveguides, and sensing locations in between the waveguides, in such a way that the source locations project a light field, and the locations that transport light to the imaging sensors capture a 2D light field. In other embodiments, the bidirectional energy surface can project and receive various other forms of energy.

In an embodiment, waveguides may be provided that are configured to direct energy of a similar energy domain. In an embodiment, waveguides may be provided that are configured to direct energy of one of multiple energy domains. In an embodiment, a single waveguide may be configured to direct energy of more than one energy domain.

FIG. 20 illustrates an orthogonal view of an energy-directing system 2000 which utilizes the energy relay combining element of FIG. 19A, comprising a bidirectional energy relay which acts as both a light field projection system as well as an image sensor. FIG. 20 illustrates a viewer at location L1 and time T1, with converging rays along a path through a waveguide and to energy coordinates P1, and where a viewer moves to location L2 at time T2, with rays converging along a path through a waveguide and to energy coordinates P2, and where each of the plurality of energy coordinates P1 and P2 are formed on a first side of an energy relay surface and includes two interwoven second relay surfaces and provides a first energy sensing device and a second energy emitting device to both sense movement and interaction within the viewing volume through the energy waveguide as well as emit energy through the same energy relay and energy waveguide resulting in the visible change to energy emitted from time and location T1, L1 to T2, L2, in accordance with one embodiment of the present disclosure. The plurality of energy coordinates P1, P2 may be coplanar, or may be distributed in multiple planes or locations in three-dimensional space.

In one embodiment, the system 2000 may include energy devices 2020 where one set of energy devices are configured for energy emission 2010 and another set of energy devices are configured for energy sensing 2030. In an embodiment, energy devices 2020 may be disposed at respective second and third surfaces of the system 2000, while the energy surface 2050 may be disposed at a first surface of the system 2000. This embodiment may further include a plurality of relay combining elements 2040 configured to provide a single seamless energy surface 2050. Optionally, a plurality of waveguides 2060 may be disposed in front of the energy surface 2050. In operation, as discussed above, the system 2000 may provide simultaneous bi-directional energy sensing or emission with interactive control with the propagated energy at T1 2070, and modified propagated energy at T2 2080, in response to sensed movement between T1, L1 and T2, L2.

In another embodiment of an energy display system 1901 from FIG. 19B, the system 1901 is configured to project two different types of energy. In an embodiment of FIG. 19B, energy device 1910 is an emissive display configured to emit electromagnetic energy and energy device 1920 is an ultrasonic transducer configured to emit mechanical energy. As such, both light and sound can be projected from various locations at the seamless energy surface 1930. In this configuration, energy relay device 1950 connects the energy device 1910 to the seamless energy surface 1930 and relays the electromagnetic energy. The energy relay device is configured to have properties (e.g. varying refractive index) which make it efficient for transporting electromagnetic energy. In an embodiment, the energy relay device may comprise a random pattern of energy relay materials configured to induce Anderson Localization of transverse energy propagation. In an embodiment, the energy relay device may comprise a non-random pattern of energy relay materials configured to induce Ordered Energy Localization of transverse energy propagation. Energy relay device 1960 connects the energy device 1920 to the seamless energy surface 1930 and relays mechanical energy. Energy relay device 1960 is configured to have properties for efficient transport of ultrasound energy (e.g. distribution of materials with different acoustic impedance). In some embodiments, the mechanical energy may be projected from locations between the electromagnetic waveguide elements 1970 on the energy waveguide layer. The locations that project mechanical energy may form structures that serve to inhibit light from being transported from one electromagnetic waveguide element to another. In one example, a spatially separated array of locations that project ultrasonic mechanical energy can be configured to create three-dimensional haptic shapes and surfaces in mid-air. The surfaces may coincide with projected holographic objects (e.g., holographic object 1990). In some examples, phase delays and amplitude variations across the array can assist in creating the haptic shapes.

Further embodiments of FIG. 20 include compound systems wherein the energy relay system having more than two second surfaces, and wherein the energy devices may be all of a differing energy domain, and wherein each of the energy devices may each receive or emit energy through a first surface of the energy relay system.

Figure 21:
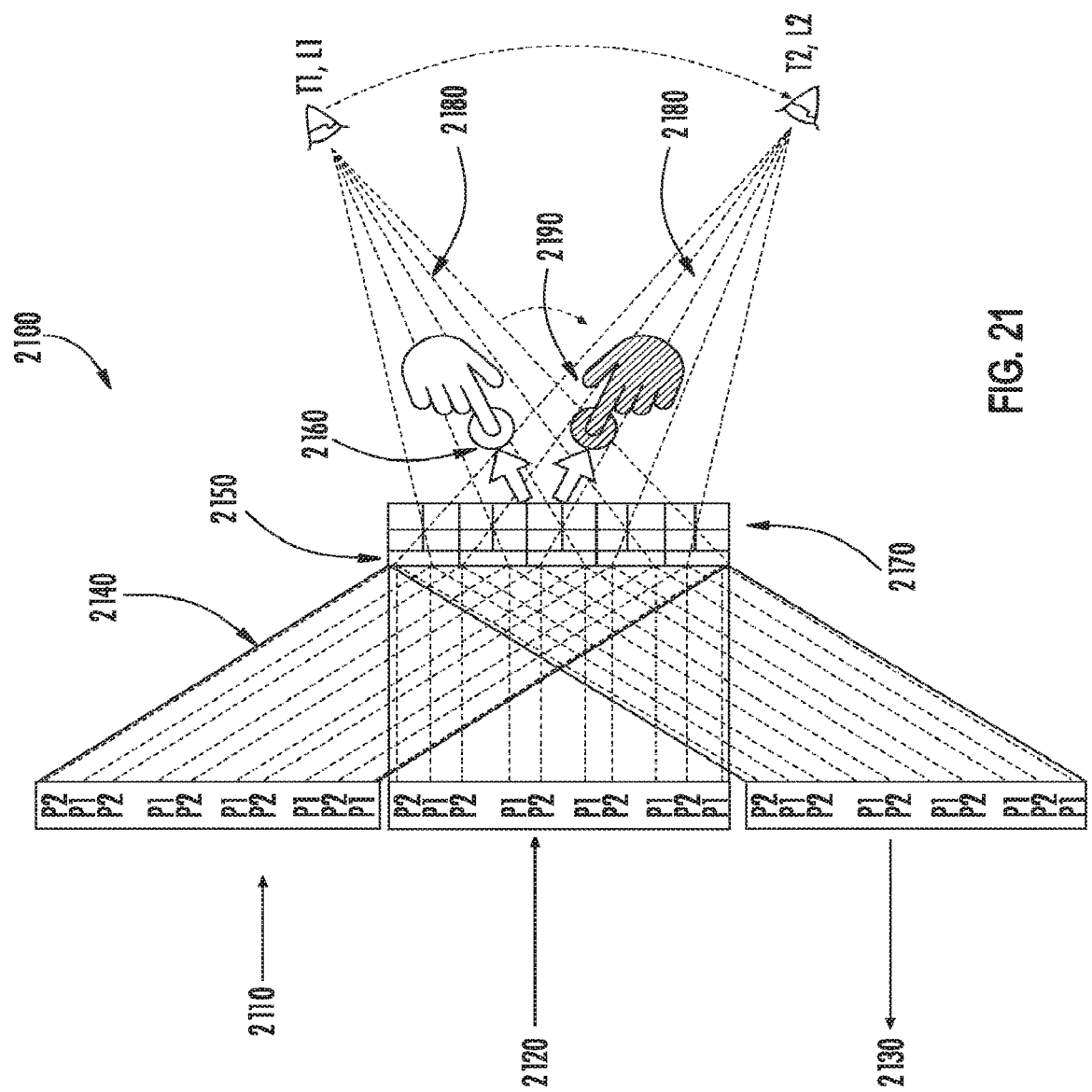
FIG. 21 illustrates an orthogonal view of another implementation of an energy waveguide system, in accordance with one embodiment of the present disclosure.

FIG. 21 illustrates a further compound system 2100 of FIG. 19A with an orthogonal view of an embodiment where a viewer is at location L1 at time T1, with converging rays along a path through a waveguide and to energy coordinates P1, and wherein a viewer moves to location L2 at time T2, with rays converging along a path through a waveguide and to energy coordinates P2, and wherein each of the plurality of energy coordinates P1 and P2 are formed on a first side of an energy relay surface and comprises three second relay surfaces having a first mechanical energy emitting device, a second energy emitting device and a third energy sensing device, wherein the energy waveguide emits both mechanical and energy through the first surface of the energy relay allowing the third energy sensing device to detect interference from the known emitted energy to the sensed received data, and wherein the mechanical energy emission results in the ability to directly interact with the emitted energy, the mechanical energy converging to produce tactile sensation, the energy converging to produce visible illumination, and the energy emitted at T1, L1 to T2, L2 is modified to respond to the tactile interaction between the viewer and the emitted energy, in accordance with one embodiment of the present disclosure.

In one embodiment, the system 2100 may include an ultrasonic energy emission device 2110, an electromagnetic energy emission device 2120, and an electromagnetic sensing device 2130. This embodiment may further include a plurality of relay combining elements 2140 configured to provide a single seamless energy surface 2150. Optionally, a plurality of waveguides 2170 may be disposed in front of the energy surface 2150.

The one or more energy devices may be independently paired with two-or-more-path relay combiners, beam splitters, prisms, polarizers, or other energy combining methodology, to pair at least two energy devices to the same portion of the energy surface. The one or more energy devices may be secured behind the energy surface, proximate to an additional component secured to the base structure, or to a location in front and outside of the FOV of the waveguide for off-axis direct or reflective projection or sensing. The resulting energy surface provides for bidirectional transmission of energy and the waveguide converge energy waves onto the energy device to sense relative depth, proximity, images, color, sound, and other energy, and wherein the sensed energy is processed to perform machine vision related tasks including, but not limited to, 4D eye and retinal tracking through the waveguide array, energy surface and to the energy sensing device.

In operation, as discussed above, the system 1900 may provide simultaneous bi-directional energy sensing or emission with interactive control with the propagated energy at T1 2180, propagated haptics at T1 1960, and modified propagated energy at T2 2190, in response to sensed interference of propagated energy emission from sensed movement and ultrasonic haptic response between T1, L1 and T2, L2.

Figure 22:
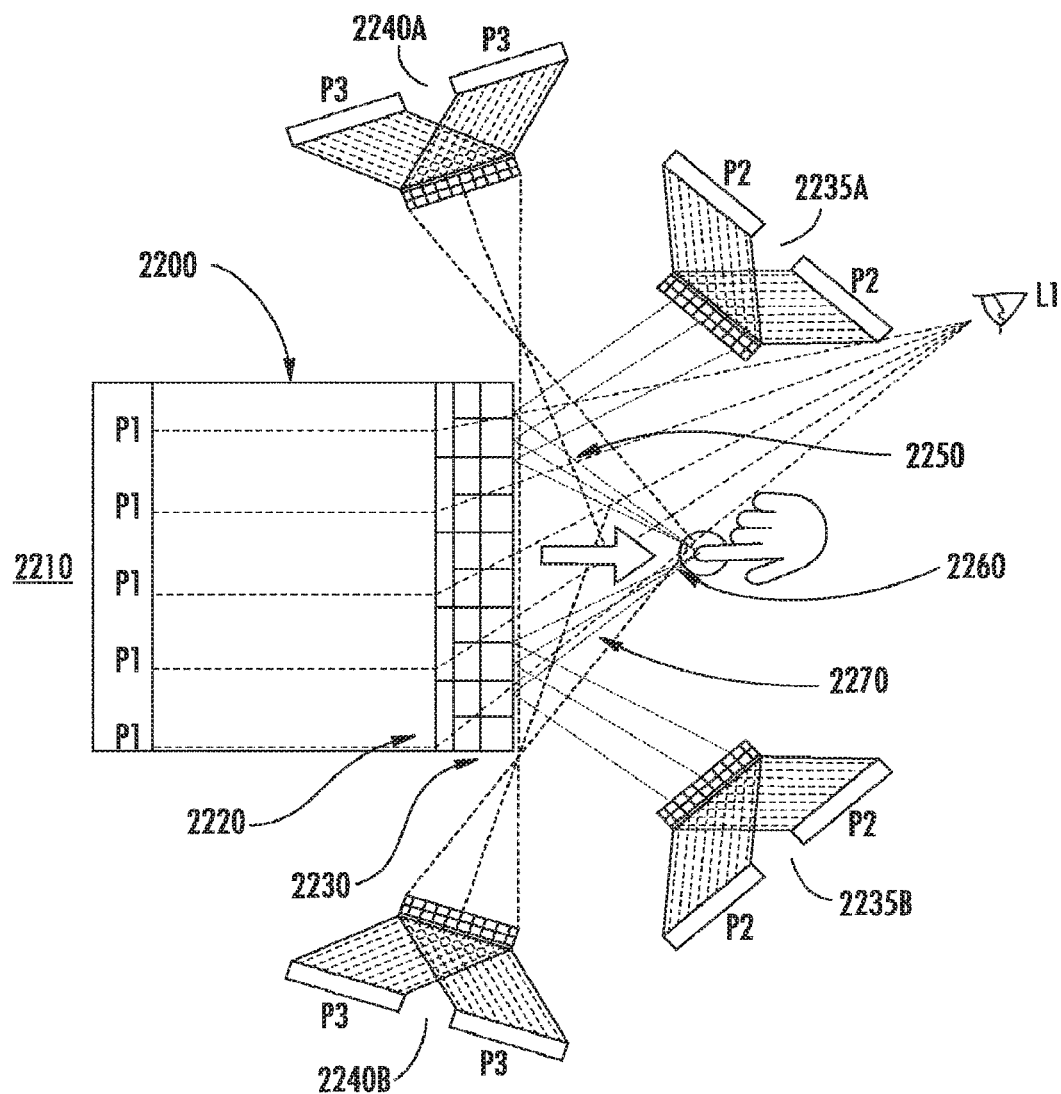
FIG. 22 illustrates an orthogonal view of yet another implementation, in accordance with one embodiment of the present disclosure.

FIG. 22 illustrates an embodiment of pairing one or more energy devices 2210 to additional components (e.g., relay elements 2200 configured to form a single seamless energy surface 2220) where a viewer is at location L1, with converging rays along a path through a waveguide 2230 and to energy coordinates P1, and where each of the plurality of energy coordinates P1 are formed on a first side of an energy relay surface 2220 corresponding to one or more devices, and where the waveguide or relay surface provides an additional reflective or diffractive property and propagated haptics 2260, where the reflective or diffractive property substantially does not affect the propagation of rays at coordinates P1.

In one embodiment, the reflective or diffractive property commensurate for the energy of additional off-axis energy devices 2235A, 2235B, each of devices 2235A, 2235B containing an additional waveguide and energy relay, each additional energy relay containing two or more second surfaces, each with a sensing or emitting device respectively with corresponding energy coordinates P2 propagating through a similar volume as P1 2250. In one embodiment, reflective or diffractive energy can propagate through the devices.

In another embodiment, an additional system out of the field of view in respect to the first and second waveguide elements comprise an additional system 2240A, 2240B having additional waveguide and relay elements, the relay elements having two second surfaces and one first surface, the second surfaces receiving energy from both focused emitting and sensing energy devices.

In one embodiment, the waveguide elements 2240A, 2240B are configured to propagate energy 2270 directly through a desired volume, the desired volume corresponding to the path of energy coordinates P1 and P2, and forming additional energy coordinates P3 passing through the system 2240A, 2240B, each of the sensing and emitting devices configured to detect interference from the known emitted energy to the sensed received data.

In some embodiments, the mechanical energy emission results in the ability to directly interact with the emitted energy, the mechanical energy converging to produce tactile sensation, the energy converging to produce visible illumination, and the energy emitted is modified to respond to the tactile interaction between the viewer and the emitted energy, in accordance with one embodiment of the present disclosure.

Various components within the architecture may be mounted in a number of configurations to include, but not limit, wall mounting, table mounting, head mounting, curved surfaces, non-planar surfaces, or other appropriate implementation of the technology.

FIGS. 20, 21, and 22 illustrates an embodiment wherein the energy surface and the waveguide may be operable to emit, reflect, diffract or converge frequencies to induce tactile sensation or volumetric haptic feedback.

FIGS. 20, 21, and 22 illustrates a bidirectional energy surface comprising (a) a base structure; (b) one or more components collectively forming an energy surface; (c) one or more energy devices; and (d) one or more energy waveguides. The energy surface, devices, and waveguides may mount to the base structure and prescribe an energy waveguide system capable of bidirectional emission and sensing of energy through the energy surface.

In an embodiment, the resulting energy display system provides for the ability to both display and capture simultaneously from the same emissive surface with waveguides designed such that light field data may be projected by an illumination source through the waveguide and simultaneously received through the same energy device surface without additional external devices.

Further, the tracked positions may actively calculate and steer light to specified coordinates to enable variable imagery and other projected frequencies to be guided to prescribed application requirements from the direct coloration between the bidirectional surface image and projection information.

An embodiment of FIGS. 20, 21, and 22 wherein the one or more components are formed to accommodate any surface shape, including planar, spherical, cylindrical, conical, faceted, tiled, regular, non-regular, or any other geometric shape for a specified application.

An embodiment of FIGS. 20, 21, and 22 wherein the one or more components comprise materials that induce transverse Anderson localization.

In one embodiment, an energy system configured to direct energy according to a four-dimensional (4D) plenoptic function includes a plurality of energy devices; an energy relay system having one or more energy relay elements, where each of the one or more energy relay elements includes a first surface and a second surface, the second surface of the one or more energy relay elements being arranged to form a singular seamless energy surface of the energy relay system, and where a first plurality of energy propagation paths extend from the energy locations in the plurality of energy devices through the singular seamless energy surface of the energy relay system. The energy system further includes an energy waveguide system having an array of energy waveguides, where a second plurality of energy propagation paths extend from the singular seamless energy surface through the array of energy waveguides in directions determined by a 4D plenoptic function. In one embodiment, the singular seamless energy surface is operable to both provide and receive energy therethrough.

In one embodiment, the energy system is configured to direct energy along the second plurality of energy propagation paths through the energy waveguide system to the singular seamless energy surface, and to direct energy along the first plurality of energy propagation paths from the singular seamless energy surface through the energy relay system to the plurality of energy devices.

In another embodiment, the energy system is configured to direct energy along the first plurality of energy propagation paths from the plurality of energy devices through the energy relay system to the singular seamless energy surface, and to direct energy along the second plurality of energy propagation paths from the singular seamless energy surface through the energy waveguide system.

In some embodiments, the energy system is configured to sense relative depth, proximity, images, color, sound and other electromagnetic frequencies, and where the sensed energy is processed to perform machine vision related to 4D eye and retinal tracking. In other embodiments, the singular seamless energy surface is further operable to both display and capture simultaneously from the singular seamless energy surface with the energy waveguide system designed such that light field data may be projected by the plurality of energy devices through the energy waveguide system and simultaneously received through the same singular seamless energy surface.

Electrostatic Speakers

To generate a dual-energy surface, it is possible for a first energy surface to be configured with transducers of a second energy source that allow the projection of a second energy in addition to the first energy. Electrostatic speakers are an example of a technology that can integrated with an energy projection surface, and be used to generate sound, and under certain configurations a sound field and volumetric haptic surfaces.

One of the challenges facing large-scale display technologies is how to effectively incorporate extra-visual stimulation, such as sound, in a convincing and unintrusive manner. Generally, auditory signals have been generated at remote locations from where the visual signals are generated. For example, speakers in a movie theater auditorium have been placed to the sides, around, and across from a display screen. More recently, advances have been made in perforated projection screens, allowing auditory signals to be generated behind the screen and transmitted through the perforations. However, this approach usually comes at the cost of audio quality of signals propagating through the screen, or visual quality of the projection screen as some visual signals are compromised due to the screen perforations.

The present disclosure proposes electrostatic speakers as an alternative acoustic energy generating solution which improves upon the conventional methods discussed. An electrostatic speaker is a sound generating device that operates by vibrating a thin membrane which is suspended in an electrostatic field to create vibrational soundwaves. Generally, the membrane consists of a thin flexible material, such as plastic, which is covered or interlaced with a second conductive material. The composite membrane is then placed between an electrically conductive grid with a small gap left on either side of the membrane. An electric signal corresponding with the desired audio data is then used to drive a current along corresponding portions of the electric grid, which in turn causes the membrane to vibrate under the generated electric field, producing air vibrations which form auditory signals.

Figure 44:
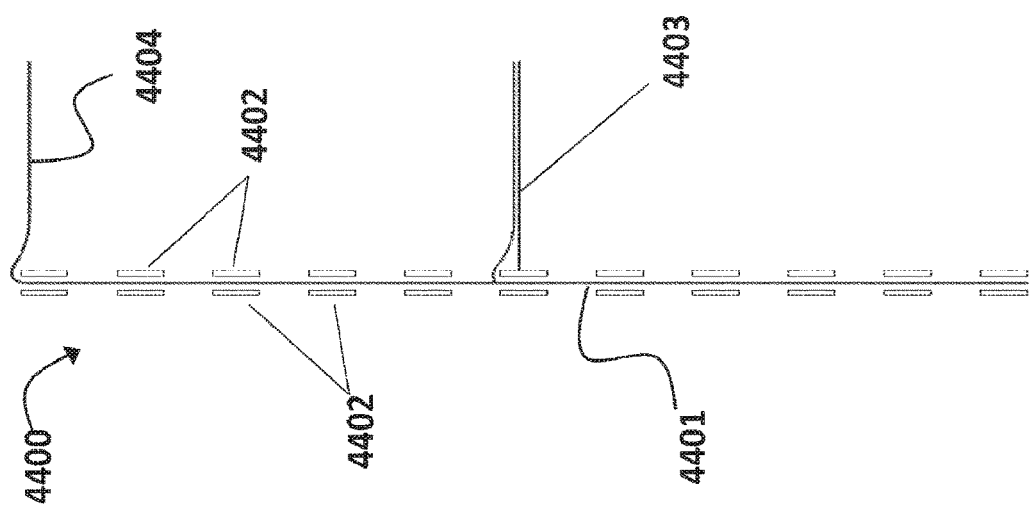
FIG. 44 illustrates a view of the essential components of an electrostatic speaker.
Figure 54:
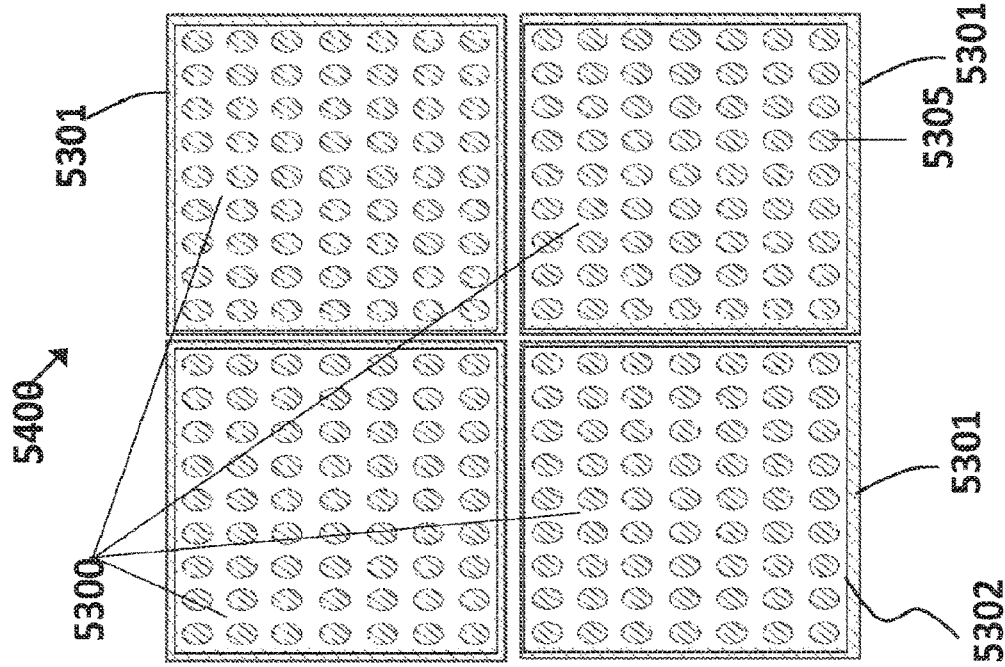
FIG. 54 illustrates a front view of an electrostatic speaker which comprises four identical modules, which all may be driven separately.
Figure 53:
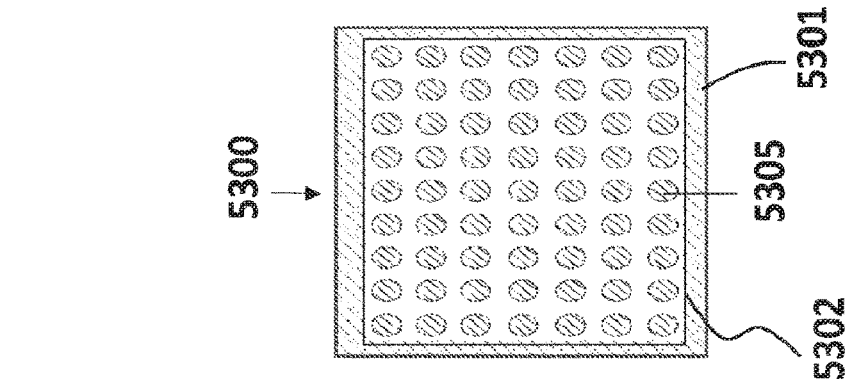
FIG. 53 illustrates a front view of an embodiment of a single electrode used for an electrostatic speaker system, consisting of a set of clear apertures in a pair of conductive planes, surrounding a conductive diaphragm.

FIG. 44 illustrates a view of the essential components of an electrostatic speaker 4400. The diaphragm 4401 is electrically conductive, and is suspended between two conductive grids consisting of electrodes 4402 which provide an electric field provided by one or more pairs of electrode wires 4403. The diaphragm is held at a potential voltage supplied by wire 4404, and deforms when voltage is applied to the electrodes, generating a vibrational sound wave. The conductive grid may be a set of apertures in a single conductive plane. FIG. 53 illustrates an embodiment of one embodiment of a single electrode used for an electrostatic speaker system, consisting of a set of clear apertures 5305 in a single pair of continuous conductive planes 5302, surrounding a conductive diaphragm 5301. Each electrode pair and diaphragm can also take the form of a plurality of individually-controlled grid pairs which together form a pair of conductive planes. FIG. 54 illustrates a view of an electrostatic speaker which comprises four identical modules 5300 from FIG. 53, which all may be driven separately.

As previously discussed, for any display, holographic or otherwise, there is often a challenge for how to incorporate sound without the introduction of visible speakers. Other methods to hide speakers behind screens include perforated screens as well as a number of other technologies that typically trade off sound quality and image brightness for the ability to place acoustics in unseen locations. This is particularly problematic for video wall applications where large systems including direct emissive displays are often large, thick and filled with electronics, which renders the ability to place acoustics behind the screen very challenging, if not impossible. We propose a differentiated approach to solve the acoustic challenges for large display venues wherein a variant of an electrostatic diaphragm is leveraged overtop of the display surface, and wherein the components of the electrostatic materials provide seamless tiling capability with the electrical wiring provisioned as either passing through the display surface, or daisy chained between adjacent tiles. The electrostatic elements leverage extremely thin polymers for the diaphragm (2-20 um) sandwiched between thin perforated conductive materials. In the proposed design, the perforations follow the patterning of any of: pixel layout, 4D optics layout, or LED diode layout, or any other configuration with a desired pattern to follow. With this approach, it is feasible now to construct an optically transparent element with sufficient density and spacing provided for each of the perforations within the conductive materials to match the commensurate pattern from the underlying display surface. Further, due to the directional qualities of the electrostatic system, it is additionally possible to generate sound fields by altering the modulation/input signals for each of the tiled elements, or on a per region basis. This further increases the capability dramatically beyond traditional acoustics given the level of directional control and the transparent nature of the proposed system. In an additional embodiment, it is possible to directly fabricate the electrostatic element within the waveguide array for a holographic display system and manufacture simultaneously.

Figure 45:
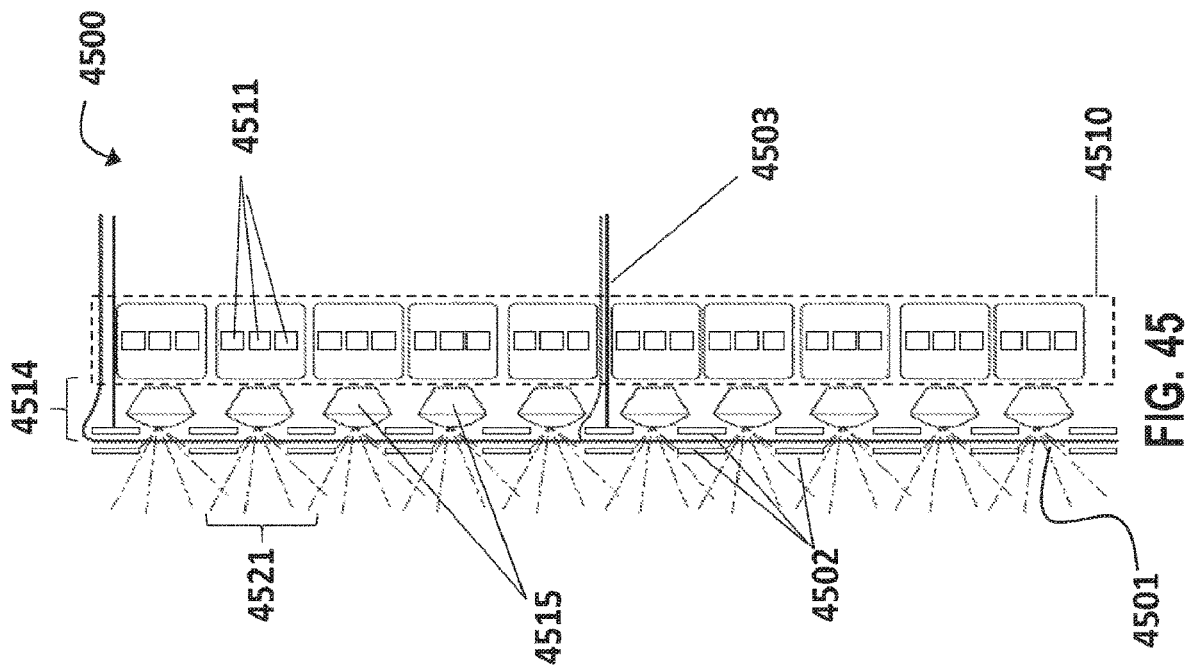
FIG. 45 illustrates a side view of an energy projection system with incorporated electrostatic speaker elements.

FIG. 45 illustrates a side view of an energy projection system 4500 with incorporated electrostatic speaker elements. In FIG. 45, an energy source system 4510 is configured to direct energy from energy locations 4511 through an energy projection system 4514, which comprises an array of waveguides 4515. Each waveguide projects a set of projection paths, shown as 4521 for one of the waveguides 4515, where each projection path is determined at least by the position of its corresponding energy source location 4511. The conductive grid 4502 which controls the position of the diaphragm 4501 is driven with voltage applied to wires 4503. It is arranged so that the apertures of the grid coincide with the waveguides 4515. A possible geometry for the conductive grid is shown as 5302 in FIG. 53. The energy projected by the waveguides 4515 passes through the apertures of the grid and through the diaphragm 4501 without significant loss. For example, for visible electromagnetic energy projected 4521, the diaphragm may be relatively transparent ITO-coated PET material. The voltage wires may be provided through appropriate locations drilled, fused, or otherwise provided on the energy projection system.

Figure 46:
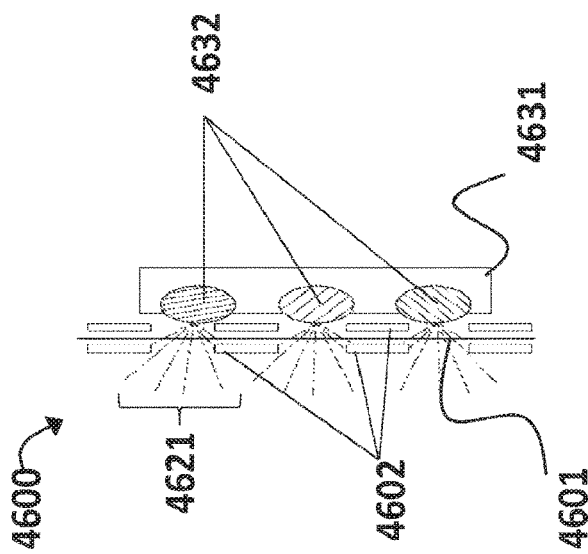
FIG. 46 illustrates a side view of an energy display device consisting simply of an energy source system comprising energy sources which project energy.

FIG. 46 illustrates an energy display device 4600 consisting simply of an energy source system 4631 comprising energy sources 4632 which project energy 4621. Each energy source is covered with a transparent electrostatic diaphragm 4601 sandwiched by electrodes 4602 which have their apertures aligned to the energy source locations 4632. In an embodiment, display device 4600 may be a traditional LED video wall, with diodes at each energy source location 4632, augmented by an electrostatic speaker which projects the mechanical energy of sound in addition to electromagnetic energy. In embodiments, it is possible that the electrostatic speaker is made from many individual regions as illustrated in FIG. 54, which can be driven independently. An array of such modules can be used to generate an array of ultrasound directing surfaces, which can be configured to generate directional sound. In another embodiment, phase delays and amplitude variations across the array can assist in creating haptic shapes in front of the display.

Figure 47:
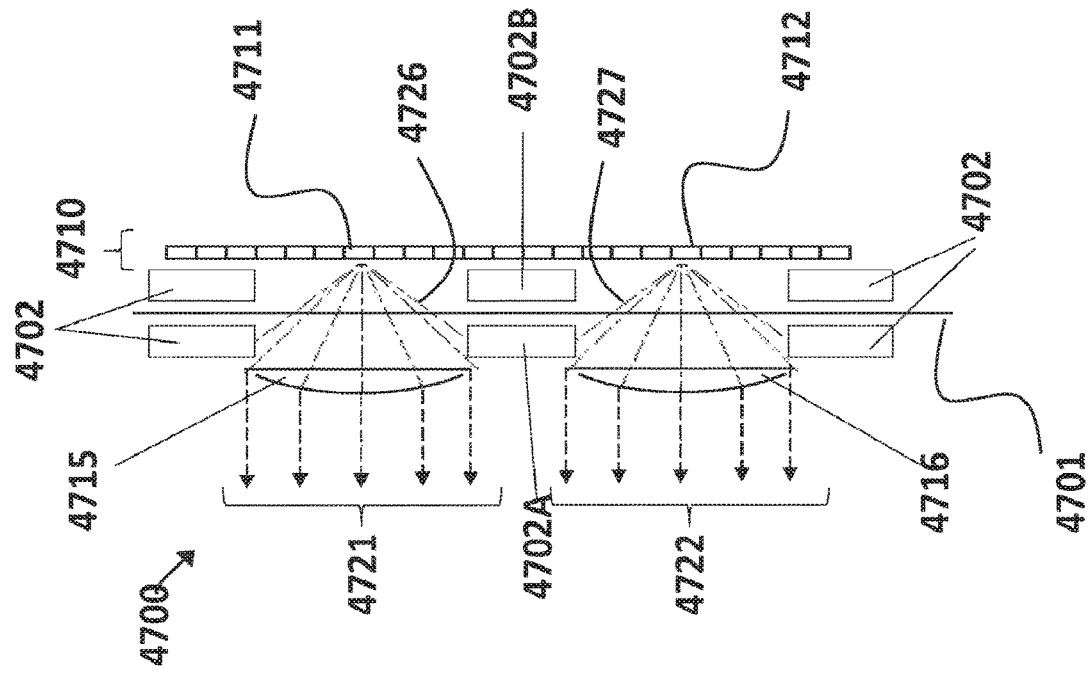
FIG. 47 illustrates a side view of a portion of a 4D energy projection system which integrates perforated conductive elements of an electrostatic speaker as energy inhibiting elements between adjacent waveguides.

FIG. 47 illustrates a portion of a 4D energy projection system 4700 which integrates perforated conductive elements of an electrostatic speaker as energy inhibiting elements between adjacent waveguides. The energy projection system 4700 comprises an energy source system 4710 consisting of multiple energy source locations, and energy projection waveguides 4721 and 4722. Sandwiched in between the waveguides and the energy source system is an electrostatic speaker with apertures in the conductive planes arranged coincident with the waveguides, with conductive elements 4702 placed in between the waveguides, and a diaphragm 4701 which is transmissive to the projected energy from the waveguides. In an embodiment, the apertures of the conductive planes are arranged coincident with apertures of the waveguides. Energy source system 4710 comprises energy source location 4711 on the first side of waveguide 4715, and its corresponding propagation path 4721 on the second side of waveguide 4715. Energy source system 4710 also has energy source location 4712 on the first side of waveguide 4716, and corresponding energy propagation path 4722 on the second side of waveguide 4716. Portions of energy 4726 from location 4711 which do not pass through the aperture of the waveguide 4715 are blocked by at least one of the closest portions of the conductive layer 4702A and 4702B of the electrostatic speaker. This conductive structure also partially the portions of the neighboring energy 4727 from energy location 4712 that does not pass through the aperture of the respective waveguide 4716. In this way, the conductors of the electrostatic speaker act as energy inhibiting elements that can take the place and function of a baffle structure discussed earlier, in some embodiments.

FIG. 48 illustrates a portion of a 4D energy projection system 4800 which integrates the perforated conductive elements of an electrostatic speaker as energy inhibiting elements within a waveguide array structure, between multiple layers of waveguide elements. The energy projection system 4800 comprises an energy source system 4810 consisting of multiple energy source locations, and two-element waveguides 4815 mounted on two waveguide substrates 4818 and 4819. In between the waveguide substrates embedded are the pair of conductive grids 4802 and diaphragm 4801 of an electrostatic speaker. The energy from energy location 4811 is projected by a waveguide 4815 into energy projection path 4821. Portions of the energy from energy location 4811 which do not pass through the effective aperture of the associated waveguide 4815 are blocked by the portions of at least one of the electrostatic speaker conductors that surround the aperture of the waveguide, similar to the blocking shown in FIG. 47. An embodiment of this disclosure is the waveguide of system 4800, wherein an electrostatic speaker is embedded within an array of waveguides, with conductive elements that form energy-inhibiting structures which block portions of energy that originate from energy source locations associated with a waveguide, but do not flow through the aperture of that waveguide.

FIG. 49 illustrates an embodiment of one module of a modular electrostatic speaker system 4900. The diaphragm 4901 is suspended between two pairs of electrodes 4902, with each electrode featuring conductive stub leads 4903 which may contact the electrode of a similar module placed side-by-side with it. FIG. 50 illustrates an embodiment of several electrostatic speaker modules 4900 placed in an assembly disposed in front of an array of waveguides 5015 mounted on a waveguide substrate 5018. This structure demonstrates that an electrostatic speaker structure may be modular, and mounted on modular tiles of an energy-directing system, in order to create a seamless dual-energy surface that projects both sound and another form of energy.

FIG. 51 illustrates an embodiment of a modular 4D energy field package that projects a 4D energy field as well as vibrational sound waves produced by an electrostatic speaker. This is a modular version of energy-directing system 4500 shown in FIG. 45. Energy source system 5110 comprises energy source locations 5111 and 5111A. The waveguide 5115A guides energy from a particular energy location 5111A incident on an aperture of the waveguide 5115A into a propagation path 5121 that depends at least on the location of energy location 5111A. Each waveguide 5115 and its associated pixels 5111 represent a two-dimensional (2D) position coordinate, and each associated propagation path 5121 represents a 2D angular coordinate, which together form a 4D coordinate for the energy that is projected from locations 5111. In at least one embodiment, energy-inhibiting elements may block the portion of light that originates from energy sources that are associated with a particular waveguide 5115, but that does not travel through the aperture of the particular waveguide. The electrostatic speaker element comprises a diaphragm 5101 which is transmissive to the energy of energy source system 5110, suspended between pairs of electrodes 5102. Conductive stubs 5103 on the electrodes 5102 at the boundary of the module allow the conductors to connect with neighboring modules 5100 that are mounted side-by-side. The structure 5131 represent electrical connectivity and mechanical mounting for the module 5100.

Figure 55:
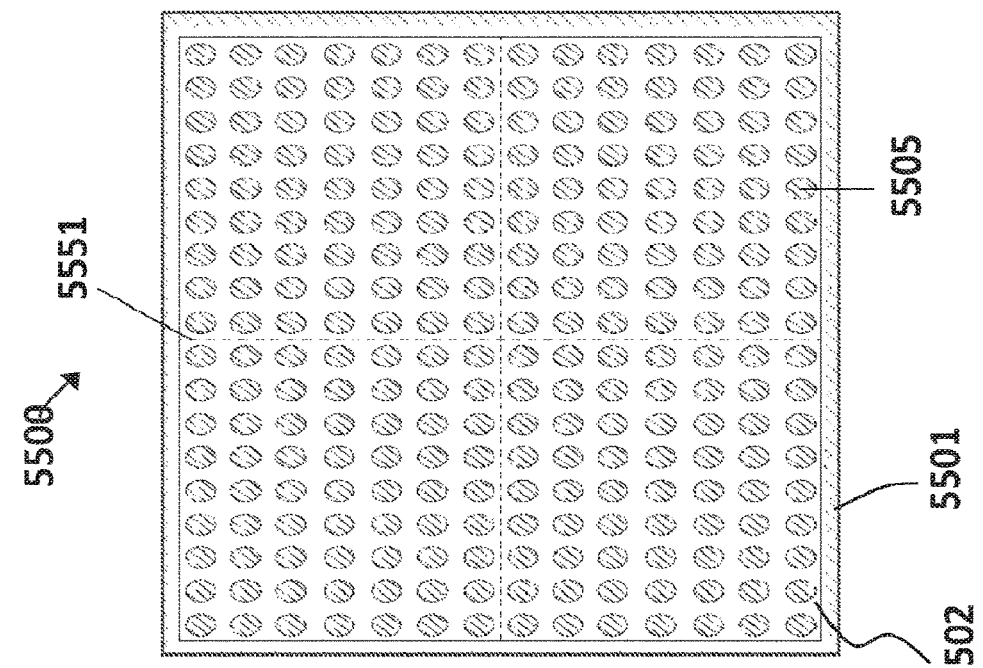
FIG. 55 illustrates a front view an embodiment of the conductive element pair and diaphragm of an electrostatic speaker with a combined area of four smaller electrostatic speakers.

FIG. 52 illustrates an embodiment of a modular energy-projecting wall consisting of several 4D energy field packages with electrostatic speakers 5100 mounted onto a wall 5232. Each module is autonomous, allowing for such a system to be easily assembled and maintained. The mounting wall 5232 may be planar, curved, or multi-faceted. In addition, the diaphragms for each module, 5101, may or may not connect with the diaphragms from the neighboring modules. In different embodiments, the sets of contacts 5102 for each module may or may not connect with contacts from the neighboring modules. In an embodiment, each module 5100 may function as an independent electrostatic speaker, with the pair of perorated electrode planes having a configuration as shown in FIG. 54, where the apertures 5305 in the conductive material 5302 are aligned to the energy-projecting waveguides. In a different embodiment, all the conductors of the electrostatic speaker modules of the energy-projecting wall 5200, composed of a plurality of 4D energy packages integrated with electrostatic speakers, do make contact, forming a pair of single large perforated conductor planes. FIG. 55 illustrates an embodiment of the conductive element pair and diaphragm of an electrostatic speaker 5500 with a combined area of four smaller electrostatic speakers 5300. This larger electrostatic speaker has a conductive plate 5502 with apertures 5505 to coincide with waveguides, and a single diaphragm 5501. It will be appreciated that while the present discussion is addressing an energy-projecting wall consisting of modular 4D energy-field packages with electrostatic speaker elements, these embodiments also apply to energy-projecting systems of different types, including those that comprise singular seamless energy surfaces as well as energy relays.

For any energy projection system comprising an electrostatic speaker, it is possible to generate sound as well as an energy field. FIG. 56 illustrates an embodiment of a scene 5600 containing dancers 5661 in front of a light field display equipped with an integrated electrostatic speaker, which is projecting a holographic musician 5651 and simultaneously playing music 5652.

With each 4D energy field module having an independent electrostatic speaker with an electrode configuration of several neighboring modules having the structure shown in FIG. 54, with seams, it is possible to independently control each diaphragm to generate ultrasound mechanical energy. In an embodiment, any energy-directing system with an integrated electrostatic speaker can be configured to have a plurality of independently-driven electrostatic speaker regions as shown in FIG. 54, including systems that comprise a seamless energy surface. Each electrostatic speaker region can independently project ultrasound energy. The resulting spatially separated array of independent locations that project ultrasonic mechanical energy can be configured to direct sound or create three-dimensional tactile shapes and surfaces in mid-air. In some examples, phase delays and amplitude variations across the array can assist in creating such haptics.

Figure 57:
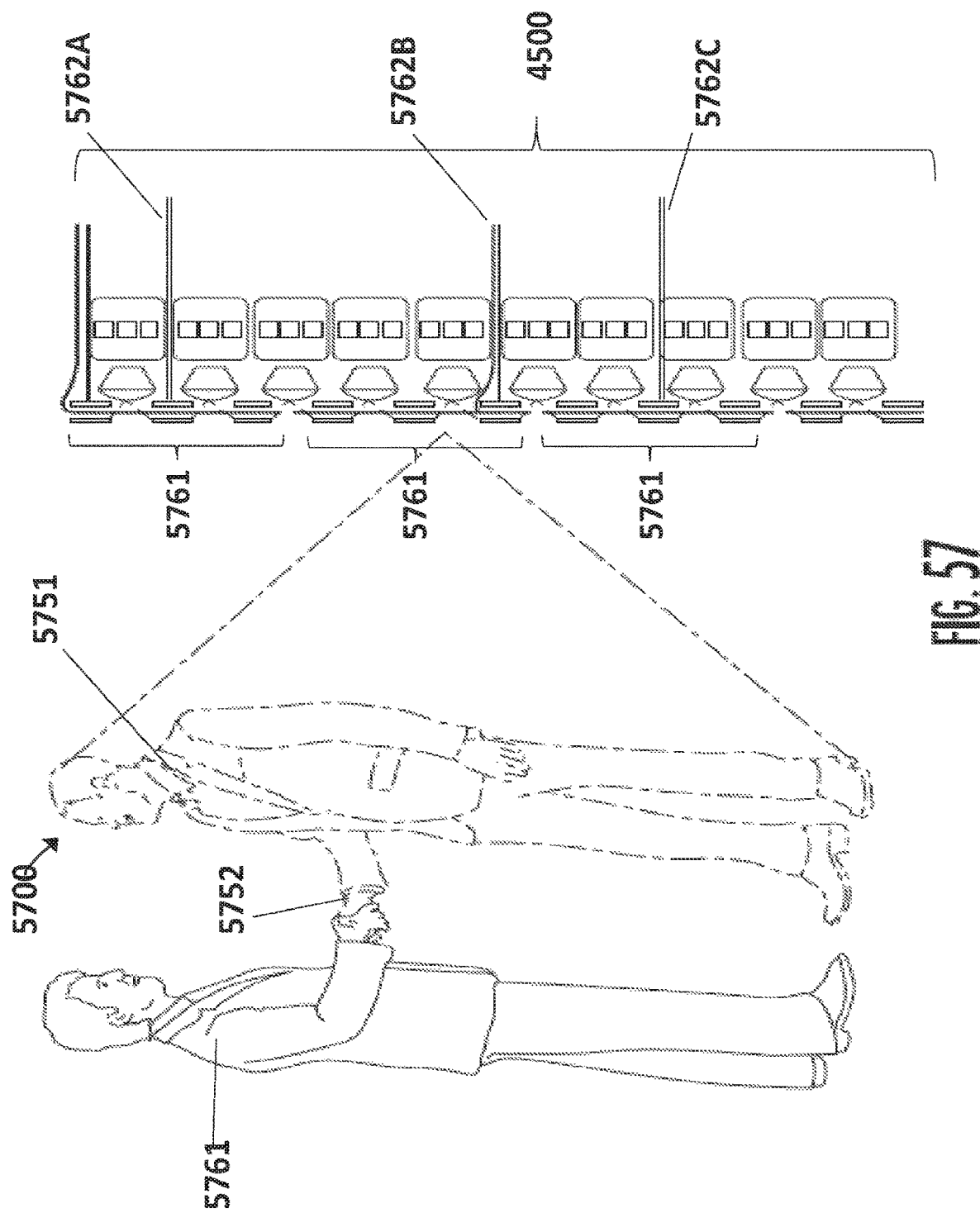
FIG. 57 illustrates a perspective view of an embodiment of an energy projection device equipped with an electrostatic speaker system that has a plurality of independently-controlled electrostatic speaker regions.

The volumetric haptic surfaces created in mid-air with a sound field may be projected to coincide with holographic objects. FIG. 57 illustrates an embodiment of an energy projection device 4500 equipped with an electrostatic speaker system that has a plurality of independently-controlled electrostatic speaker regions as illustrated in FIG. 54. Electrostatic speaker modules at 5761A, 5761B, and 5761C are driven independently, in part by driving voltage on wire pairs 5762A, 5762B, and 5762C, respectively, each generating ultrasonic energy. This projected mechanical energy from all the locations on the display surface can be used to generate a tactile surface in space, corresponding to the outstretched hand 5752 of the holographic FIG. 5751. As a result, in this example, the energy projection device 4500 configured with a an independently-driven array of electrostatic speaker elements projects a hologram 5751 of a person, as well as a haptic surface 5752 which feels like a hand to a viewer 5761.

It will be understood that the principal features of this disclosure can be employed in various embodiments without departing from the scope of the disclosure. Those skilled in the art will recognize, or be able to ascertain using no more than routine experimentation, numerous equivalents to the specific procedures described herein. Such equivalents are considered to be within the scope of this disclosure and are covered by the claims.

Additionally, the section headings herein are provided for consistency with the suggestions under 37 CFR 1.77 or otherwise to provide organizational cues. These headings shall not limit or characterize the invention(s) set out in any claims that may issue from this disclosure. Specifically, and by way of example, although the headings refer to a "Field of Invention," such claims should not be limited by the language under this heading to describe the so-called technical field. Further, a description of technology in the "Background of the Invention" section is not to be construed as an admission that technology is prior art to any invention(s) in this disclosure. Neither is the "Summary" to be considered a characterization of the invention(s) set forth in issued claims. Furthermore, any reference in this disclosure to "invention" in the singular should not be used to argue that there is only a single point of novelty in this disclosure. Multiple inventions may be set forth according to the limitations of the multiple claims issuing from this disclosure, and such claims accordingly define the invention(s), and their equivalents, that are protected thereby. In all instances, the scope of such claims shall be considered on their own merits in light of this disclosure, but should not be constrained by the headings set forth herein.

The use of the word "a" or "an" when used in conjunction with the term "comprising" in the claims and/or the specification may mean "one," but it is also consistent with the meaning of "one or more," "at least one," and "one or more than one." The use of the term "or" in the claims is used to mean "and/or" unless explicitly indicated to refer to alternatives only or the alternatives are mutually exclusive, although the disclosure supports a definition that refers to only alternatives and "and/or." Throughout this application, the term "about" is used to indicate that a value includes the inherent variation of error for the device, the method being employed to determine the value, or the variation that exists among the study subjects. In general, but subject to the preceding discussion, a value herein that is modified by a word of approximation such as "about" or "substantially" may vary from the stated value by at least ±1, 2, 3, 4, 5, 6, 7, 10, 12 or 15%.

As used in this specification and claim(s), the words "comprising" (and any form of comprising, such as "comprise" and "comprises"), "having" (and any form of having, such as "have" and "has"), "including" (and any form of including, such as "includes" and "include") or "containing" (and any form of containing, such as "contains" and "contain") are inclusive or open-ended and do not exclude additional, unrecited elements or method steps.

Words of comparison, measurement, and timing such as "at the time," "equivalent," "during," "complete," and the like should be understood to mean "substantially at the time," "substantially equivalent," "substantially during," "substantially complete," etc., where "substantially" means that such comparisons, measurements, and timings are practicable to accomplish the implicitly or expressly stated desired result. Words relating to relative position of elements such as "near," "proximate to," and "adjacent to" shall mean sufficiently close to have a material effect upon the respective system element interactions. Other words of approximation similarly refer to a condition that when so modified is understood to not necessarily be absolute or perfect but would be considered close enough to those of ordinary skill in the art to warrant designating the condition as being present. The extent to which the description may vary will depend on how great a change can be instituted and still have one of ordinary skilled in the art recognize the modified feature as still having the required characteristics and capabilities of the unmodified feature.

The term "or combinations thereof" as used herein refers to all permutations and combinations of the listed items preceding the term. For example, "A, B, C, or combinations thereof is intended to include at least one of: A, B, C, AB, AC, BC, or ABC, and if order is important in a particular context, also BA, CA, CB, CBA, BCA, ACB, BAC, or CAB. Continuing with this example, expressly included are combinations that contain repeats of one or more item or term, such as BB, AAA, AB, BBC, AAABCCCC, CBBAAA, CABABB, and so forth. The skilled artisan will understand that typically there is no limit on the number of items or terms in any combination, unless otherwise apparent from the context.

All of the compositions and/or methods disclosed and claimed herein can be made and executed without undue experimentation in light of the present disclosure. While the compositions and methods of this disclosure have been described in terms of preferred embodiments, it will be apparent to those of skill in the art that variations may be applied to the compositions and/or methods and in the steps or in the sequence of steps of the method described herein without departing from the concept, spirit and scope of the disclosure. All such similar substitutes and modifications apparent to those skilled in the art are deemed to be within the spirit, scope and concept of the disclosure as defined by the appended claims.

What is claimed is:

1. An energy directing system, the system comprising:
   an energy surface comprising a plurality of first energy locations configured to direct a first energy from the energy surface;
   an energy device comprising one or more conductive diaphragms mounted between one or more pairs of electrically conductive planes comprising a plurality of apertures;
   wherein the energy device is located adjacent to the energy surface and extends across at least a portion of a surface of the energy surface, the plurality of apertures being substantially coincident with the plurality of first energy locations;
   wherein the one or more conductive diaphragms are substantially transmissive of the first energy directed from the energy surface; and
   wherein the one or more pairs of electrically conductive planes are configured to move the one or more conductive diaphragms to thereby produce a second energy directed from the energy device.

2. The energy directing system of claim 1, wherein the energy surface is a display wall and the plurality of energy locations are a plurality of light sources, the first energy comprising light energy; and
   wherein the energy device is an electrostatic speaker, and the second energy comprises sound waves.

3. The energy directing system of claim 2, wherein the plurality of light sources comprise LED light sources.

4. An energy system comprising:
   an array of waveguides, each waveguide comprising one or more elements disposed on separate substrates, each waveguide comprising at least one aperture;
   an energy device comprising one or more conductive diaphragms mounted between one or more pairs of electrically conductive planes comprising a plurality of energy apertures;
   wherein the energy device is configured such that, as a voltage is applied across the one or more pairs of electrically conductive planes, the one or more pairs of electrically conductive planes induce a movement of the one or more conductive diaphragms, thereby producing an energy;
   wherein the plurality of energy apertures are substantially coincident with the plurality of waveguide apertures; and
   wherein the energy device is configured to be accommodated between the separate substrates of the array of waveguides.

5. The energy system of claim 4, wherein the conductive planes disposed between the elements of the waveguide inhibit energy propagation between adjacent waveguides.

6. An energy directing system, the system comprising:
an energy source system configured to produce at least a first energy at a plurality of energy locations;
an array of waveguides, wherein each waveguide of the array of waveguides is configured to receive the at least first energy from a corresponding subset of the plurality of energy locations, wherein each energy location of the subset of the plurality of energy locations substantially fills an aperture of each waveguide, and each waveguide directs the at least first energy along a plurality of propagation paths, each propagation path of the plurality of propagation paths determined at least by the location of the corresponding energy location;
an energy device comprising one or more conductive diaphragms mounted between one or more pairs of electrically conductive planes comprising a plurality of apertures;
wherein the energy device is located adjacent to the array of waveguides and extends across at least a portion of the array of waveguides, such that the plurality of apertures of the energy device are substantially coincident with the apertures of the array of waveguides;
wherein the one or more conductive diaphragms are substantially transmissive of the at least first energy directed along the plurality of propagation paths; and
wherein the energy device is configured such that, as a voltage is applied across the one or more pairs of electrically conductive planes, the one or more pairs of electrically conductive planes induce a movement of the one or more conductive diaphragms, thereby producing a second energy directed in coordination with the plurality of propagation paths.

7. The energy directing system of claim 6, wherein the plurality of propagation paths of each waveguide of the array of waveguides combine to form a 4D energy field of the at least first energy.

8. The energy directing system of claim 6, wherein the second energy comprises acoustic energy.

9. The energy directing system of claim 6, wherein the one or more conductive planes of the energy device are configured to inhibit propagation of the at least first energy, whereby any portion of the at least first energy from the corresponding subset of the plurality of energy locations associated with a waveguide that does not pass through an aperture of the waveguide is substantially absorbed.

10. The energy directing system of claim 6, the energy device comprising a plurality of pairs of conductive planes, each pair configured to operate independently of one another.

11. The energy directing system of claim 10, wherein the second energy is sound energy.

12. The energy directing system of claim 10, wherein the second energy is ultrasound energy.

13. The energy directing system of claim 12, wherein the energy device is operable to produce an acoustic energy field that forms at least one volumetric tactile surface in coordination with the plurality of propagation paths of the at least first energy.

14. The energy directing system of claim 13, wherein the plurality of propagation paths of each waveguide of the array of waveguides combine to form a 4D energy field of the at least first energy, and wherein the volumetric tactile surface is produced in coordination with the 4D energy field.

15. The energy directing system of claim 14, wherein the energy directing system is configured to produce holograms of the first energy occupying the 4D energy field, and the energy device is configured to produce a plurality of volumetric tactile surfaces substantially coincident with the produced holograms.

* * * * *